(12) United States Patent
Sakamoto et al.

(10) Patent No.: US 10,407,582 B2
(45) Date of Patent: Sep. 10, 2019

(54) INK COMPOSITION, IMAGE FORMING METHOD, AND PRINTED MATTER

(71) Applicant: FUJIFILM CORPORATION, Tokyo (JP)

(72) Inventors: Atsushi Sakamoto, Kanagawa (JP); Kazuhiro Yokoi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 274 days.

(21) Appl. No.: 14/010,300

(22) Filed: Aug. 26, 2013

(65) Prior Publication Data

US 2014/0066538 A1    Mar. 6, 2014

Related U.S. Application Data

(63) Continuation of application No. PCT/JP2012/054449, filed on Feb. 23, 2012.

(30) Foreign Application Priority Data

Feb. 28, 2011 (JP) .................................. 2011-041819
Feb. 28, 2011 (JP) .................................. 2011-042199

(51) Int. Cl.
*C09D 11/10* (2014.01)
*B41J 2/01* (2006.01)
(Continued)

(52) U.S. Cl.
CPC ............ *C09D 11/107* (2013.01); *C09D 11/10* (2013.01); *C09D 11/101* (2013.01); *C09D 11/322* (2013.01)

(58) Field of Classification Search
CPC ...... C09D 11/107; C09D 4/06; C09D 11/322; C09D 11/10; C09D 11/101; C08F 2/50; C08L 83/06; C08L 86/06
See application file for complete search history.

(56) References Cited

U.S. PATENT DOCUMENTS 4,629,676 A    12/1986  Hayakawa et al.
6,294,592 B1    9/2001  Herrmann et al.
(Continued)

FOREIGN PATENT DOCUMENTS

CN    101503587 A    8/2009
EP     1302499 A2    4/2003
(Continued)

OTHER PUBLICATIONS

Yonezawa et al., machine English translation of JP 2010-013514 (pub Jan. 21, 2010).*

(Continued)

*Primary Examiner* — Jessica M Roswell
(74) *Attorney, Agent, or Firm* — Studebaker & Brackett PC

(57) ABSTRACT

An ink composition includes (component A) a polymer that has a group containing a silsesquioxane structure and has a weight average molecular weight of 3,000 or more, (component B) a monofunctional polymerizable compound, and (component C) a polymerization initiator; or an ink composition includes (component A') a compound that does not have an ethylenically unsaturated double bond but has a silsesquioxane structure, and has a molecular weight of 300 or more but less than 3,000, (component B') a monofunctional polymerizable compound, (component C) a polymerization initiator, and (component D) a coloring agent, wherein a content of the (component B') monofunctional polymerizable compound with respect to the total content of all the polymerizable compounds is 80% by mass or more.

19 Claims, 1 Drawing Sheet

(51) Int. Cl.
*B41M 5/00* (2006.01)
*C09D 11/107* (2014.01)
*C09D 11/101* (2014.01)
*C09D 11/322* (2014.01)

(56) References Cited

U.S. PATENT DOCUMENTS

| | | | |
|---|---|---|---|
| 2003/0094738 A1 | 5/2003 | Maeda et al. | |
| 2004/0137362 A1* | 7/2004 | De | C08F 220/30 430/270.1 |
| 2004/0163570 A1 | 8/2004 | Vanmaele et al. | |
| 2005/0084613 A1* | 4/2005 | Wang | B82Y 10/00 427/282 |
| 2007/0082968 A1 | 4/2007 | Minamisawa et al. | |
| 2008/0103280 A1 | 5/2008 | Satou et al. | |
| 2009/0202795 A1 | 8/2009 | Hayata et al. | |

FOREIGN PATENT DOCUMENTS

| | | | |
|---|---|---|---|
| EP | 1452569 A1 | 9/2004 | |
| JP | 62-250081 A | 10/1987 | |
| JP | 09-302289 A | 11/1997 | |
| JP | 2003-105077 A | 4/2003 | |
| JP | 2004-339480 A | 12/2004 | |
| JP | 2007-119728 A | 5/2007 | |
| JP | 2008-106165 A | 5/2008 | |
| JP | 2009-244513 A | 10/2009 | |
| JP | 2010-013514 A | 1/2010 | |
| JP | 2010-248310 A | 11/2010 | |
| TW | 200829658 A | 7/2008 | |
| WO | WO-2010-054979 | * 5/2010 | G03F 7/012 |

OTHER PUBLICATIONS

Sato et al., machine English translation of JP 2008-106165 (pub. May 2008).*

Koike et al., machine English translation of JP 2010-248310 (pub. Nov. 2010).*

Takeuchi et al., machine English translation of JP2008-246876 (Oct. 2008).*

An Office Action; "Notice of Reasons for Rejection," issued by the Japanese Patent Office dated Aug. 5, 2014, which corresponds to Japanese Patent Application No. 2011-041819 and is related to U.S. Appl. No. 14/010,300; with English language partial translation.

An Office Action; "Notice of Reasons for Rejection," issued by the Japanese Patent Office dated Aug. 5, 2014, which corresponds to Japanese Patent Application No. 2011-042199 and is related to U.S. Appl. No. 14/010,300; with English language partial translation.

International Search Report; PCT/JP2012/054449; dated May 22, 2012.

Written Opinion of the International Searching Authority; PCT/JP2012/054449; dated May 22, 2012.

The first Office Action issued by the State Intellectual Property Office of the People's Republic of China dated Aug. 1, 2014, which corresponds to Chinese Patent Application No. 201280010197.6 and is related to U.S. Appl. No. 14/010,300; with English language partial translation.

An Office Action; "Notice of Reasons for Rejection," issued by the Japanese Patent Office dated Apr. 28, 2015, which corresponds to Japanese Patent Application No. 2011-041819 and is related to U.S. Appl. No. 14/010,300; with English language partial translation.

Communication pursuant to Rule 164(1) EPC issued by the European Patent Office dated Aug. 24, 2015, which corresponds to European Patent Application No. 12752941.0-1302 and is related to U.S. Appl. No. 14/010,300.

The extended European search report issued by the European Patent Office dated Feb. 22, 2016, which correspond to European Patent Application No. 12752941.0-1302 and is related to U.S. Appl. No. 14/010,300.

An Office Action issued by the Indian Patent Office dated Sep. 7, 2018, which corresponds to Indian Patent Application 6848/CHENP/2013 and is related to U.S. Appl. No. 14/010,300.

* cited by examiner

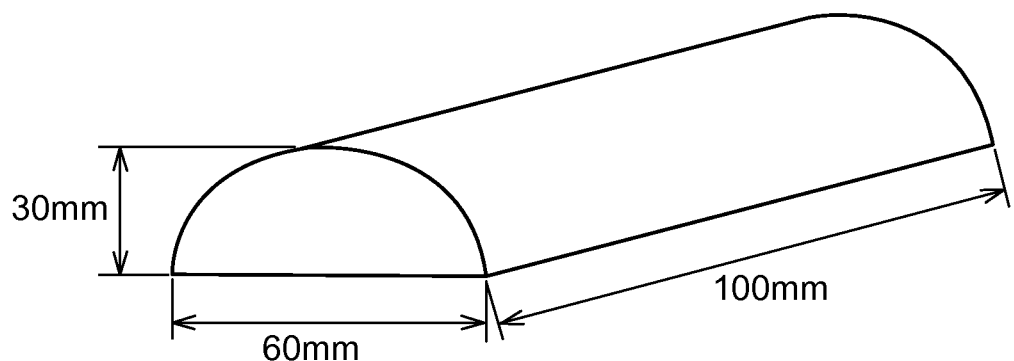

INK COMPOSITION, IMAGE FORMING METHOD, AND PRINTED MATTER

CROSS-REFERENCE TO RELATED APPLICATIONS

This application is a continuation application of International Application No. PCT/JP2012/054449, filed Feb. 23, 2012, the disclosure of which is incorporated herein by reference in its entirety. Further, this application claims priority from Japanese Patent Application No. 2011-042199, filed Feb. 28, 2011, and Japanese Patent Application No. 2011-041819, filed Feb. 28, 2011.

TECHNICAL FIELD

The present invention relates to an ink composition, an image forming method, and printed matter.

BACKGROUND ART

Image recording methods of forming an image on a recording medium such as paper based on image data signals include those by an electrographic system, a sublimation type or fusion type heat transfer system, an inkjet system, or the like. Among them, the inkjet system can be carried out by using an inexpensive device and, since an image is formed directly on a recording medium by ejecting ink only onto a required image area, ink can be used efficiently and running costs are low.

As one of the inkjet systems, there is a recording system using an inkjet recording ink which is curable by irradiation with an actinic energy ray. According to this method, by curing ink droplets, the productivity of printing can be enhanced, and a sharp image can be formed. Further, it is also possible to fabricate printed matter in which an image is formed by such an inkjet method.

From the viewpoint of improving curability and sensitivity, Japanese Patent Application Laid-Open (JP-A) No. 2004-339480 discloses a radiation-curable ink composition including an initiator and a polyhedral oligomeric silsesquioxane.

JP-A No. 2010-13514 discloses a composition for optical nanoprinting, the composition including a polymerization initiator, a polymerizable compound, and silsesquioxane, for the purpose of improving the imprint property after thermal curing, the adhesion to substrate, heat resistance, and surface hardness.

SUMMARY OF INVENTION

Technical Problem

Hereinafter, the problems to be addressed by the first embodiment of the present invention are described.

In a process of fabricating printed matter with an image formed thereon by slowly stretching by heating, when the stretchability or the like is insufficient, cracking or the like may occur on the image surface that has been fabricated.

Further, in a process of cutting by punching a fabricated substance into a molded product, when the anti-impact capacity against an impact is insufficient, there is a problem in that cracks (vicinal cracks) may occur at the cut section or in a vicinity thereof. A product having such inferior punching property may diminish its value as a commercial product.

Neither the above JP-A No. 2004-339480 nor JP-A No. 2010-13514 discloses any technique for the improvement of molding property and punching property of an image that has been formed.

The first embodiment of the present invention has been made in view of the above problems, and aims to accomplish the following. Namely, the aspect of the first embodiment of the present invention is to provide an ink composition with which the image obtained exhibits excellent molding property and excellent punching property, an image forming method using the ink composition, and printed matter.

Hereinafter, the problems to be addressed by the second embodiment of the present invention are described.

In a process of fabricating printed matter with an image formed thereon by slowly stretching by heating, when the stretchability or the like is insufficient, cracking or the like may occur on the image surface that has been fabricated.

Further, in a process of cutting by punching a fabricated substance into a molded product, when the impact resistance (anti-impact capacity) is insufficient, there is a problem in that cracks (vicinal cracks) may occur at the cut section or in a vicinity thereof. A product having such inferior punching property may diminish its value as a commercial product.

Neither the above JP-A No. 2004-339480 nor JP-A No. 2010-13514 discloses any technique for the improvement of punching property and stretchability of an image that has been formed. Further, concerning the storage stability of the ink composition, there is room for improvement.

The second embodiment of the present invention has been made in view of the above problems, and aims to accomplish the following. Namely, the aspect of the second embodiment of the present invention is to provide an ink composition which has good storage stability, and with which the image obtained exhibits excellent punching property and excellent stretchability, an image forming method using the ink composition, and printed matter.

Solution to Problem

Means for addressing the problems in the first embodiment are as follows.

<1> An ink composition, comprising:

(component A) a polymer that has a group containing a silsesquioxane structure and that has a weight average molecular weight of 3,000 or more;

(component B) a monofunctional polymerizable compound; and (component C) a polymerization initiator.

<2> The ink composition according to <1>, wherein the weight average molecular weight of the (component A) is from 10,000 to 200,000.

<3> The ink composition according to <1> or <2>, wherein the silsesquioxane structure comprises a structure represented by the following Formula (A-1):

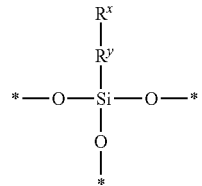

Formula (A-1)

wherein, in Formula (A-1), $R^x$ represents a halogen atom, a cyano group, an —SH group, —$PR^a_2$, an amino group, an aryl group, or an alkyl group, wherein $R^a$ represents an aryl group; $R^y$ represents a single bond or at least one group selected from the group consisting of —COO—, an alkylene group, an arylene group, an alkyleneoxy group, —$SO_2$—, —$SiR^b_2$—, and —NH—, wherein $R^b$ represents an alkylene group or a halogen atom; and * represents a bonding site.

<4> The ink composition according to any one of <1> to <3>, wherein the silsesquioxane structure is a cage-like structure.

<5> The ink composition according to any one of <1> to <4>, wherein the (component A) is a polymer having a group containing a silsesquioxane structure in a side chain thereof.

<6> The ink composition according to any one of <1> to <5>, wherein the group containing a silsesquioxane structure in the (component A) is a group represented by the following Formula (A-2):

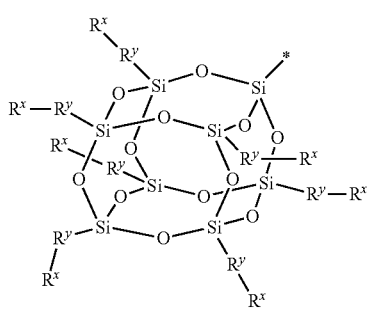

Formula (A-2)

wherein, in Formula (A-2), $R^x$ represents a halogen atom, a cyano group, an —SH group, —$PR^a_2$, an amino group, an aryl group, or an alkyl group, wherein $R^a$ represents an aryl group; $R^y$ represents a single bond or at least one group selected from the group consisting of —COO—, an alkylene group, an arylene group, an alkyleneoxy group, —$SO_2$—, —$SiR^b_2$—, and —NH—, wherein $R^b$ represents an alkylene group or a halogen atom; respective $R^x$'s and respective $R^y$'s may be the same as or different from each other; and * represents a bonding site.

<7> The ink composition according to <6>, wherein, in Formula (A-2), $R^x$ represents an alkyl group or an aryl group and $R^y$ represents a single bond.

<8> The ink composition according to any one of <1> to <7>, further comprising (component D) a coloring agent.

<9> The ink composition according to any one of <1> to <8>, wherein the (component A) comprises a (meth)acrylate repeating unit or a urethane repeating unit (—NHCOO—) as a main chain structure.

<10> The ink composition according to any one of <1> to <9>, wherein a content of the (component A) with respect to a total amount of the ink composition is from 0.1% by mass to 20% by mass.

<11> The ink composition according to any one of <1> to <10>, wherein a content of the (component B) monofunctional polymerizable compound with respect to a total content of all polymerizable compounds in the ink composition is from 90% by mass to 100% by mass.

<12> The ink composition according to any one of <1> to <11>, wherein the (component B) monofunctional polymerizable compound comprises an N-vinyl compound or a (meth)acrylate compound.

<13> The ink composition according to any one of <1> to <12>, being an ink composition for inkjet recording.

<14> An image forming method, comprising:
applying the ink composition according to any one of <1> to <13> onto a recording medium; and
irradiating the ink composition that has been applied with an actinic energy ray.

<15> The image forming method according to <14>, wherein the applying of the ink composition comprises applying the ink composition by an inkjet method.

<16> Printed matter formed using the image forming method according to <14> or <15>.

Means for addressing the problems in the second embodiment are as follows.

<17> An ink composition, comprising:
(component A') a compound that does not have an ethylenically unsaturated double bond but has a silsesquioxane structure, and that has a molecular weight of 300 or more but less than 3,000;
(component B') a monofunctional polymerizable compound;
(component C) a polymerization initiator; and
(component D) a coloring agent,
wherein a content of the (component B') monofunctional polymerizable compound with respect to a total content of all polymerizable compounds is 80% by mass or more.

<18> The ink composition according to <1>, wherein the silsesquioxane structure is a structure represented by Structural Formula (A):

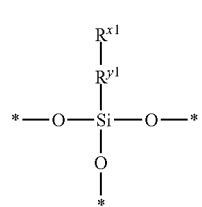

Structural Formula (A)

wherein, in Structural Formula (A), $R^{x1}$ represents a halogen atom, a cyano group, a thiol group, —$PR^{a1}_2$, —$SiR^c_3$, an amino group, an aryl group, or an alkyl group, wherein $R^{a1}$ represents an aryl group and $R^c$ represents an alkyl group; $R^{y1}$ represents a single bond, —COO—, an alkylene group, an arylene group, an alkyleneoxy group, —$SO_2$—, —O—, —$SiR^{b1}_2$—, or an —NH— group, wherein $R^{b1}$ represents an alkyl group; and * represents a bonding site.

<19> The ink composition according to <18>, wherein, in Structural Formula (A), $R^{x1}$ represents a thiol group, —$PR^{a1}_2$, —$SiR^c_3$, an alkyl group or an aryl group, wherein $R^{a1}$ represents an aryl group and $R^c$ represents an alkyl group; and $R^{y1}$ represents an alkylene group, an alkyleneoxy group, or a single bond.

<20> The ink composition according to <18>, wherein, in Structural Formula (A), $R^{x1}$ represents an aryl group or an alkyl group and $R^{y1}$ represents a single bond.

<21> The ink composition according to any one of <17> to <20>, wherein the silsesquioxane structure is a cage-like structure.

<22> The ink composition according to any one of <17> to <21>, wherein the (component A') compound is represented by the following Formula (A'-2):

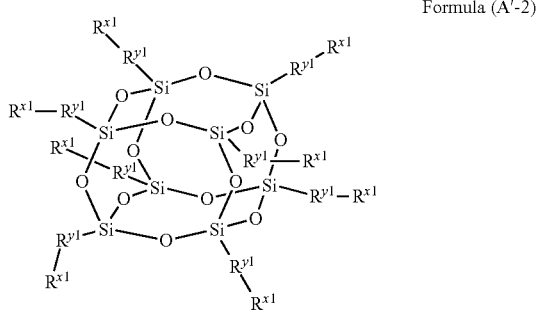

Formula (A'-2)

wherein, in Formula (A'-2), $R^{x1}$ represents a halogen atom, a cyano group, a thiol group, $-PR^{a1}{}_2$, $-SiR^{c}{}_3$, an amino group, an aryl group, or an alkyl group, wherein $R^{a1}$ represents an aryl group and $R^c$ represents an alkyl group; $R^{y1}$ represents a single bond, $-COO-$, an alkylene group, an arylene group, an alkyleneoxy group, $-SO_2-$, $-O-$, $-SiR^{b1}{}_2-$, or an $-NH-$ group, wherein $R^{b1}$ represents an alkyl group; and respective $R^{x1}$'s and respective $R^{y1}$'s may be the same as or different from each other.

<23> The ink composition according to <22>, wherein, in Formula (A'-2), $R^{x1}$ represents an aryl group or an alkyl group and $R^{y1}$ represents a single bond.

<24> The ink composition according to any one of <17> to <23> comprising an N-vinyl compound or a (meth)acrylamide compound as the (component B') monofunctional polymerizable compound.

<25> The ink composition according to <24>, wherein the N-vinyl compound is represented by the following Formula (V):

Formula (V)

wherein, in Formula (V), m2 represents an integer from 1 to 5.

<26> The ink composition according to <24>, wherein the (meth)acrylamide compound is represented by the following Formula (M'-1):

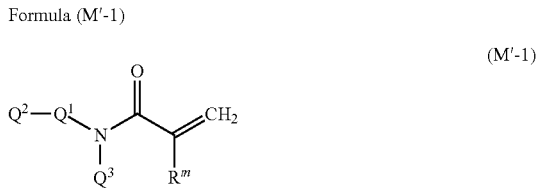

Formula (M'-1)

wherein, in Formula (M'-1), $Q^1$ represents a single bond, an alkyleneoxy group, or an alkylene group; $Q^2$ represents a hydrogen atom, an alkyl group, an aryl group, an amino group, a hydroxyl group, a sulfo group, or an acyl group; $Q^3$ represents a hydrogen atom or an alkyl group; $Q^2$ and $Q^3$ may bond to each other to form a ring; and $R^m$ represents a hydrogen atom or a methyl group.

<27> The ink composition according to any one of <17> to <26>, wherein the (component B') monofunctional polymerizable compound is contained in an amount of from 80% by mass to 99% by mass with respect to a total amount of the ink composition.

<28> The ink composition according to any one of <17> to <27>, wherein the (component A') compound is contained in an amount of from 0.1% by mass to 20% by mass with respect to a total amount of the ink composition.

<29> The ink composition according to any one of <17> to <28>, being an ink composition for inkjet recording.

<30> An image forming method, comprising:
applying the ink composition according to any one of <17> to <29> onto a recording medium; and
irradiating the ink composition with an actinic energy ray.

<31> The image forming method according to <30>, wherein the applying of the ink composition comprises applying the ink composition by an inkjet method.

<32> Printed matter formed using the ink composition according to any one of <17> to <29>.

Advantageous Effects of Invention

According to the first embodiment of the present invention, an ink composition with which the image obtained by curing the same exhibits excellent molding property and excellent punching property, an image forming method using the ink composition, and printed matter can be provided. According to the second embodiment of the present invention, an ink composition having good storage stability can be provided, and an ink composition which exhibits excellent punching property and excellent stretchability can be provided.

BRIEF DESCRIPTION OF DRAWINGS

FIG. 1 is a schematic perspective diagram of a wooden mold positioned in a vacuum forming apparatus in a vacuum molding test of printed matter.

DESCRIPTION OF EMBODIMENTS

Note that, in a case of being common in the first embodiment and the second embodiment, the expression "of the present invention" may be used, simply. Further, in a description, in which the expression "the first embodiment" or "the second embodiment" is not used, the description is common to both the embodiments.

1. Ink Composition

The ink composition according to the first embodiment of the present invention includes (component A) a polymer that has a group containing a silsesquioxane structure and that has a weight average molecular weight of 3,000 or more, (component B) a monofunctional polymerizable compound, and (component C) a polymerization initiator. It is preferable that the ink composition of the present invention is an ink composition for inkjet recording. Hereinafter, the "(component A) polymer that has a group containing a silsesquioxane structure and that has a weight average molecular weight of 3,000 or more", the "(component B) monofunctional polymerizable compound", and the "(component C) polymerization initiator" may also be referred to as, simply, "(component A)", "(component B)", and "(component C)", respectively.

The ink composition according to the second embodiment of the present invention includes (component A') a compound that does not have an ethylenically unsaturated double bond but has a silsesquioxane structure, and that has a molecular weight of 300 or more but less than 3,000, (component B') a monofunctional polymerizable compound, (component C) a polymerization initiator, and (component D) a coloring agent, and wherein a content of the (component B') monofunctional polymerizable compound with respect to a total content of all polymerizable compounds is 80% by mass or more. Hereinafter, also referred to as, simply, "(component A')" and "(component B')". It is preferable that the ink composition according to the second embodiment of the present invention is an ink composition for inkjet recording.

The ink composition in the present invention is described in detail below.

Hereinafter, (component A) a polymer that has a group containing a silsesquioxane structure and that has a weight average molecular weight of 3,000 or more, which is contained in the ink composition according to the first embodiment of the present invention, is described in detail.

((Component A) Polymer that has a Group Containing a Silsesquioxane Structure and that has a Weight Average Molecular Weight of 3,000 or More)

The ink composition according to the first embodiment of the present invention includes (component A) a polymer that has a group containing a silsesquioxane structure and that has a weight average molecular weight of 3,000 or more, as an essential component.

The term "silsesquioxane structure" used in the first embodiment of the present invention refers to a siloxane compound that is formed by a structure of $Si(O_{1/2})_3$ having a substituent. In the first embodiment of the present invention, the silsesquioxane structure may have any of a cage-like, a ladder-like, or a random type structure, and a cage-like silsesquioxane structure is more preferable. The "cage-like", "ladder-like", and "random type" indicate the structures described, for example, in "SILSESQUIOXANE ZAIRYO NO KAGAKU TO OYO TENKAI (Chemistry, Application and Development of Silsesquioxane Material)" (published by CMC) and the like.

It is preferable that the silsesquioxane structure in the (component A) includes, for example, a structure represented by the following Formula (A-1).

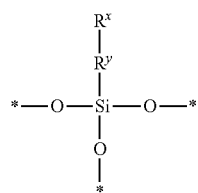

Formula (A-1)

(In Formula (A-1), $R^x$ represents a halogen atom, a cyano group, an —SH group, —PR$^a{}_2$, an amino group, an aryl group, or an alkyl group, wherein $R^a$ represents an aryl group; $R^y$ represents a single bond or at least one group selected from the group consisting of —COO—, an alkylene group, an arylene group, an alkyleneoxy group, —SO$_2$—, —SiR$^b{}_2$—, and —NH—, wherein $R^b$ represents an alkylene group or a halogen atom; and * represents a bonding site.)

When $R^x$ in Formula (A-1) represents a halogen atom, examples of the halogen atom include F, Cl, Br, I, and the like. When $R^x$ represents a halogen atom, $R^y$ does not represent a single bond, —COO—, —NH—, or —SO$_2$—.

When $R^x$ in Formula (A-1) represents —PR$^a{}_2$, wherein $R^a$ represents an aryl group, $R^a$ preferably represents an aryl group having from 6 to 20 carbon atoms, more preferably an aryl group having from 6 to 16 carbon atoms, and particularly preferably an aryl group having from 6 to 10 carbon atoms. Specific examples of the aryl group include a phenyl group, a naphthyl group, and the like. When $R^x$ in Formula (A-1) represents —PR$^a{}_2$, wherein $R^a$ represents an aryl group, $R^y$ does not represent a single bond, —COO—, —NH—, or —SO$_2$—.

When $R^x$ in Formula (A-1) represents an amino group, the amino group may be any of a primary amino group, a secondary amino group, or a ternary amino group, and may be represented by, for example, —NH$_2$, —NHR$^1$, —NR$^1{}_2$, or the like, wherein $R^1$ represents a substituent. The substituents of the amino group, the substituents each being represented by $R^1$, may be different from each other, and examples thereof include a straight-chain or branched alkyl group having from 1 to 8 carbon atoms (preferably from 1 to 4 carbon atoms), an aryl group having from 6 to 20 carbon atoms (preferably, a phenyl group), and the like. Specific examples of the amino group include a primary amino group, a dimethylamino group, and the like. These groups may have a substituent or may have no substituent, but it is preferable that these groups do not have a substituent. When $R^x$ in Formula (A-1) represents an amino group, a combination with $R^y$ that represents a single bond, —COO—, —NH—, or —SO$_2$-does not exist.

When $R^x$ in Formula (A-1) represents an aryl group, the aryl group is preferably an aryl group having from 6 to 20 carbon atoms, more preferably an aryl group having from 6 to 16 carbon atoms, and particularly preferably an aryl group having from 6 to 10 carbon atoms. Specific examples of the aryl group include a phenyl group, a naphthyl group, and the like. These groups may have a substituent or may have no substituent, but it is preferable that these groups do not have a substituent. When $R^x$ in Formula (A-1) represents an aryl group, $R^y$ does not represent —COO—, —NH—, or —SO$_2$—.

When $R^x$ in Formula (A-1) represents an alkyl group, the alkyl group is preferably an alkyl group having from 1 to 10 carbon atoms, more preferably an alkyl group having from 1 to 5 carbon atoms, and particularly preferably an alkyl group having from 1 to 3 carbon atoms. The alkyl group may have a straight chain structure, a branched structure, or a cyclic structure, but particularly, the alkyl group preferably has a cyclic structure or a branched structure. An epoxy group may be included in the chain-like or cyclic alkyl group. Here, in a case in which an epoxy group is included, the two carbon atoms that form the epoxy group are included in the number of carbon atoms described above. Specific examples of the alkyl group include a 1,2-epoxy-4-cylcohexyl group, a glycidyl group, an isobornyl group, a methyl group, an ethyl group, a t-butyl group, an isooctyl group, and the like. These groups may have a substituent or may have no substituent, but it is preferable that these groups do not have a substituent.

When $R^x$ in Formula (A-1) represents an —SH group, a combination with $R^y$ that represents a single bond, —COO—, or —NH— does not exist.

$R^x$ in Formula (A-1) preferably represents an aryl group or an alkyl group.

When $R^y$ in Formula (A-1) represents an alkylene group, the alkylene group has preferably from 1 to 10 carbon atoms, more preferably from 1 to 6 carbon atoms, and particularly preferably from 1 to 3 carbon atoms. Specific examples of the alkylene group include a methylene group and the like.

These groups may have a substituent or may have no substituent, but it is preferable that these groups do not have a substituent.

When $R^y$ in Formula (A-1) represents an arylene group, the arylene group has preferably from 6 to 18 carbon atoms, more preferably from 6 to 14 carbon atoms, and particularly preferably from 6 to 10 carbon atoms. Specific examples of the arylene group include a phenylene group and the like. These groups may have a substituent or may have no substituent, but it is preferable that these groups do not have a substituent.

When $R^y$ in Formula (A-1) represents an alkyleneoxy group (—$R^2$—O—, wherein $R^2$ represents an alkylene group), the alkyleneoxy group has preferably from 1 to 10 carbon atoms, more preferably from 1 to 6 carbon atoms, and particularly preferably from 1 to 3 carbon atoms. Specific examples of the alkyleneoxy group include an ethoxy group and the like. These groups may have a substituent or may have no substituent. The alkyleneoxy group can bond to the Si in Structural Formula (A-1) in the direction of —$R^2$—O— or —O—$R^2$— (** represents a bonding site.).

When $R^y$ in Formula (A-1) represents —$SiR^b{}_2$—, wherein $R^b$ represents an alkylene group, $R^b$ has preferably from 1 to 10 carbon atoms, more preferably from 1 to 6 carbon atoms, and particularly preferably from 1 to 3 carbon atoms. Specific examples of the alkylene group include a methylene group and the like. These groups may have a substituent or may have no substituent, but it is preferable that these groups do not have a substituent.

When $R^y$ in Formula (A-1) represents —$SiR^b{}_2$—, wherein $R^b$ represents a halogen atom, examples of $R^b$ include F, Cl, Br, I, and the like.

$R^y$ in Formula (A-1) may be a combination of groups selected from the group consisting of —COO—, an alkylene group, an arylene group, an alkyleneoxy group, —$SO_2$—, —$SiR^b{}_2$—, and —NH—, wherein $R^b$ represents an alkylene group or a halogen atom. Preferable examples of the combination of groups include a combination of —NH— and an alkylene group, a combination of a —COO— group and an alkylene group, and the like.

$R^y$ in Formula (A-1) preferably represents a single bond or an alkylene group, and particularly preferably a single bond.

It is preferable that the group containing a silsesquioxane structure in the (component A) is a group represented by the following Formula (A-2).

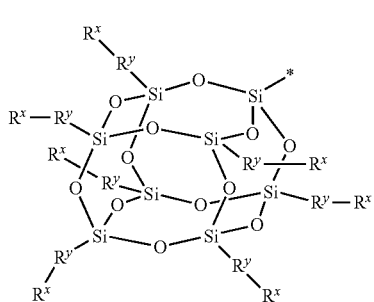

Formula (A-2)

(In Formula (A-2), $R^x$ represents a halogen atom, a cyano group, an —SH group, —$PR^a{}_2$, an amino group, an aryl group, or an alkyl group, wherein $R^a$ represents an aryl group; and $R^y$ represents a single bond or at least one group selected from the group consisting of —COO—, an alkylene group, an arylene group, an alkyleneoxy group, —$SO_2$—, —$SiR^b{}_2$—, and —NH—, wherein $R^b$ represents an alkylene group or a halogen atom; respective $R^x$'s and respective $R^y$'s may be the same as or different from each other; and * represents a bonding site.)

$R^x$ in Formula (A-2) has the same definition and the same preferable scope as $R^x$ in Formula (A-1) above.

$R^y$ in Formula (A-2) has the same definition and the same preferable scope as $R^y$ in Formula (A-1) above.

In Formula (A-2) above, a combination in which $R^x$ represents an alkyl group or an aryl group, and $R^y$ represents a single bond is particularly preferable.

A weight average molecular weight (Mw) of the (component A) in the first embodiment of the present invention is 3,000 or more, preferably from 3,000 to 200,000, more preferably from 5,000 to 200,000, and particularly preferably from 10,000 to 200,000.

The weight average molecular weight is measured by a gel permeation chromatography (GPC). For the GPC, HLC-8020 GPC (manufactured by Tosoh Corp.) is used, and TSK GEL SUPER HZM-H, TSK GEL SUPER HZ4000, and TSK GEL SUPER HZ200 (all manufactured by Tosoh Corp.; 4.6 mm ID×15 cm) may be used as the columns and THF (tetrahydrofuran) may be used as an eluent liquid.

In the first embodiment of the present invention, the content of the (component A) in the ink composition is preferably from 0.1% by mass to 20% by mass, more preferably from 1% by mass to 15% by mass, and particularly preferably from 1% by mass to 10% by mass.

Specific examples (M-1) to (M-7) of the group containing a silsesquioxane structure are shown below, but it should be construed that the present invention is not limited to these specific examples.

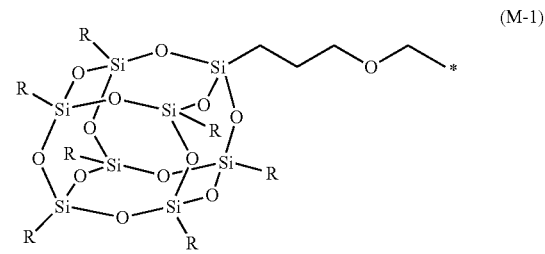

(M-1)

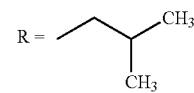

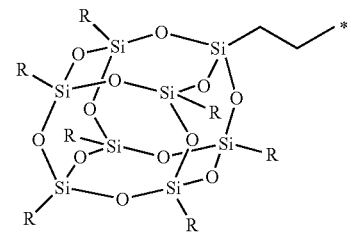

(M-2)

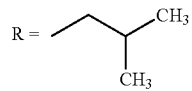

-continued (M-3)
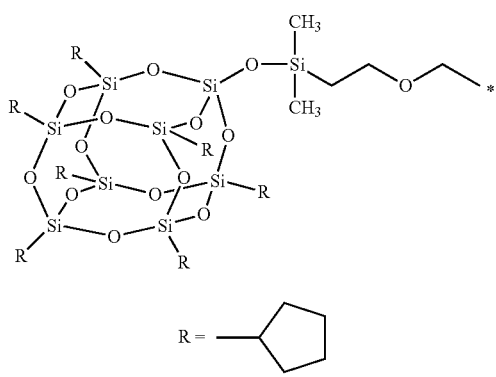
R =

(M-4)
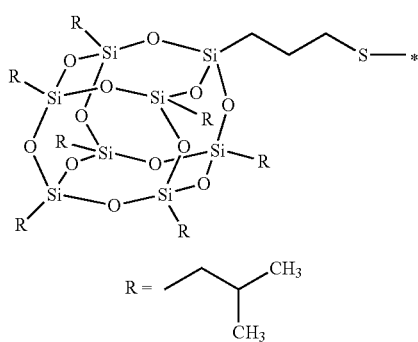
R =

(M-5)
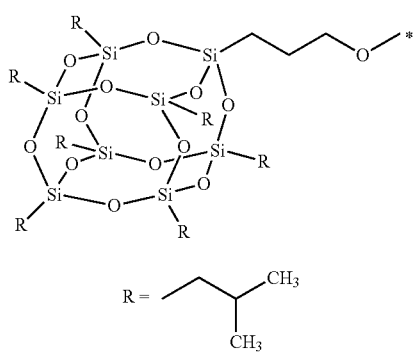
R =

(M-6)
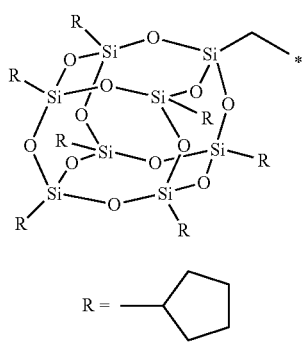
R =

-continued (M-7)
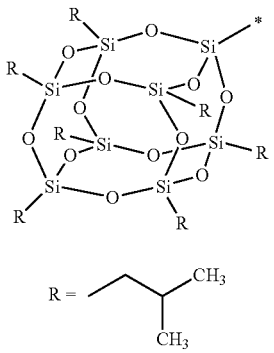

R = 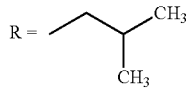

Examples of a monomer that gives a repeating unit having a group containing a cage like silsesquioxane structure include SILSESQUIOXANE (total condensation series) manufactured by Sigma Aldrich Japan K.K., SILSESQUIOXANE series manufactured by Hybrid Plastics Inc., and the like.

As the repeating unit capable of forming the (component A), respective known or commercially available repeating units which form styrene, (meth)acrylate, (meth)acrylamide, ester, urethane, or urea can be used, and particularly, it is preferable that the (component A) has a (meth)acrylate repeating unit or a urethane repeating unit (—NHCOO—), and it is more preferable that the (component A) has a urethane repeating unit. Note that, the term "(meth)acrylamide" means at least one of acrylamide or methacrylamide, and so are the cases of other expressions added with "(meth)", such as "(meth)acrylate" or the like.

Examples of a monomer that can form a styrene repeating unit include styrene, p-methoxystyrene, and the like.

Examples of a monomer that can form a (meth)acrylate repeating unit include methyl (meth)acrylate, ethyl(meth)acrylate, allyl(meth)acrylate, butyl(meth)acrylate, hexyl (meth)acrylate, 2-ethylhexyl(meth)acrylate, octyl(meth)acrylate, decyl(meth)acrylate, stearyl (meth)acrylate, cyclohexyl(meth)acrylate, bornyl(meth)acrylate, isobornyl (meth)acrylate, benzyl (meth)acrylate, 2-ethylhexyl diglycol (meth)acrylate, butoxyethyl (meth)acrylate, butoxymethyl (meth)acrylate, 3-methoxybutyl(meth)acrylate, 2-(2-methoxyethoxy)ethyl (meth)acrylate, 2-(2-butoxyethoxy) ethyl (meth)acrylate, 2,2,2-tetrafluoroethyl (meth)acrylate, 1H, 1H, 2H, 2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, phenoxymethyl (meth)acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth)acrylate, 3-hydroxypropyl (meth)acrylate, butoxydiethylene glycol (meth)acrylate, trifluoroethyl(meth)acrylate, perfluorooctyl ethyl (meth)acrylate, 2-hydroxy-3-phenoxypropyl (meth)acrylate, and the like.

Examples of a monomer that can form a (meth)acrylamide repeating unit include (meth)acrylamide, N-butyl(meth)acrylamide, N-p-hydroxyphenyl(meth)acrylamide, p-sulfamoylphenyl(meth)acrylamide, and the like.

Examples of a polyvalent carboxylic acid monomer that can form an ester repeating unit include terephthalic acid, 2,6-naphthalene dicarboxylic acid, and the like.

Examples of a diol monomer that can form a urethane repeating unit include alkylene diols, polyether diols, polyester diols, polycaprolactone diols such as PRACCELL series (PRACCELL 205U) manufactured by Daicel Corporation, polycarbonate diols such as ETERNACOLL series (UH, UM series) manufactured by Ube Industries, Ltd., polypropylene diols such as PPG series (PPG 300, PPG 700, PPG 1000) manufactured by Wako Pure Chemical Industries, Ltd., and the like.

Examples of a diisocyanate monomer that can form a urethane repeating unit include monomers having the following structures.

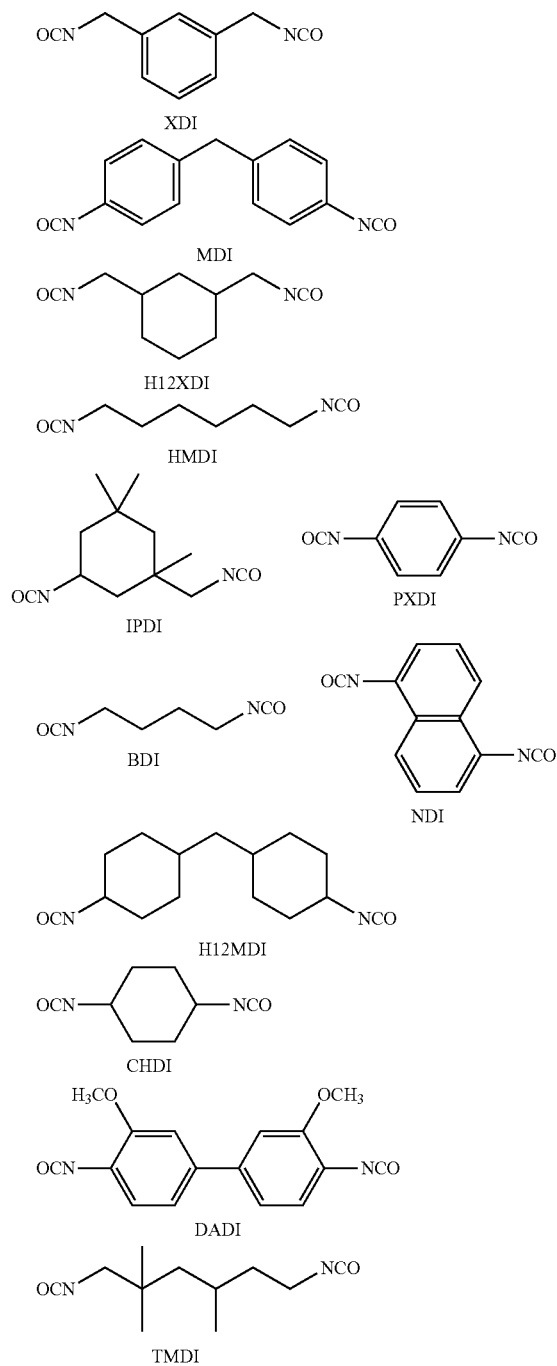

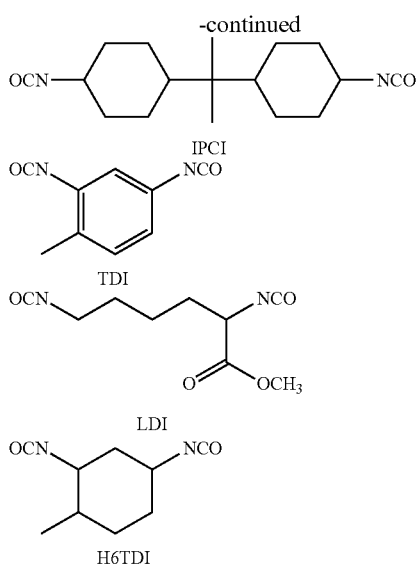

The (component A) may take (i) a form in which a group containing a silsesquioxane structure is possessed in the side chain; (ii) a form in which a group containing a silsesquioxane structure is possessed at a terminal of the main chain; or (iii) a form in which a group containing a silsesquioxane structure is possessed in the side chain and at the terminal of the main chain. Above all, a form in which the (component A) has a group containing a silsesquioxane structure in the side chain (the form of the above (i) or (iii)) is preferable.

Hereinafter, regarding each of the three forms that the (component A) may take (the (i) form in which a group containing a silsesquioxane structure is possessed in the side chain; the (ii) form in which a group containing a silsesquioxane structure is possessed at the terminal of the main chain, and the (iii) form in which a group containing a silsesquioxane structure is possessed in the side chain and at the terminal of the main chain), each of preferable structures is described in detail.

(i) Form in which a Group Containing a Silsesquioxane Structure is Possessed in the Side Chain Hereinafter, preferable structures of the form in which the (component A) has a group containing a silsesquioxane structure in a side chain thereof are described.

In a case of a form in which the (component A) has a group containing a silsesquioxane structure is possessed in a side chain thereof, the (component A) preferably has, as a main chain structure, a (meth)acrylate repeating unit or a urethane repeating unit (—NHCOO—), and more preferably a urethane repeating unit (—NHCOO—).

When the (component A) has a group containing a silsesquioxane structure in a side chain thereof, it is preferable that the (component A) has a structure represented by the following Formula (i-1).

Formula (i-1)

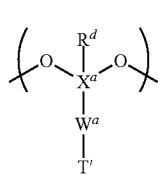

(In Formula (i-1), $X^a$ represents a residue obtained by removing four hydrogen atoms from a hydrocarbon having from 1 to 10 carbon atoms; $R^d$ represents a hydrogen atom or an alkyl group; $W^a$ represents a single bond or at least one group selected from the group consisting of —O—, —SiR$^e$$_2$—, and an alkylene group, wherein $R^e$ represents an alkyl group; and T' represents the following Formula (A-21).)

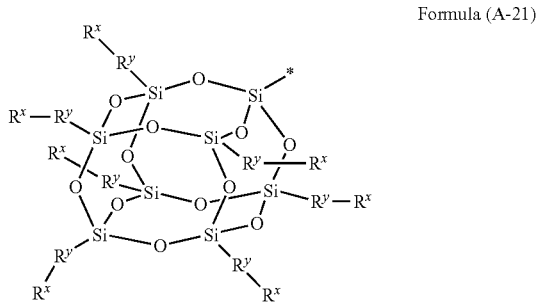

Formula (A-21)

(In Formula (A-21), $R^x$ represents a halogen atom, a cyano group, an —SH group, —PR$^a$$_2$, an amino group, an aryl group, or an alkyl group, wherein $R^a$ represents an aryl group; $R^y$ represents a single bond or at least one group selected from the group consisting of —COO—, an alkylene group, an arylene group, an alkyleneoxy group, —SO$_2$—, —SiR$^b$$_2$—, and —NH—, wherein $R^b$ represents an alkylene group or a halogen atom; respective $R^x$'s and respective $R^y$'s may be the same as or different from each other; and * represents a bonding site.)

$X^a$ in Formula (i-1) above represents a residue obtained by removing four hydrogen atoms from a hydrocarbon having from 1 to 10 carbon atoms. The hydrocarbon having from 1 to 10 carbon atoms may have a straight chain structure, a branched structure, or a cyclic structure. The hydrocarbon having from 1 to 10 carbon atoms may contain an —O— bond. The hydrocarbon preferably has from 2 to 6 carbon atoms, and particularly preferably from 3 to 9 carbon atoms. Specific examples thereof include residues obtained by removing two hydrogen atoms from an alkane such as propane, butane, pentane, cyclohexane, or the like.

$R^d$ in Formula (i-1) above represents a hydrogen atom or an alkyl group, and preferably represents a hydrogen atom.

The alkyl group represented by $R^d$ in Formula (i-1) above is preferably an alkyl group having from 1 to 10 carbon atoms, more preferably an alkyl group having from 1 to 5 carbon atoms, and particularly preferably an alkyl group having from 1 to 3 carbon atoms. The alkyl group may have a straight chain structure, a branched structure, or a cyclic structure, but the alkyl group preferably has a straight chain structure or a cyclic structure. Specific examples of the alkyl group include a methyl group, an ethyl group, a t-butyl group, and the like.

$W^a$ in Formula (i-1) above represents a single bond or at least one group selected from the group consisting of —O—, —SiR$^e$$_2$— ($R^e$ represents an alkyl group), and an alkylene group; and more preferably represents a single bond or a group obtained by combining —SiR$^e$$_2$— and —O—.

In $W^a$ in Formula (i-1) above, $R^e$ in —SiR$^e$$_2$— ($R^e$ represents an alkyl group) each preferably represent an alkyl group having from 1 to 10 carbon atoms, more preferably an alkyl group having from 1 to 5 carbon atoms, and particularly preferably an alkyl group having from 1 to 3 carbon atoms. The alkyl group may have a straight chain structure, a branched structure, or a cyclic structure. Specific examples of the alkyl group include a methyl group, an ethyl group, a t-butyl group, and the like.

The alkylene group in $W^a$ in Formula (i-1) above is an alkylene group having preferably from 1 to 20 carbon atoms, more preferably from 1 to 16 carbon atoms, and even more preferably from 1 to 12 carbon atoms. The alkylene group may have a straight chain structure, a branched structure, or a cyclic structure, but the alkylene group is preferably a cycloalkylene group. Specifically, $W^a$ may represent a methylene group, a cyclopropylene group, a cyclohexylene group, or the like, and particularly preferably represents a cyclohexylene group. These groups may have a substituent or may have no substituent, but it is preferable that these groups do not have a substituent.

$W^a$ in Formula (i-1) above may be a combination of at least one group selected from the group consisting of —O—, —SiR$^e$$_2$— ($R^e$ represents an alkyl group), and an alkylene group. As the combination of the above groups, a combination of —O— and —SiR$^e$$_2$— is preferable.

$R^x$ and $R^y$ in Formula (A-21) have the same definitions and the same preferable scopes as $R^x$ and $R^y$ in Formula (A-2) described above, respectively.

Specific examples (i-1-1) to (i-1-3) of the repeating unit represented by Formula (i-1) above are shown below, but it should be construed that the present invention is not limited thereto.

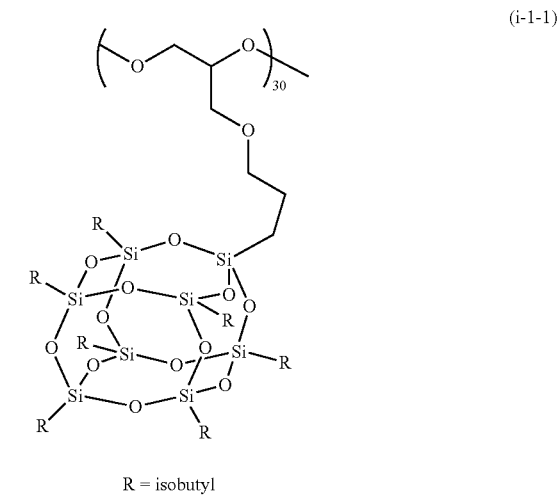

(i-1-1)

R = isobutyl

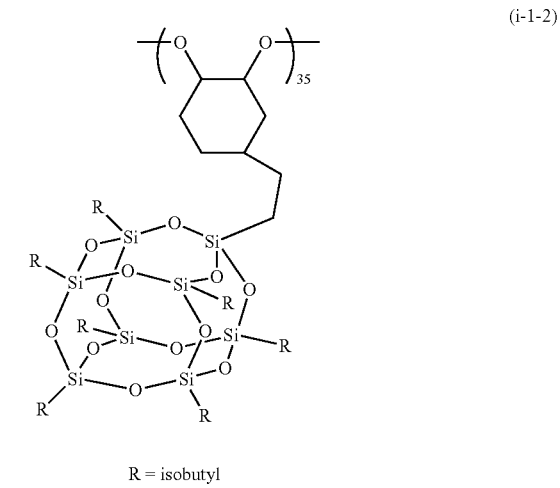

(i-1-2)

R = isobutyl

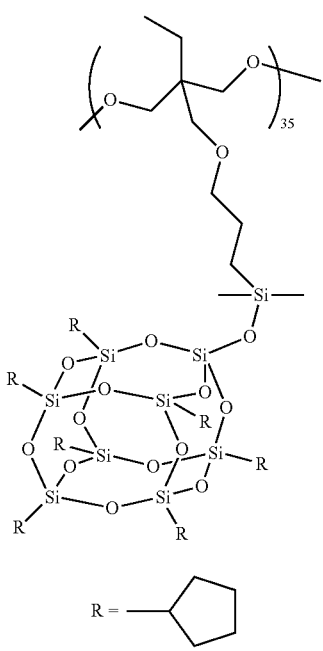

When the (component A) has a form in which a group containing a silsesquioxane structure is possessed in the side chain and has a repeating unit represented by Formula (i-1) above, the proportion of the repeating unit represented by Formula (i-1) is, for example, preferably from 5% by mass to 90% by mass, and more preferably from 20% by mass to 90% by mass, with respect to all constituent units (monomer).

When the (component A) has a group containing a silsesquioxane structure in a side chain thereof, it is preferable that the (component A) further has a structure represented by the following Formula (i-2).

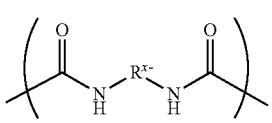

Formula (i-2)

(In Formula (i-2), $R^{x'}$ represents at least one group selected from the group consisting of an alkylene group and an arylene group.)

The alkylene group represented by $R^{x'}$ in Formula (i-2) is an alkylene group having preferably from 1 to 20 carbon atoms, more preferably from 1 to 16 carbon atoms, and even more preferably from 1 to 12 carbon atoms. The alkylene group may have a straight chain structure, a branched structure, or a cyclic structure, but the alkylene group is preferably a cycloalkylene group. Specifically, $R^{x'}$ may represent a methylene group, a cyclopropylene group, a cyclohexylene group, or the like, and particularly preferably represents a cyclohexylene group.

The arylene group represented by $R^{x'}$ in Formula (i-2) is preferably an arylene group having from 6 to 15 carbon atoms, and specific examples thereof include a phenylene group, a tolylene group, a naphthylene group, a biphenylene group, and the like.

$R^{x'}$ in Formula (i-2) may be a group obtained by combining an alkyl group and an arylene group. As a preferable combination of groups, a combination of an alkylene group having from 1 to 12 carbon atoms and an arylene group having from 6 to 15 carbon atoms is preferable. Specific examples include groups such as (i-2-a), (i-2-b), and (i-2-c) described below (* represents a bonding site.).

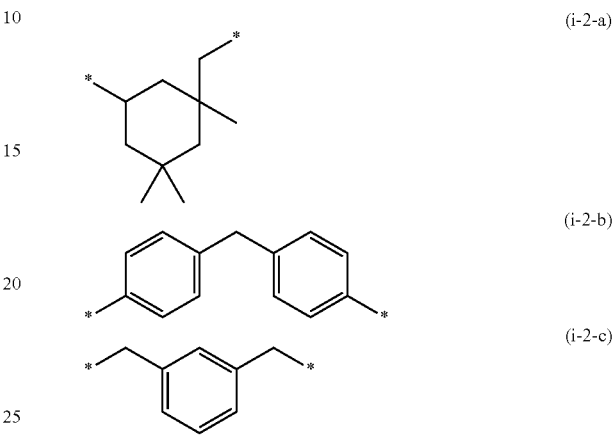

$R^{x'}$ in Formula (i-2) may have a substituent or may have no substituent, but it is preferable that $R^{x'}$ does not have a substituent.

Specific examples of the repeating unit represented by Formula (i-2) in the (component A) include (i-2-1) to (i-2-4) shown below, but the present invention is not limited to these specific examples.

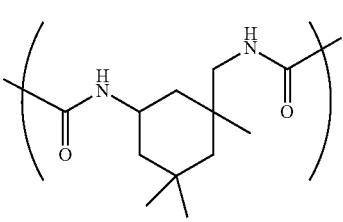

(i-2-1)

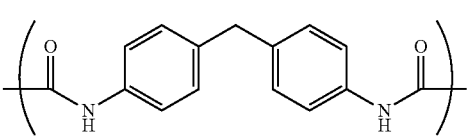

(i-2-2)

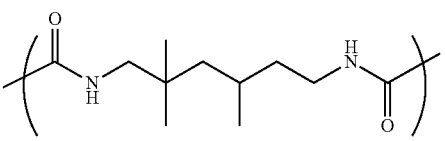

(i-2-3)

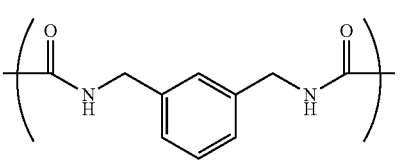

(i-2-4)

When the (component A) has a form in which a group containing a silsesquioxane structure is possessed in the side chain and has a repeating unit represented by Formula (i-2)

above, for example, the proportion of the repeating unit represented by Formula (i-2) is preferably from 10% by mass to 95% by mass, and more preferably from 30% by mass to 90% by mass, with respect to all constituent units (monomer) contained in the (component A).

Regarding the synthesis method of the form in which the (component A) has a group containing a silsesquioxane structure in a side chain thereof, the (component A) can be synthesized, for example, by allowing a monomer having a specific structure described above to perform a known polycondensation reaction such as a chain polymerization reaction, a polycondensation reaction, or the like.

For example, regarding the synthesis method of the (component A) in the case of having a (meth)acrylate repeating unit and having a group containing a silsesquioxane structure in the side chain, the (component A) can be synthesized by carrying out copolymerization using a monomer which contains a silsesquioxane structure and also has a radically polymerizable group and a monomer that gives the (meth)acrylate repeating unit.

(ii) Form in which a Group Containing a Silsesquioxane Structure is Possessed at the Terminal of the Main Chain Hereinafter, preferable structures of the form in which the (component A) has a group containing a silsesquioxane structure at the terminal of the main chain are described.

In a case of a form in which the (component A) has a group containing a silsesquioxane structure at a terminal of the main chain, it is preferable that the (component A) has, as the main chain structure, a (meth)acrylate repeating unit or a urethane repeating unit (—NHCOO—), and it is more preferable that the (component A) has a urethane repeating unit (—NHCOO—).

When the (component A) has a group containing a silsesquioxane structure at a terminal of the main chain, the group containing a silsesquioxane structure may be contained in at least either one of two terminals of the main chain structure, but may be contained at the two terminals, and is preferably contained at the two terminals of the main chain structure. Further, the terminal structure may be branched to have plural groups each containing a silsesquioxane structure. When the (component A) has a group containing a silsesquioxane structure at the terminal of the main chain, it is preferable that the (component A) has a structure represented by the following Formula (A-22) at the terminal of the main chain.

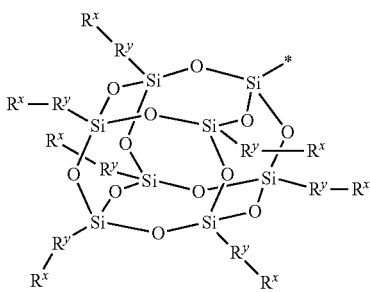

Formula (A-22)

(In Formula (A-22), $R^x$ represents a halogen atom, a cyano group, an —SH group, —$PR^a{}_2$, an amino group, an aryl group, or an alkyl group, wherein $R^a$ represents an aryl group; $R^y$ represents a single bond or at least one group selected from the group consisting of —COO—, an alkylene group, an arylene group, an alkyleneoxy group, —$SO_2$—, —$SiR^b{}_2$—, and —NH—, wherein $R^b$ represents an alkylene group or a halogen atom; respective $R^x$'s and respective $R^y$'s may be the same as or different from each other; and * represents a bonding site.)

$R^x$ and $R^y$ in Formula (A-22) have the same definitions and the same preferable scopes as $R^x$ and $R^y$ in Formula (A-2) described above, respectively.

When the (component A) has a group containing a silsesquioxane structure at the terminal of the main chain, it is preferable that the (component A) further has a structure represented by the following Formula (ii-1).

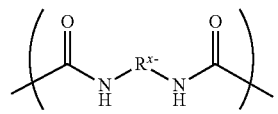

Formula (ii-1)

(In Formula (ii-1), $R^{x'}$ represents at least one group selected from the group consisting of an alkylene group and an arylene group.)

$R^{x'}$ in Formula (ii-1) has the same definition and the same preferable scope as $R^{x'}$ in Formula (i-2).

When the (component A) has a form in which a group containing a silsesquioxane structure is possessed at the terminal of the main chain and has a repeating unit represented by Formula (ii-1) above, for example, the proportion of the repeating unit represented by Formula (ii-1) is preferably from 10% by mass to 90% by mass, and more preferably from 15% by mass to 80% by mass, with respect to all constituent units (monomer).

Regarding the synthesis method of the form in which the (component A) has a group containing a silsesquioxane structure at the terminal of the main chain, the (component A) can be synthesized: by synthesizing a polymer by a known polycondensation or polyaddition reaction using urethane, (meth)acrylate, ester, or the like; then by allowing the polymer thus obtained to perform a termination reaction using a vinyl ether compound having an active hydrogen group or the like to synthesize a precursor; and then by further allowing the precursor to perform an addition reaction with a silsesquioxane compound having a thiol group, an amino group, or the like.

(iii) Form in which a Group Containing a Silsesquioxane Structure is Possessed in the Side Chain and at the Terminal of the Main Chain Hereinafter, preferable structures of the form in which the (component A) has a group containing a silsesquioxane structure in the side chain and at the terminal of the main chain are described.

In a case of a form in which the (component A) has a group containing a silsesquioxane structure in a side chain thereof and at a terminal of the main chain, the (component A) preferably has, as the main chain structure, a (meth)acrylate repeating unit or a urethane repeating unit (—NHCOO—), and more preferably a urethane repeating unit (—NHCOO—).

When the (component A) has a group containing a silsesquioxane structure in the side chain and at the terminal of the main chain, it is preferable that the (component A) has a structure that the main chain structure preferably has in the (i) form in which a group containing a silsesquioxane structure is possessed in the side chain, and that further has a group that the main chain structure preferably has, in the (ii) form in which a group containing a silsesquioxane structure is possessed at the terminal of the main chain.

More specifically, it is preferable that the (component A) has, as the main chain structure, a structure of Formula (i-1), and a group of Formula (A-22) as the main chain terminal structure.

When the (component A) has a group containing a silsesquioxane structure in the side chain and at the terminal of the main chain, the (component A) can be synthesized by using the synthesis method of the (i) form in which a group containing a silisesquioxane structure is possessed in the side chain, and the synthesis method of the (ii) form in which a group containing a silisesquioxane structure is possessed at the terminal of the main chain, in combination.

Hereinafter, specific examples (P-1) to (P-19) of the (component A) in the present invention are described by showing the structural units that form the polymer, the content thereof (molar ratio), and the weight average molecular weight. The (component A) according to the present invention is not limited to the following specific examples.

TABLE 1

| (Comp. A) | a | a' | b | c | Terminal Group | Wt. Avg. M.W. |
|---|---|---|---|---|---|---|
| (P-1) | | | | | | 32000 |
| (P-2) | | | | | | 26000 |

TABLE 1-continued

| (Comp. A) | a | a' | b | c | Terminal Group | Wt. Avg. M.W. |
|---|---|---|---|---|---|---|
| (P-3) | (isophorone diamide unit)₅₀ | | [O-CH(CH₃)CH₂-O]₁₇]₁₀ | [O-CH₂-CH(OR')-O]₄₀ where R' = -CH₂-CH₂-CH₂-POSS(R)₇, R = -CH₂-CH(CH₃)-CH₃ | | 15000 |

(Comp A): (Component A)
Wt. Avg. M.W.: Weight Average Molecular Weight

TABLE 2
| (Comp. A) | a | a' | b | c | Terminal Group | Wt. Avg. M.W. |
|---|---|---|---|---|---|---|
| (P-4) | 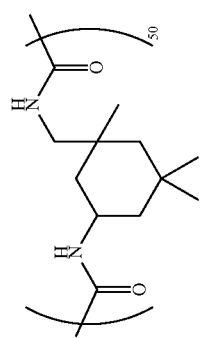 | |  | 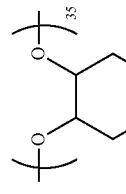 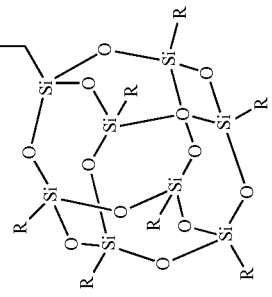 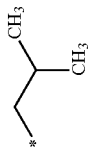 | | 48000 |

TABLE 2-continued
| (Comp. A) | a | a' | b | c | Terminal Group | Wt. Avg. M.W. |
|---|---|---|---|---|---|---|
| (P-5) | | | | | 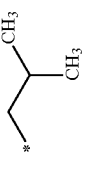 | 81000 |
(Comp. A): (Component A)
Wt. Avg. M.W.: Weight Average Molecular Weight

TABLE 3

| (Comp. A) | a | a' | b | c | Terminal Group | Wt. Avg. M.W. |
|---|---|---|---|---|---|---|
| (P-6) | | | | | | 12000 |

TABLE 3-continued
| (Comp. A) | a | a' | b | c | Terminal Group | Wt. Avg. M.W. |
|---|---|---|---|---|---|---|
| (P-7) | ![a] | ![a'] | ![b] | ![c] |  | 42000 |
(Comp. A: (Component A)
Wt. Avg. M.W.: Weight Average Molecular Weight

TABLE 4

| (Comp. A) | a | a' | b | c | Terminal Group | Wt. Avg. M.W. |
|---|---|---|---|---|---|---|
| (P-8) | ![structure a] | ![structure a'] | ![structure b] | ![structure c] | | 22000 |

TABLE 4-continued

| (Comp. A) | a | a' | b | c | Terminal Group | Wt. Avg. M.W. |
|---|---|---|---|---|---|---|
| (P-9) | | isophorone diamide unit | $\left(\text{O-R-O-C(O)-O-R-O}\right)_n$ , $n=100$; R = cyclohexyl-CH$_2$-cyclohexyl : —C$_6$H$_{12}$— = 3:1 | | POSS-S-propyl cage; R = CH$_2$CH(CH$_3$)CH$_3$ | 34000 |

(Comp. A): (Component A)
Wt. Avg. M.W. Weight Average Molecular Weight

TABLE 5
| (Comp. A) | a | a' | b | c | Terminal Group | Wt. Avg. M.W. |
|---|---|---|---|---|---|---|
| (P-10) | 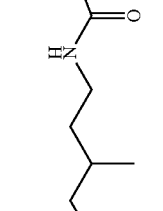 | 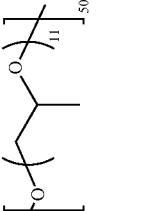 | 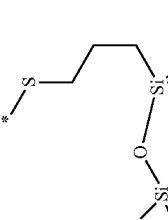 | | 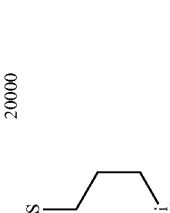 | 20000 |

TABLE 5-continued

| Comp. A) | a | a' | b | c | Terminal Group | Wt. Avg. M.W. |
|---|---|---|---|---|---|---|
| (P-11) | [structure with bis-phenyl diamide, m=50, n=50] | [ester-ether chain with subscript n] | [(—O—)m]100 | | [POSS cage with propylthio linker; R = isobutyl (CH2CH(CH3)2)] | 16000 | m = 50, n = 50

TABLE 5-continued

| Comp. (A) | a | a' | b | c | Terminal Group | Wt. Avg. M.W. |
|---|---|---|---|---|---|---|
| (P-12) | —(CH₂C(CH₃))₆₀—C(O)OMe | | —(CH₂C(CH₃))₄₀—C(O)O(CH₂)₃—[POSS-R₇]  R = CH₂CH(CH₃)CH₃ | | | 25000 |

TABLE 5-continued
| (Comp. A) | a | a' | b | c | Terminal Group | Wt. Avg. M.W. |
|---|---|---|---|---|---|---|
| (P-13) | 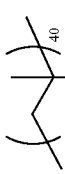 | | 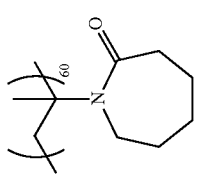 | 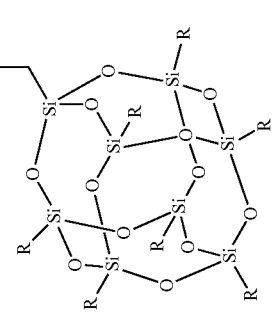 | | 23000 |
(Comp. A): (Component A)
Wt. Avg. M.W.: Weight Average Molecular Weight

TABLE 6

| (Comp. A) | a | a' | b | c |
|---|---|---|---|---|
| (P-14) | [structure: -(CH₂-C)₃₀- with COOMe] | [structure: -(CH₂-CH)₄₀- with phenyl] | | [structure: -(CH₂-C)₃₀- with COO-CH₂-CH(OH)-CH₂- POSS cage, R = cyclopentyl] |
| (P-15) | [structure: -(CH₂-CH)₃₀- with C(=O)-morpholine] | [structure: -(CH₂-CH)₇₀- with COO-butyl] | | |

| (Comp. A) | Terminal Group | Wt. Avg. M. W. |
|---|---|---|
| (P-14) | | 46000 |
| (P-15) | [structure: *–S–CH₂CH₂CH₂– POSS cage, R = isobutyl (*–CH₂–CH(CH₃)–CH₃)] | 41000 |

(Comp. A): (Component A)

Wt. Avg. M. W.: Weight Average Molecular Weight

TABLE 7
| (Comp. A) | a | a' | b | c | Terminal Group | Wt. Avg. M. W. |
|---|---|---|---|---|---|---|
| (P-16) | 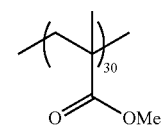 | | | 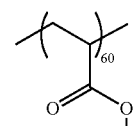 | 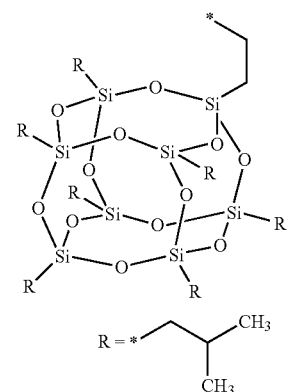 | 10000 |
| (P-17) |  | | | 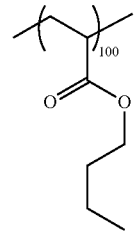 | 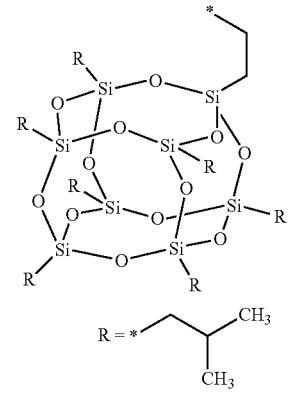 | 6000 |
(Comp. A): (Component A)
Wt. Avg. M. W.: Weight Average Molecular Weight
TABLE 8
| (Comp. A) | a | a' | b | c | Terminal Group | Wt. Avg. M. W. |
|---|---|---|---|---|---|---|
| (P-18) |  | | | 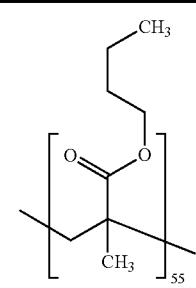 | 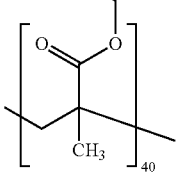 | 45000 |

TABLE 8-continued

| (Comp. A) | a | a' | b | c | Terminal Group | Wt. Avg. M. W. |
|---|---|---|---|---|---|---|
| (P-19) | | | | | | 48000 |

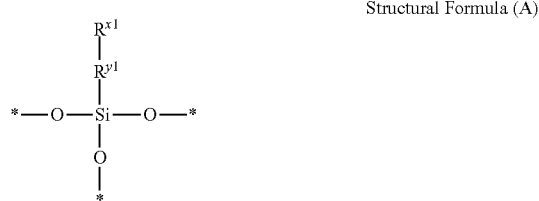

(Comp. A): (Composition A)
Wt. Avg. M. W.: Weight Average Molecular Weight

Hereinafter, (component A') a compound that does not have an ethylenically unsaturated double bond but has a silsesquioxane structure, and that has a molecular weight of 300 or more but less than 3,000, which is contained in the ink composition according to the second embodiment of the present invention, is described in detail.

((Component A') Compound that does not have an Ethylenically Unsaturated Double Bond but has a Silsesquioxane Structure, and that has a Molecular Weight of 300 or More but Less than 3,000)

The ink composition of the present invention includes (component A') a compound that does not have an ethylenically unsaturated double bond but has a silsesquioxane structure, and that has a molecular weight of 300 or more but less than 3,000, as an essential component.

The compound that has a silsesquioxane structure in the second embodiment of the present invention is not limited as long as the compound is a siloxane compound formed by a structure of $Si(O_{1/2})_3$ having a substituent. In the second embodiment of the present invention, the silsesquioxane structure may have any of a cage-like, a ladder-like, or a random type structure, and a cage-like silsesquioxane structure is more preferable. The "cage-like", "ladder-like", and "random type" indicate the structures described, for example, in "SILSESQUIOXANE ZAIRYO NO KAGAKU TO OYO TENKAI (Chemistry, Application and Development of Silsesquioxane Material)" (published by CMC) and the like.

It is preferable that the silsesquioxane structure in the second embodiment of the present invention is a structure represented by the following Structural Formula (A).

Structural Formula (A)

$$*-O-\underset{\underset{*}{\overset{O}{|}}}{\overset{R^{x1}}{\underset{|}{Si}}}-O-*$$

(In Structural Formula (A), $R^{x1}$ represents a halogen atom, a cyano group, a thiol group, $—PR^{a1}_2$, $—SiR^c_3$, an amino group, an aryl group, or an alkyl group, wherein $R^{a1}$ represents an aryl group and $R^c$ represents an alkyl group; $R^{y1}$ represents a single bond, —COO—, an alkylene group, an arylene group, an alkyleneoxy group, $—SO_2—$, —O—, $—SiR^{b1}_2—$, or an —NH— group, wherein $R^{b1}$ represents an alkyl group; and * represents a bonding site.)

When $R^{x1}$ in Structural Formula (A) above represents a halogen atom, examples of the halogen atom include F, Cl, Br, I, and the like. Note that, when $R^{x1}$ represents a halogen atom, a combination with $R^{y1}$ that represents a single bond, —COO—, $—SO_2—$, or —NH— does not exist.

When $R^{x1}$ in Structural Formula (A) above represents $—PR^{a1}_2$ ($R^{a1}$ represents an aryl group), $R^{a1}$ preferably represents an aryl group having from 6 to 20 carbon atoms, more preferably an aryl group having from 6 to 16 carbon atoms, and particularly preferably an aryl group having from 6 to 10 carbon atoms. Specific examples of the aryl group include a phenyl group, a naphthyl group, and the like. Respective $R^{a1}$'s may be the same as or different from each other. When $R^{x1}$ represents $—PR^{a1}_2$ ($R^{a1}$ represents an aryl group), a combination with $R^{y1}$ that represents a single bond, —COO—, $—SO_2—$, or —NH— does not exist.

When $R^{x1}$ in Structural Formula (A) above represents $—SiR^c_3$ ($R^c$ represents an alkyl group), $R^c$ preferably represents an alkyl group having from 1 to 10 carbon atoms, and particularly preferably an alkyl group having from 1 to 8 carbon atoms. The alkyl group may have a straight chain structure, a branched structure, or a cyclic structure. Specific examples of the alkyl group include a methyl group and the like. Respective $R^c$'s may be the same as or different from each other.

When $R^{x1}$ in Structural Formula (A) above represents an amino group, the amino group may be any of a primary amino group, a secondary amino group, or a ternary amino group, and is represented by, for example, $—NH_2$, $—NHR^3$, $—NR^3_2$ ($R^3$ represents a substituent), or the like. The substituents of the amino group, each represented by $R^3$, may be different from each other, and examples thereof include a straight-chain or branched alkyl group having from 1 to 8 carbon atoms (preferably from 1 to 4 carbon atoms), an aryl group having from 6 to 20 carbon atoms (preferably, a phenyl group), and the like. Specific examples of the amino group include a primary amino group, a dimethylamino group, and the like. These groups may have a substituent or may have no substituent, but it is preferable that these groups do not have a substituent. When $R^{x1}$ represents an amino group, a combination with $R^{y1}$ that represents a single bond, —COO—, —SO$_2$—, or —NH— does not exist.

When $R^{x1}$ in Structural Formula (A) represents an aryl group, the aryl group is preferably an aryl group having from 6 to 20 carbon atoms, more preferably an aryl group having from 6 to 16 carbon atoms, and particularly preferably an aryl group having from 6 to 10 carbon atoms. Specific examples of the aryl group include a phenyl group, a naphthyl group, and the like; and a phenyl group is particularly preferable. These groups may have a substituent or may have no substituent, but it is preferable that these groups do not have a substituent.

When $R^{x1}$ in Structural Formula (A) represents an alkyl group, the alkyl group is preferably an alkyl group having from 1 to 10 carbon atoms, more preferably an alkyl group having from 1 to 8 carbon atoms, and even more preferably an alkyl group having from 3 to 8 carbon atoms. The alkyl group may have a straight chain structure, a branched structure, or a cyclic structure, but a chain-like alkyl group is preferable, and a chain-like alkyl group having from 3 to 8 carbon atoms is particularly preferable. An epoxy group may be included in the chain-like or cyclic alkyl group. Here, in a case in which an epoxy group is included, the two carbon atoms that form the epoxy group are included in the number of carbon atoms described above. Specific examples of the alkyl group include a 3,4-epoxy-cylcohexyl group, a glycidyl group, a methyl group, an ethyl group, an isobutyl group, an isooctyl group, a t-butyl group, and the like; and an isobutyl group and an isooctyl group are particularly preferable. These groups may have a substituent or may have no substituent, but it is preferable that these groups do not have a substituent.

$R^{x1}$ in Structural Formula (A) preferably represents an aryl group, an alkyl group, a thiol group, or an amino group, more preferably an alkyl group or an aryl group, and particularly preferably an aryl group having from 6 to 10 carbon atoms or a chain-like alkyl group having from 3 to 8 carbon atoms.

When $R^{y1}$ in Structural Formula (A) represents an alkylene group, the alkylene group has preferably from 1 to 10 carbon atoms, more preferably from 1 to 6 carbon atoms, and particularly preferably from 1 to 3 carbon atoms. Specific examples of the alkylene group include a methylene group and the like. These groups may have a substituent or may have no substituent, but it is preferable that these groups do not have a substituent.

When $R^{y1}$ in Structural Formula (A) represents an arylene group, the arylene group has preferably from 6 to 18 carbon atoms, more preferably from 6 to 14 carbon atoms, and particularly preferably from 6 to 10 carbon atoms. Specific examples of the arylene group include a phenylene group and the like. These groups may have a substituent or may have no substituent, but it is preferable that these groups do not have a substituent.

When $R^{y1}$ in Structural Formula (A) represents an alkyleneoxy group (—R$^4$—O—, wherein R$^4$ represents an alkylene group), the alkyleneoxy group has preferably from 1 to 10 carbon atoms, more preferably from 1 to 6 carbon atoms, and particularly preferably from 1 to 3 carbon atoms. Specific examples of the alkyleneoxy group include an ethoxy group and the like. These groups may have a substituent or have no substituent. The alkyleneoxy group may bond to the Si in Structural Formula (A) in either direction of —R$^4$—O— or —O—R$^4$— (** represents a bonding site.).

When $R^{y1}$ in Structural Formula (A) represents —SiR$^{b1}_2$— (R$^{b1}$ represents an alkyl group), R$^{b1}$ has preferably from 1 to 10 carbon atoms, more preferably from 1 to 6 carbon atoms, and particularly preferably from 1 to 3 carbon atoms. Specific examples of the alkyl group include a methyl group and the like. These groups may have a substituent or may have no substituent, but it is preferable that these groups do not have a substituent.

$R^{y1}$ in Structural Formula (A) preferably represents a single bond, an alkylene group, or an arylene group, and more preferably a single bond.

In Structural Formula (A), a combination in which $R^{x1}$ represents a thiol group, a —PR$^{a1}_3$ group, an —SiR$^c_3$ group, an alkyl group, or an aryl group and $R^{y1}$ represents an alkylene group, an alkyleneoxy group, or a single bond is preferable, and a combination in which $R^{x1}$ represents an alkyl group or an aryl group and $R^{y1}$ represents a single bond is particularly preferable.

It is preferable that the compound having a silsesquioxane structure represented by Structural Formula (A) above is a compound represented by the following Formula (A'-1).

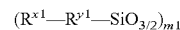   Formula (A'-1)

(In Formula (A'-1), $R^{x1}$ represents a halogen atom, a cyano group, a thiol group, —PR$^{a1}_2$, an amino group, an aryl group, or an alkyl group, wherein R$^{a1}$ represents an aryl group; $R^{y1}$ represents a single bond, —COO—, an alkylene group, an arylene group, an alkyleneoxy group, —SO$_2$—, —O—, —SiR$^{b1}_2$—, or an —NH— group, wherein R$^{b1}$ represents an alkyl group; respective $R^{x1}$'s and respective $R^{y1}$'s may be the same as or different from each other; and m1 represents an integer of from 6 to 10.)

$R^{x1}$ in Formula (A'-1) has the same definition and the same preferable scope as $R^{x1}$ in Structural Formula (A) described above.

$R^{y1}$ in Formula (A'-1) has the same definition and the same preferable scope as $R^{y1}$ in Structural Formula (A) described above.

In Formula (A'-1) above, a combination in which $R^{x1}$ represents a thiol group, a —PR$^{a1}_3$ group, a —SiR$^c_3$ group, an alkyl group, or an aryl group and $R^{y1}$ represents an alkylene group, an alkyleneoxy group, or a single bond is preferable, and a combination in which $R^{x1}$ represents an alkyl group or an aryl group and $R^{y1}$ represents a single bond is particularly preferable.

In Formula (A'-1) above, m1 represents an integer of from 6 to 10, and m1 preferably represents 8. In the case of m=8, the (component A') is represented by the structure of the following Formula (A'-2).

The compound having a silsesquioxane structure represented by Structural Formula (A) above is preferably a compound represented by the following Formula (A'-2).

Formula (A'-2)

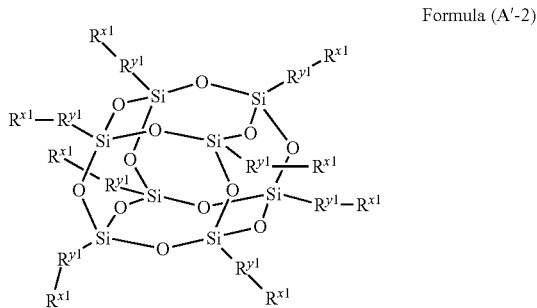

(In Formula (A'-2), $R^{x1}$ represents a halogen atom, a cyano group, a thiol group, $—PR^{a1}{}_2$, $—SiR^c{}_3$, an amino group, an aryl group, or an alkyl group, wherein $R^{a1}$ represents an aryl group and $R^c$ represents an alkyl group; $R^{y1}$ represents a single bond, —COO—, an alkylene group, an arylene group, an alkyleneoxy group, —SO$_2$—, —O—, —SiR$^{b1}{}_2$—, or an —NH— group, wherein $R^{b1}$ represents an alkyl group; and respective $R^{x1}$'s and respective $R^{y1}$'s may be the same as or different from each other.)

$R^{x1}$ in Formula (A'-2) has the same definition and the same preferable scope as $R^{x1}$ in Structural Formula (A) described above.

$R^{y1}$ in Formula (A'-2) has the same definition and the same preferable scope as $R^{y1}$ in Structural Formula (A) described above.

In Formula (A'-2) above, a combination in which $R^{x1}$ represents a thiol group, a $—PR^{a1}{}_3$ group, a $—SiR^c{}_3$ group, an alkyl group, or an aryl group and $R^{y1}$ represents an alkylene group, an alkyleneoxy group, or a single bond is preferable, and a combination in which $R^{x1}$ represents an alkyl group or an aryl group and $R^{y1}$ represents a single bond is particularly preferable.

The content of the (component A') with respect to the total amount of the ink composition according to the second embodiment of the present invention is preferably from 0.1% by mass to 20% by mass, more preferably from 0.5% by mass to 5% by mass, and particularly preferably from 1% by mass to 5% by mass.

A molecular weight of the (component A') in the second embodiment of the present invention is 300 or more but less than 3000, preferably from 300 to 2500, more preferably from 600 to 2000, and particularly preferably from 800 to 1400.

Specific examples of the (component A') in the second embodiment of the present invention include (A-1-1) to (A-1-17); however, it should be construed that the present invention is not limited to these specific examples.

(A-1-1)

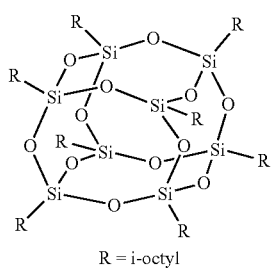

R = i-octyl (A-1-3)

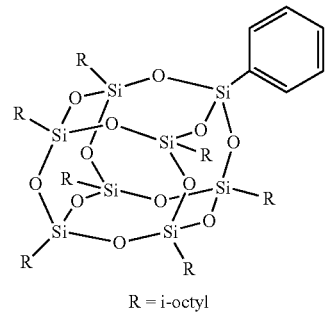

R = i-octyl (A-1-2)

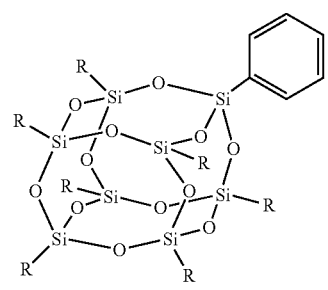

R = i-butyl (A-1-4)

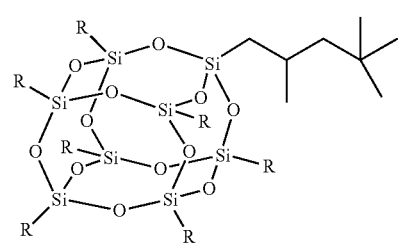

R = phenyl (A-1-5)

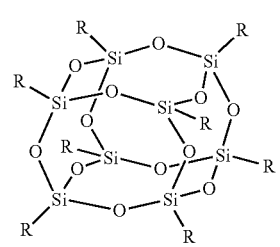

R = i-butyl (A-1-6)

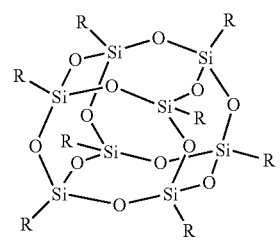

R = phenyl (A-1-7)
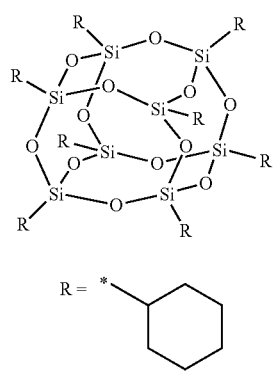
R = *—cyclohexyl
(A-1-8)
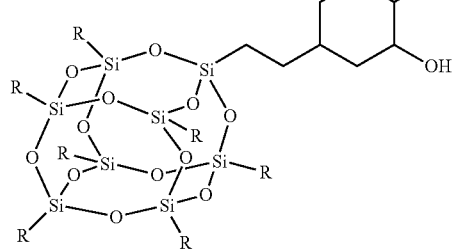
R = i-butyl
(A-1-9)
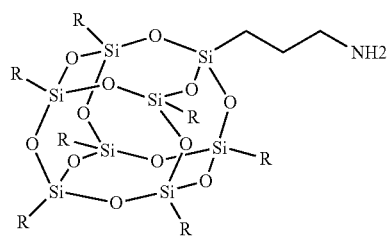
R = i-butyl
(A-1-10)
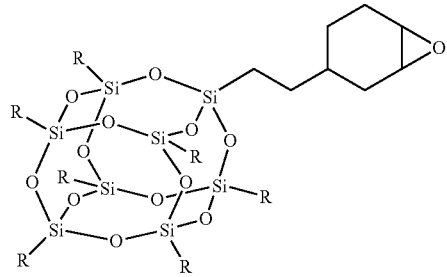
R = i-butyl
(A-1-11)
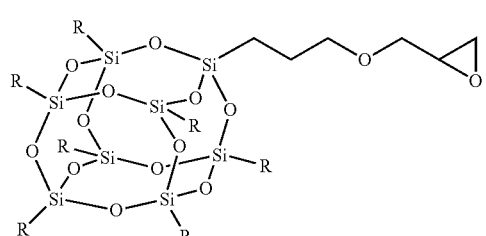
R = i-butyl
(A-1-12)
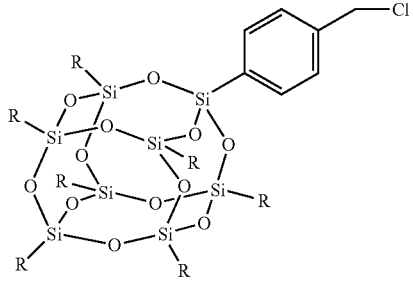
R = i-butyl
(A-1-13)
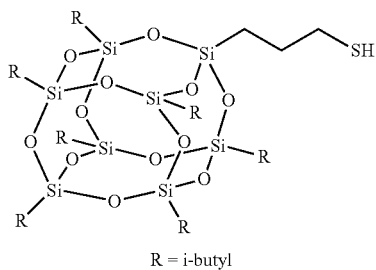
R = i-butyl
(A-1-14)
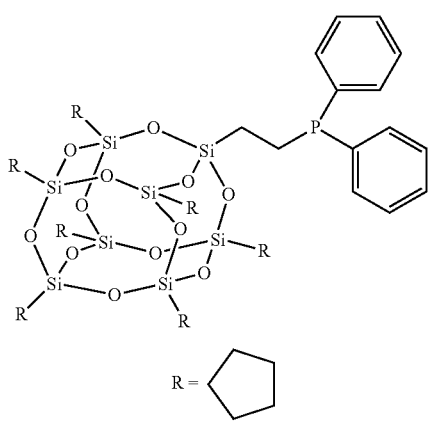
R = cyclopentyl
(A-1-15)
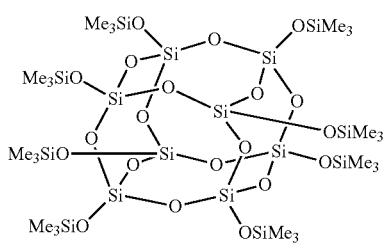
(A-1-16)
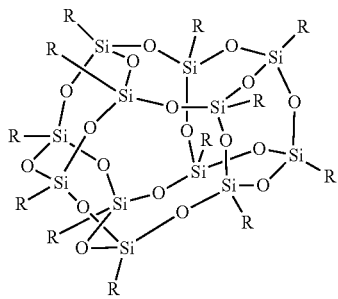
R = phenyl

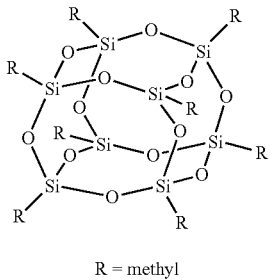

(A-1-17)

R = methyl

As the (component A') in the second embodiment of the present invention, for example, known compounds and the like, such as SILSESQUIOXANE (total condensation series) manufactured by Sigma Aldrich Japan K.K. or SILSESQUIOXANE series manufactured by Hybrid Plastics Inc., can be used. Further, known compounds can be appropriately synthesized by a synthesis method and used.

Hereinafter, (component B) a monofunctional polymerizable compound in the ink composition according to the first embodiment of the present invention is described in detail.

((Component B) Monofunctional Polymerizable Compound)

The ink composition according to the first embodiment of the present invention includes (component B) a monofunctional polymerizable compound, as an essential component.

The monofunctional polymerizable compound used in the ink composition according to the first embodiment of the present invention is not limited as long as the compound is a polymerizable compound having one polymerizable group.

The monofunctional polymerizable compound used in the ink composition according to the first embodiment of the present invention may be either a radically polymerizable compound or a cationically polymerizable compound, but a radically polymerizable compound is preferred, and examples thereof include a compound having an ethylenically unsaturated bond. More specifically, it is enough that the monofunctional polymerizable compound is a compound having, in a molecule thereof, at least one ethylenically unsaturated bond that is radically polymerizable.

Examples of the monofunctional polymerizable compound having an ethylenically unsaturated bond that is radically polymerizable include unsaturated carboxylic acids such as acrylic acid, methacrylic acid, itaconic acid, crotonic acid, isocrotonic acid, and maleic acid; unsaturated carboxylate esters and salts thereof; anhydrides having an ethylenically unsaturated group; acrylonitrile, styrene, and the like. Further, examples include macromonomers of various unsaturated polyesters, unsaturated polyethers, unsaturated polyamides, unsaturated polyurethanes or the like.

Preferable examples of such a monofunctional compound include (meth)acrylate compounds such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate, N-methylolacrylamide, diacetoneacrylamide, epoxy acrylate, isobornyl acrylate, dicyclopentenyl acrylate, dicyclopentenyloxyethyl acrylate, dicyclopentanyl acrylate, 2-hydroxy-3-phenoxypropyl acrylate, 2-acryloyloxyethyl phthalate, methoxypolyethylene glycol acrylate, 2-acryloyloxyethyl-2-hydroxyethyl phthalate, cyclic trimethylolpropane formal acrylate, 2-(2-ethoxyethoxy)ethyl acrylate, 2-methoxyethyl acrylate, 3-methoxybutyl acrylate, ethoxylated phenyl acrylate, 2-acryloyloxyethyl succinate, nonylphenol EO adduct acrylate, phenoxy-polyethylene glycol acrylate, 2-acryloyloxyethyl hexahydrophthalate, lactone-modified acrylate, stearyl acrylate, isoamyl acrylate, isomyristyl acrylate, isostearyl acrylate, and lactone-modified acrylate; methacrylate compounds such as methyl methacrylate, n-butyl methacrylate, allyl methacrylate, glycidyl methacrylate, benzyl methacrylate, and dimethylaminomethyl methacrylate; allyl compounds such as allyl glycidyl ether; (meth)acrylamide compounds such as (meth)acrylamide, N-methyl(meth)acrylamide, N-ethyl (meth)acrylamide, N-propyl (meth)acrylamide, N-isopropyl (meth)acrylamide, N-butyl (meth)acrylamide, N-sec-butyl (meth)acrylamide, N-tert-butyl (meth)acrylamide, N-cyclohexyl (meth)acrylamide, N-phenyl (meth)acrylamide, N,N-dimethyl (meth)acrylamide, 1-(meth)acryloyl pyrrolidine, N-methylol (meth)acrylamide, N-methoxyethyl (meth)acrylamide, N-(2-hydroxyethyl) (meth)acrylamide, N-[3-(dimethylamino)propyl] (meth)acrylamide, N-(1,1-dimethyl-3-oxobutyl) (meth)acrylamide, and 4-acryloylmorpholine; and the like.

Preferable examples further include monofunctional vinyl ether compounds. Specific examples of the monofunctional vinyl ether compounds include methyl vinyl ether, ethyl vinyl ether, n-propyl vinyl ether, isopropyl vinyl ether, n-butyl vinyl ether, isobutyl vinyl ether, t-butyl vinyl ether, n-octadecyl vinyl ether, 2-ethylhexyl vinyl ether, n-nonyl vinyl ether, dodecyl vinyl ether, octadecyl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, phenoxypolyethylene glycol vinyl ether, cyclohexanedimethanol monovinyl ether, isopropenyl ether-o-propylene carbonate, and the like.

In addition, preferable examples further include N-vinyl compounds such as N-vinyl lactams and N-vinyl formamides. Preferable examples of N-vinyl lactams include those represented by the following formula.

Formula (V')

In Formula (V') above, m represents an integer of from 1 to 5; it is preferable that m represents an integer of from 2 to 4; it is more preferable that m represents 2 or 4; and it is particularly preferable that m represents 4, namely, N-vinylcaprolactam is particularly preferable.

The monofunctional polymerizable compound in the invention preferably includes an N-vinyl compound or (meth)acrylate.

The monofunctional radically polymerizable monomer according to the present invention is preferably used in a combination. A preferable combination is a combination of an acrylate compound, an N-vinyl compound, and a (meth) acrylamide compound.

In the case of using the compounds in combination, the ratio (mass ratio) of the two compounds may be, for example, acrylate compound: n-vinyl compound=approximately from 10 to 90: from 90 to 10, and preferably approximately from 30 to 70: from 70 to 30.

—Cationic Polymerizable Compound—

Examples of the monofunctional polymerizable compound which can be used in the first embodiment of the present invention further include a cationic polymerizable compound. The cationic polymerizable compound is not particularly limited as long as the compound is a compound which causes a polymerization reaction by an acid generated from a photoacid generator and is cured, and various known cationic polymerizable compounds known as a photo cationic polymerizable compound may be used. Examples of the cationic polymerizable compound include an epoxy compound, an oxetane compound, and the like.

Examples of a monofunctional epoxy compound which can be used in the first embodiment of the present invention include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxydodecane, epichlorohydrin, 1,2-epoxydecane, styrene oxide, cyclohexene oxide, 3-methacryloyloxymethylcyclohexene oxide, 3-acryloyloxymethylcyclohexene oxide, 3-vinylcyclohexene oxide, and the like.

A molecular weight of the (component B) monofunctional polymerizable compound in the first embodiment of the present invention is preferably from 130 to 3000, and more preferably from 130 to 500.

The content of the (component B) monofunctional polymerizable compound with respect to all polymerizable compounds (total content of the monofunctional polymerizable compounds and polyfunctional polymerizable compounds which may be added as necessary) in the ink composition according to the first embodiment of the present invention is preferably from 50% by mass to 100% by mass, more preferably from 75% by mass to 100% by mass, and particularly preferably from 90% by mass to 100% by mass.

The content of the (component B) monofunctional polymerizable compound in the ink composition according to the first embodiment of the present invention is preferably 50% by mass or more, more preferably from 50% by mass to 95% by mass, and particularly preferably from 60% by mass to 90% by mass.

(Polyfunctional Polymerizable Compound)

The ink composition according to the first embodiment of the present invention may have a polyfunctional polymerizable compound. The polyfunctional polymerizable compound which may be used in the ink composition according to the first embodiment of the present invention is not limited as long as the compound is a polymerizable compound having two or more polymerizable groups.

Examples of a polyfunctional compound that is radically polymerizable include acrylate compounds such as bis(4-acryloxypolyethoxyphenyl)propane, tripropylene glycol diacrylate, polyethylene glycol diacrylate, polypropylene glycol diacrylate, dipentaerythritol tetraacrylate, trimethylolpropane (PO modified) triacrylate, oligoester acrylate, neopentyl glycol hydroxypivalate diacrylate, tetramethylol methane triacrylate, dimethyloltricyclodecane diacrylate, modified glycerin triacrylate, bisphenol A diglycidyl ether acrylic acid adduct, modified bisphenol A diacrylate, PO adducted bisphenol A diacrylate, EO adducted bisphenol A diacrylate, dipentaerythritol hexaacrylate, propylene glycol diglycidyl ether acrylic acid adduct, and ditrimethylolpropane tetraacrylate; methacrylate compounds such as polyethylene glycol dimethacrylate, polypropylene glycol dimethacrylate, and 2,2-bis(4-methacryloxypolyethoxyphenyl) propane; and the like. In addition, examples further include allyl compounds such as diallyl phthalate and triallyl trimeritate. Here, "PO" denotes propylene oxide, and "EO" denotes ethylene oxide. More specifically, commercially available products described in "KAKYOZAI HANDBOOK (Crosslinking Agent Handbook)", edited by Shinzo Yamashita, (Taiseisha, 1981); "UV•EB KOKA HANDBOOK (GENRYO HEN) (UV•EB Curing Handbook (Raw Materials Part))", edited by Kiyoshi Kato (Kobunshi Kankoukai, 1985); "UV•EB KOKA GIJUTSU NO OYO TO SHIJO (Application and Market of UV•EB Curing Technology)", edited by Rad Tech Kenkyu Kai, page 79, (CMC, 1989); "POLYESTER JUSHI HANDBOOK (Polyester Resin Handbook)", written by Eiichiro Takiyama, (The Nikkan Kogyo Shimbun Ltd., 1988), and the like, or radically polymerizable or crosslinkable compounds known in the art may be used.

Further, examples include polyfunctional vinyl ethers. Examples of the polyfunctional vinyl ethers include divinyl ethers such as ethylene glycol divinyl ether, diethylene glycol divinyl ether, triethylene glycol divinyl ether, polyethylene glycol divinyl ether, propylene glycol divinyl ether, dipropylene glycol divinyl ether, butylene glycol divinyl ether, butanediol divinyl ether, hexanediol divinyl ether, cyclohexanedimethanol divinyl ether, bisphenol A alkylene oxide divinyl ether, and bisphenol F alkylene oxide divinyl ether; polyfunctional vinyl ethers such as trimethylolethane trivinyl ether, trimethylolpropane trivinyl ether, di(trimethylolpropane)tetravinyl ether, glycerin trivinyl ether, pentaerythritol tetravinyl ether, di(pentaerythritol)pentavinyl ether, di(pentaerythritol) hexavinyl ether, ethylene oxide adducted trimethylolpropane trivinyl ether, propylene oxide adducted trimethylolpropane trivinyl ether, ethylene oxide adducted di(trimethylolpropane)tetravinyl ether, propylene oxide adducted di(trimethylolpropane)tetravinyl ether, ethylene oxide adducted pentaerythritol tetravinyl ether, propylene oxide adducted pentaerythritol tetravinyl ether, ethylene oxide adducted di(pentaerythritol) hexavinyl ether, and propylene oxide adducted di(pentaerythritol) hexavinyl ether; and the like.

Further, as the polyfunctional polymerizable compound that is radically polymerizable, for example, actinic energy ray curing type polymerizable compounds which are used for photopolymerizable compositions described in JP-A No. 7-159983, Japanese Patent Application Publication (JP-B) No. 7-31399, JP-A No. 8-224982, JP-A No. 10-863, JP-A No. 9-134011, Japanese National Phase Publication No. 2004-514014, and the like are known and these are also usable for the ink composition of the present invention.

Further, examples of a polyfunctional epoxy compound as the cationically polymerizable compound include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resin, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexanecarboxylate, 2-(3,4-epoxycyclohexyl-5,5-spiro-3,4-epoxy) cyclohexane-meta-dioxane, bis(3,4-epoxycyclohexylmethyl) adipate, vinylcyclohexene oxide, 4-vinylepoxycyclohexane, bis(3,4-epoxy-6-methylcyclohexylmethyl) adipate, 3,4-epoxy-6-methylcyclohexyl-3',4'-epoxy-6'-methylcyclohexanecarboxylate, methylenebis(3,4-epoxycyclohexane), dicyclopentadiene diepoxide, di(3,4-epoxycyclohexylmethyl)ether of ethylene glycol, ethylenebis(3,4-epoxycyclohexanecarboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,1,3-tetradecadiene dioxide, limonene dioxide, 1,2,7,8-diepoxyoctane, 1,2,5,6-diepoxycyclooctane, and the like.

A molecular weight of the polyfunctional polymerizable compound is preferably from 130 to 3000, and more preferably from 130 to 500, in terms of molecular weight.

In a case in which the ink composition according to the first embodiment of the present invention includes a polyfunctional polymerizable compound, the content of the polyfunctional polymerizable compound with respect to all the polymerizable compounds is preferably from 0.1% by mass to 50% by mass, more preferably from 1% by mass to 20% by mass, and particularly preferably from 1% by mass to 5% by mass.

Hereinafter, (component B') a monofunctional polymerizable compound in the ink composition according to the second embodiment of the present invention is described in detail.

((Component B') Monofunctional Polymerizable Compound)

The ink composition according to the second embodiment of the present invention includes (component B') a monofunctional polymerizable compound, as an essential component, and it is essential that a content of the (component B') monofunctional polymerizable compound with respect to a total content of all polymerizable compounds in the ink composition is 80% by mass or more.

The content of the (component B') monofunctional polymerizable compound with respect to all polymerizable compounds in the ink composition according to the second embodiment of the present invention is 80% by mass or more, preferably from 80% by mass to 99% by mass, and more preferably from 95% by mass to 99% by mass. Here, the "all polymerizable compounds in the second embodiment of the present invention" refers to a total content of the (component B') monofunctional polymerizable compounds and polyfunctional polymerizable compounds (described below) which may be added as needs arise.

The monofunctional polymerizable compound used in the ink composition according to the second embodiment of the present invention is not limited as long as the compound is a polymerizable compound having one polymerizable group.

The monofunctional polymerizable compound used in the ink composition according to the second embodiment of the present invention is preferably a radically polymerizable compound, and examples thereof include a compound having an ethylenically unsaturated bond that is radically polymerizable. More specifically, it is enough that the monofunctional polymerizable compound is a compound having, in a molecule thereof, at least one ethylenically unsaturated bond that is radically polymerizable.

Examples of a polymerizable monomer having an ethylenically unsaturated bond that is radically polymerizable include unsaturated carboxylic acids such as acrylic acid, methacrylic acid, itaconic acid, crotonic acid, isocrotonic acid, or maleic acid, unsaturated carboxylate esters, and salts thereof; anhydrides having an ethylenically unsaturated group; acrylonitrile; styrene, and the like. Further, examples include macromonomers of various unsaturated polyesters, unsaturated polyethers, unsaturated polyamides, unsaturated polyurethanes, and the like.

Preferable examples of such a monofunctional compound include acrylate compounds such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate, epoxy acrylate, isobornyl acrylate, dicyclopentenyl acrylate, dicyclopentenyloxyethyl acrylate, dicyclopentanyl acrylate, 2-hydroxy-3-phenoxypropyl acrylate, 2-acryloyloxyethyl phthalate, methoxypolyethylene glycol acrylate, 2-acryloyloxyethyl-2-hydroxyethyl phthalate, cyclic trimethylolpropane formal acrylate, 2-(2-ethoxyethoxy)ethyl acrylate, 2-methoxyethyl acrylate, 3-methoxybutyl acrylate, ethoxylated phenyl acrylate, 2-acryloyloxyethyl succinate, nonylphenol EO adduct acrylate, phenoxy-polyethylene glycol acrylate, 2-acryloyloxyethyl hexahydrophthalate, lactone-modified acrylate, stearyl acrylate, isoamyl acrylate, isomyristyl acrylate, isostearyl acrylate, and lactone-modified acrylate; methacrylate compounds such as methyl methacrylate, n-butyl methacrylate, allyl methacrylate, glycidyl methacrylate, benzyl methacrylate, and dimethylaminomethyl methacrylate; allyl compounds such as allyl glycidyl ether, and the like.

Preferable examples further include monofunctional vinyl ether compounds. Specific examples of the monofunctional vinyl ether compounds include methyl vinyl ether, ethyl vinyl ether, n-propyl vinyl ether, isopropyl vinyl ether, n-butyl vinyl ether, isobutyl vinyl ether, t-butyl vinyl ether, n-octadecyl vinyl ether, 2-ethylhexyl vinyl ether, n-nonyl vinyl ether, dodecyl vinyl ether, octadecyl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, phenoxypolyethylene glycol vinyl ether, cyclohexanedimethanol monovinyl ether, isopropenyl ether-O-propylene carbonate, and the like.

Moreover, preferable examples include (meth)acrylamide compounds. Preferable examples of (meth)acrylamides include those represented by the following Formula (M'-1).

Formula (M'-1)

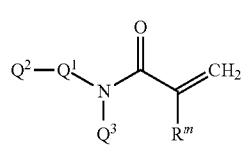

(M'-1)

(In Formula (M'-1), $Q^1$ represents a single bond, an alkyleneoxy group, or an alkylene group.

$Q^2$ represents a hydrogen atom, an alkyl group, an aryl group, an amino group, a hydroxyl group, a sulfo group, or an acyl group. $Q^3$ represents a hydrogen atom or an alkyl group. $Q^2$ and $Q^3$ may bond to each other to form a ring. $R'''$ represents a hydrogen atom or a methyl group.)

When $Q^1$ in Formula (M'-1) represents an alkyleneoxy group (—$R^5$—O—, wherein $R^5$ represents an alkylene group), the alkyleneoxy group has preferably from 1 to 10 carbon atoms, more preferably from 1 to 6 carbon atoms, and particularly preferably from 1 to 3 carbon atoms. Specific examples of the alkyleneoxy group include an ethoxy group and the like. These groups may have a substituent or may have no substituent. The alkyleneoxy group may bond to $Q^2$ in Structural Formula (M'-1) in either direction of —$R^5$—O— or —O—$R^5$— (** represents a bonding site.).

When $Q^1$ in Formula (M'-1) represents an alkylene group, the alkylene group has preferably from 1 to 10 carbon atoms, more preferably from 1 to 6 carbon atoms, and particularly preferably from 1 to 3 carbon atoms. Specific examples of the alkylene group include a methylene group and the like. These groups may have a substituent or may have no substituent, but it is preferable that these groups do not have a substituent.

$Q^1$ in Formula (M'-1) preferably represents a single bond.

When $Q^2$ in Formula (M'-1) represents an alkyl group, the alkyl group is preferably an alkyl group having from 1 to 10 carbon atoms, more preferably an alkyl group having from 1 to 8 carbon atoms, and even more preferably an alkyl group having from 3 to 8 carbon atoms. The alkyl group may have a straight chain structure, a branched structure, or a cyclic structure. Specific examples of the alkyl group include a methyl group, an ethyl group, an isobutyl group, an isopropyl group, an isooctyl group, a t-butyl group, a cyclohexyl group, and the like. These groups may have a substituent or may have no substituent, but it is preferable that these groups have a substituent.

In a case in which the alkyl group represented by $Q^2$ in Formula (M'-1) has a substituent, examples of the substituent include a hydroxyl group and the like.

When $Q^2$ in Formula (M'-1) represents an aryl group, the aryl group is preferably an aryl group having from 6 to 20 carbon atoms, more preferably an aryl group having from 6 to 16 carbon atoms, and particularly preferably an aryl group having from 6 to 10 carbon atoms. Specific examples of the aryl group include a phenyl group, a naphthyl group, and the like, and a phenyl group is particularly preferable. These groups may have a substituent or may have no substituent, but it is preferable that these groups do not have a substituent.

When $Q^2$ in Formula (M'-1) represents an amino group, the amino group may be any of a primary amino group, a secondary amino group, a ternary amino group, or a quaternary ammonium group, and is represented by, for example, —$NH_2$, —$NHR^6$, —$NR^6_2$, —$NH_3^+$, —$NR^6_3{}^+$ ($R^6$ represents a substituent), or the like. The substituents of the amino group, the substituents each being represented by $R^6$, may be different from each other, and examples thereof include a straight-chain or branched alkyl group having from 1 to 8 carbon atoms (preferably from 1 to 4 carbon atoms), an aryl group having from 6 to 20 carbon atoms (preferably, a phenyl group), and the like. Specific examples of the amino group include a primary amino group, a dimethylamino group, and the like. These groups may have a substituent or may have no substituent, but it is preferable that these groups do not have a substituent.

When $Q^2$ in Formula (M'-1) represents a sulfo group, examples of the sulfo group include a sulfo group and a salt of a sulfo group (—$SO_3X$, wherein X represents an alkali metal salt). Examples of the salt of a sulfo group include —$SO_3Li$, —$SO_3Na$, —$SO_3K$, and the like, and —$SO_3Na$ is preferred.

When $Q^2$ in Formula (M'-1) represents an acyl group ($R^7$—CO—, wherein $R^7$ represents an alkyl group), the acyl group has preferably from 1 to 10 carbon atoms, more preferably from 1 to 5 carbon atoms, and particularly preferably from 1 to 3 carbon atoms. Specific examples of the acyl group include —$COCH_3$ and the like.

$Q^2$ in Formula (M'-1) preferably represents an alkyl group, an amino group, or a hydroxyl group.

When $Q^3$ in Formula (M'-1) represents an alkyl group, the alkyl group is preferably an alkyl group having from 1 to 10 carbon atoms, more preferably an alkyl group having from 1 to 8 carbon atoms, and even more preferably an alkyl group having from 3 to 8 carbon atoms. The alkyl group may have a straight chain structure, a branched structure, or a cyclic structure. Specific examples of the alkyl group include a methyl group, an ethyl group, an isobutyl group, an isooctyl group, a t-butyl group, and the like. These groups may have a substituent or may have no substituent, but it is preferable that these groups do not have a substituent.

$Q^3$ in Formula (M'-1) represents a hydrogen atom or an alkyl group, and a hydrogen atom is preferred.

$R'''$ in Formula (M'-1) represents a hydrogen atom or a methyl group, and a hydrogen atom is preferred.

When $Q^2$ and $Q^3$ in Formula (M'-1) bond to each other to form a ring, the ring to be formed is preferably a ring constituted by atoms selected from a carbon atom and an oxygen atom. Specific examples of the ring to be formed include a pyrrolidine ring, a piperidine ring, an oxazine ring, and the like, and an oxazine ring is particularly preferable. These groups may have a substituent or may have no substituent, but it is preferable that these groups do not have a substituent.

Specific examples of the (meth)acrylamide compound in Formula (M'-1) may be any compounds as long as the compound is a monofunctional polymerizable compound having a (meth)acrylamido group, and may include an N-substituted (meth)acrylamide compound. Preferable examples include (meth)acrylamide, N-methyl(meth)acrylamide, N-ethyl (meth)acrylamide, N-propyl(meth)acrylamide, N-isopropyl(meth)acrylamide, N-butyl (meth)acrylamide, N-sec-butyl(meth)acrylamide, N-tert-butyl(meth) acrylamide, N-cyclohexyl(meth)acrylamide, N-phenyl (meth)acrylamide, N,N-dimethyl (meth)acrylamide, 1-(meth)acryloyl pyrrolidine, N-methylol(meth)acrylamide, N-methoxyethyl(meth)acrylamide, N-(2-hydroxyethyl) (meth)acrylamide, N-[3-(dimethylamino)propyl] (meth) acrylamide, N-(1,1-dimethyl-3-oxobutyl) (meth)acrylamide,4-(meth)acryloylmorpholine, diacetone acrylamide, and the like. Among them, N-isopropylacrylamide, N-tert-butylacrylamide, N,N-dimethylacrylamide, N-methylolacrylamide, N-(2-hydroxyethyl)acrylamide, N-[3-(dimethylamino) propyl]acrylamide, N-(1,1-dimethyl-3-oxobutyl) acrylamide, and 4-acryloylmorpholine are more preferable, and N-isopropylacrylamide, N,N-dimethylacrylamide, and 4-acryloylmorpholine are particularly preferable.

The (meth)acrylamide compound preferably has a high glass transition temperature. Accordingly, the stretchability and durability after heating are excellent. The glass transition temperature is preferably from 60° C. to 180° C., and particularly preferably from 70° C. to 160° C.

When the ink composition according to the second embodiment of the present invention includes the (meth) acrylamide compound, the content of the (meth)acrylamide compound is preferably from 0.1% by mass to 75% by mass, more preferably from 5% by mass to 50% by mass, and particularly preferably from 10% by mass to 40% by mass, with respect to the total amount of the ink composition.

In addition, preferable examples further include N-vinyl compounds such as N-vinyl lactams and N-vinyl formamides. Preferable examples of the N-vinyl lactams include those represented by the following formula.

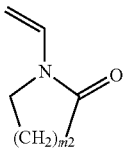

Formula (V)

In Formula (V) above, m2 represents an integer of from 1 to 5; it is preferable that m2 represents an integer of from 2 to 4; it is more preferable that m2 represents 2 or 4; and it is particularly preferable that m2 represents 4, namely, N-vinylcaprolactam is particularly preferable.

When the ink composition according to the second embodiment of the present invention includes the above N-vinyl compounds, the content of the N-vinyl compound is preferably from 0.1% by mass to 50% by mass, more preferably from 5% by mass to 40% by mass, and particularly preferably from 10% by mass to 35% by mass, with respect to the total amount of the ink composition.

In the second embodiment of the present invention, it is preferable that the ink composition contains an N-vinyl compound or a (meth)acrylamide compound, as the (component B') monofunctional polymerizable compound, from the viewpoints of stretchability and indentation hardening sensitivity of the image to be obtained; and it is particularly preferable that the ink composition contains a (meth)acrylamide compound.

A molecular weight of the monofunctional polymerizable compound in the second embodiment of the present invention is preferably from 130 to 3000, and more preferably from 130 to 500.

(Polyfunctional Polymerizable Compound)

The ink composition according to the second embodiment of the present invention may include a polyfunctional polymerizable compound having a functionality of two or more.

In the second embodiment of the present invention, examples of a radically polymerizable polyfunctional compound, which may be incorporated in the ink composition, include acrylate compounds such as bis(4-acryloxypolyethoxyphenyl)propane, tripropylene glycol diacrylate, polyethylene glycol diacrylate, polypropylene glycol diacrylate, dipentaerythritol tetraacrylate, trimethylolpropane (PO modified) triacrylate, oligoester acrylate, neopentyl glycol hydroxypivalate diacrylate, tetramethylol methane triacrylate, dimethyloltricyclodecane diacrylate, modified glycerin triacrylate, bisphenol A diglycidyl ether acrylic acid adduct, modified bisphenol A diacrylate, PO adducted bisphenol A diacrylate, EO adducted bisphenol A diacrylate, dipentaerythritol hexaacrylate, propylene glycol diglycidyl ether acrylic acid adduct, and ditrimethylolpropane tetraacrylate; methacrylate compounds such as polyethylene glycol dimethacrylate, polypropylene glycol dimethacrylate, and 2,2-bis(4-methacryloxypolyethoxyphenyl)propane; and the like. In addition, examples further include allyl compounds such as diallyl phthalate and triallyl trimeritate. Here, "PO" denotes propylene oxide, and "EO" denotes ethylene oxide. More specifically, commercially available products described in "KAKYOZAI HANDBOOK (Crosslinking Agent Handbook)", edited by Shinzo Yamashita, (Taiseisha, 1981); "UV•EB KOKA HANDBOOK (GENRYO HEN) (UV•EB Curing Handbook (Raw Materials Part))", edited by Kiyoshi Kato (Kobunshi Kankoukai, 1985); "UV•EB KOKA GIJUTSU NO OYO TO SHIJO (Application and Market of UV•EB Curing Technology)", edited by Rad Tech Kenkyu Kai, page 79, (CMC, 1989); "POLYESTER JUSHI HANDBOOK (Polyester Resin Handbook)", written by Eiichiro Takiyama, (The Nikkan Kogyo Shimbun Ltd., 1988), and the like, or radically polymerizable or crosslinkable compounds known in the art may be used.

Further, examples include polyfunctional vinyl ethers. Examples of the polyfunctional vinyl ethers include divinyl ethers such as ethylene glycol divinyl ether, diethylene glycol divinyl ether, triethylene glycol divinyl ether, polyethylene glycol divinyl ether, propylene glycol divinyl ether, dipropylene glycol divinyl ether, butylene glycol divinyl ether, butanediol divinyl ether, hexanediol divinyl ether, cyclohexanedimethanol divinyl ether, bisphenol A alkylene oxide divinyl ether, and bisphenol F alkylene oxide divinyl ether; polyfunctional vinyl ethers such as trimethylolethane trivinyl ether, trimethylolpropane trivinyl ether, di(trimethylolpropane)tetravinyl ether, glycerin trivinyl ether, pentaerythritol tetravinyl ether, di(pentaerythritol)pentavinyl ether, di(pentaerythritol) hexavinyl ether, ethylene oxide adducted trimethylolpropane trivinyl ether, propylene oxide adducted trimethylolpropane trivinyl ether, ethylene oxide adducted di(trimethylolpropane)tetravinyl ether, propylene oxide adducted di(trimethylolpropane)tetravinyl ether, ethylene oxide adducted pentaerythritol tetravinyl ether, propylene oxide adducted pentaerythritol tetravinyl ether, ethylene oxide adducted di(pentaerythritol) hexavinyl ether, and propylene oxide adducted di(pentaerythritol) hexavinyl ether; and the like.

Moreover, as the radically polymerizable compound, for example, photo-curing type polymerizable compounds which are used for photopolymerizable compositions described in JP-A No. 7-159983, JP-B No. 7-31399, JP-A No. 8-224982, JP-A No. 10-863, JP-A No. 9-134011, Japanese National Phase Publication No. 2004-514014, and the like are known and these are also usable for the ink composition of the present invention.

A molecular weight of the polyfunctional polymerizable compound in the second embodiment of the present invention is preferably from 130 to 3000, and more preferably from 130 to 500, in terms of molecular weight.

When the ink composition according to the second embodiment of the present invention includes a polyfunctional polymerizable compound, the content of the polyfunctional polymerizable compound with respect to all polymerizable compounds is preferably from 0.1% by mass to 20% by mass, more preferably from 1% by mass to 10% by mass, and particularly preferably from 1% by mass to 5% by mass.

Hereinafter, ((component C) a polymerization initiator), ((component D) a coloring agent), <water>, <additional components>, and the like in the ink composition of the present invention are described in detail. Namely, ((component C) a polymerization initiator), ((component D) a coloring agent), <water>, <additional components>, and the like in the first embodiment and the second embodiment are described in detail.

((Component C) Polymerization Initiator)

The ink composition in the first embodiment and the second embodiment of the present invention includes a polymerization initiator.

The polymerization initiator in the present invention may be either a thermal polymerization initiator or a photopolymerization initiator, but a photopolymerization initiator is preferably described. The photopolymerization initiator may be appropriately selected from known photopolymerization initiators and used, depending on the kind of the polymerizable compound and the intended use of the ink composition.

The photopolymerization initiator used in the ink composition of the present invention is a compound that generates radicals, which are polymerization initiating species, by absorbing external energy (light). In the photopolymerization initiator, the light for initiating polymerization indicates actinic energy rays (actinic radiation rays), namely, γ ray, β ray, electron beam, ultraviolet ray, visible ray, infrared ray, and the like, and ultraviolet ray is preferred.

As the photopolymerization initiator, known compounds can be used; and preferable examples of the photopolymerization initiator, which may be used in the present invention, include aromatic ketones, acylphosphine oxide compounds, aromatic onium salt compounds, organic peroxides, thio compounds, hexaaryl biimidazole compounds, ketoxime ester compounds, borate compounds, azinium compounds, methallocene compounds, active ester compounds, compounds having a carbon-halogen bond, alkylamine compounds, and the like.

In the second embodiment of the present invention, α-amino ketone is also a preferable example of the photopolymerization initiator, which may be used in the present invention.

In the second embodiment of the present invention, with regard to these photopolymerization initiators, the above compounds may be used alone or may be used in combination. The photopolymerization initiator of the present invention is suitably used as a single compound or as a combination of two or more compounds.

Preferable examples of the aromatic ketones, acylphosphine oxide compounds and thio compounds include compounds having a benzophenone skeleton or a thioxanthone skeleton described in "RADIATION CURING IN POLYMER SCIENCE AND TECHNOLOGY", J. P. FOUASSIER, J. F. RABEK (1993), pages 77 to 117, and the like. More preferable examples may include α-thiobenzophenone compounds described in JP-B No. 47-6416, benzoin ether compounds described in JP-B No. 47-3981, α-substituted benzoin compounds described in JP-B No. 47-22326, benzoin derivatives described in JP-B No. 47-23664, aroyl phosphonate esters described in JP-A No. 57-30704, dialkoxybenzophenone described in JP-B No. 60-26483, benzoin ethers described in JP-B No. 60-26403 and JP-A No. 62-81345, α-aminobenzophenones described in JP-B No. 1-34242, U.S. Pat. No. 4,318,791, and European Patent No. 0284561A1, p-di(dimethylaminobenzoyl)benzene described in JP-A No. 2-211452, thio-substituted aromatic ketones described in JP-A No. 61-194062, acylphosphine sulfide described in JP-B No. 2-9597, acylphosphine described in JP-B No. 2-9596, thioxanthones described in JP-B No. 63-61950, coumarins described in JP-B No. 59-42864, and the like. Further, polymerization initiators described in JP-A No. 2008-105379 and JP-A No. 2009-114290 are also preferable.

Among them, aromatic ketones or acylphosphine oxide compounds are preferably used as a photopolymerization initiator, and p-phenylbenzophenone (manufactured by Wako Pure Chemical Industries, Ltd.), bis(2,4,6-trimethylbenzoyl)-phenylphosphine oxide (IRGACURE 819; manufactured by BASF Japan Ltd.), bis(2,6-dimethoxybenzoyl)-2,4,4-trimethyl-pentylphenylphosphine oxide and 2,4,6-trimethylbenzoyl-diphenyl-phosphine oxide (DAROCUR TPO; manufactured by BASF Japan Ltd. and LUCIRIN TPO; manufactured by BASF Japan Ltd.), and the like are preferable.

In the second embodiment of the present invention, the use of IRG 907 (2-methyl-1-(4-methylthiophenyl)-2-morpholinopropan-1-one, manufactured by BASF Japan Ltd.) and the like are also preferable.

One kind of the polymerization initiators may be used alone or two or more kinds of them may be used in combination.

The content of the polymerization initiator in the ink composition according to the first embodiment of the present invention is preferably from 1% by mass to 25% by mass, more preferably from 1% by mass to 20% by mass, and even more preferably from 1% by mass to 15% by mass, with respect to the ink composition.

The content of the polymerization initiator in the ink composition according to the second embodiment of the present invention is preferably from 0.1% by mass to 20% by mass, more preferably from 0.5% by mass to 15% by mass, and even more preferably from 1% by mass to 10% by mass, with respect to the ink composition.

((Component D) Coloring Agent)

The ink composition according to the first embodiment of the present invention may contain a coloring agent. The ink composition according to the second embodiment of the present invention contains a coloring agent. By adding a coloring agent to the ink composition, an ink composition which can form visible images (colored images) may be obtained.

The coloring agent which may be used in the ink composition of the present invention is not particularly limited, and any known coloring agents of various types (pigments or dyes) can be appropriately selected and used according to the intended use. For example, in the case of forming an image that has excellent climatic resistance, a pigment is preferred. Further, as a dye, any of a water-soluble dye or an oil-soluble dye can be used, but an oil-soluble dye is preferred.

—Pigment—

First, the pigment which is preferably used as a coloring agent in the ink composition in the first embodiment and second embodiment of the present invention is described.

The pigment is not particularly limited, and a dispersion obtained by dispersing all the generally commercially available, organic and inorganic pigments in a dispersion medium such as an insoluble resin or the like, a pigment having a resin grafted on a surface thereof, or the like can be used. Alternatively, resin particles dyed with a dye, or the like may also be used.

Examples of such pigments include pigments described in "GANRYO NO JITEN (Pigment Dictionary)", edited by Seishiro Itoh, (2000), W. Herbst, K. Hunger, "Industrial Organic Pigments", JP-A No. 2002-12607, JP-A No. 2002-188025, JP-A No. 2003-26978, and JP-A No. 2003-342503.

Specific examples of the organic pigment and inorganic pigments which can be used in the present invention include, for example, as pigments exhibiting yellow color, a monoazo pigment such as C.I. Pigment Yellow 1 (Fast Yellow G or the like) or C.I. Pigment Yellow 74, a disazo pigment such as C.I. Pigment Yellow 12 (Disazo Yellow AAA or the like) or C.I. Pigment Yellow 17, a non-benzidine azo pigment such as C.I. Pigment Yellow 180, an azo lake pigment such as C.I. Pigment Yellow 100 (Tartrazine Yellow Lake, or the like), a condensed azo pigment such as C.I. Pigment Yellow 95 (Condensed Azo Yellow GR or the like), an acidic dye lake pigment such as C.I. Pigment Yellow 115 (Quinoline Yellow Lake or the like), a basic dye lake pigment such as C.I. Pigment Yellow 18 (Thioflavin Lake or the like), an anthraquinone pigment such as Fravantrone Yellow (Y-24), an isoindolinone pigment such as Isoindolinone Yellow 3RLT (Y-110), a quinophthalone pigment such as Quinophthalone Yellow (Y-138), an isoindoline pigment such as Isoindoline Yellow (Y-139), a nitroso pigment such as C.I. Pigment Yellow 153 (Nickel Nitroso Yellow or the like), a metal complex azomethine pigment such as C.I. Pigment Yellow 117 (Copper Azomethine Yellow or the like), and the like.

Examples of pigments exhibiting red or magenta color include a monoazo pigment such as C.I. Pigment Red 3 (Toluidine Red or the like), a disazo pigment such as C.I. Pigment Red 38 (Pyrazolone Red B or the like), an azo lake pigment such as C.I. Pigment Red 53:1 (Lake Red C or the like) or C.I. Pigment Red 57:1 (Brilliant Carmine 6B), a condensed azo pigment such as C.I. Pigment Red 144 (Condensed Azo Red BR or the like), an acidic dye lake pigment such as C.I. Pigment Red 174 (Phloxine B Lake or the like), a basic dye lake pigment such as C.I. Pigment Red 81 (Rhodamine 6G' Lake or the like), an anthraquinone pigment such as C.I. Pigment Red 177 (Dianthraquinonyl Red or the like), a thioindigo pigment such as C.I. Pigment Red 88 (Thioindigo Bordeaux or the like), a perynone pigment such as C.I. Pigment Red 194 (Perynone Red or the like), a perylene pigment such as C.I. Pigment Red 149 (Perylene Scarlet or the like), a quinacridone pigment such as C.I. Pigment Violet 19 (unsubstituted quinacridone) or C.I. Pigment Red 122 (Quinacridone Magenta or the like), an isoindolinone pigment such as C.I. Pigment Red 180 (Isoindolinone Red 2BLT or the like), an alizarin lake pigment such as C.I. Pigment Red 83 (Madder Lake or the like), and the like.

Examples of pigments exhibiting blue or cyan color include a disazo pigment such as C.I. Pigment Blue 25 (Dianisidine Blue or the like), a phthalocyanine pigment such as C.I. Pigment Blue 15 (Phthalocyanine Blue or the like), an acidic dye lake pigment such as C.I. Pigment Blue 24 (Peacock Blue Lake or the like), a basic dye lake pigment such as C.I. Pigment Blue 1 (Victoria Pure Blue BO Lake or the like), an anthraquinone pigment such as C.I. Pigment Blue 60 (Indanthrone Blue or the like), an alkali blue pigment such as C.I. Pigment Blue 18 (Alkali Blue V-5:1), and the like.

Examples of pigments exhibiting green color include a phthalocyanine pigment such as C.I. Pigment Green 7 (Phthalocyanine Green) or C.I. Pigment Green 36 (Phthalocyanine Green), an azo metal complex pigment such as C.I. Pigment Green 8 (Nitroso Green), and the like.

Examples of pigments exhibiting orange color include an isoindoline pigment such as C.I. Pigment Orange 66 (Isoindoline Orange) and an anthraquinone pigment such as C.I. Pigment Orange 51 (Dichloropyranthrone Orange).

Examples of pigments exhibiting black color include carbon black, titanium black, aniline black, and the like.

Specific examples of pigments exhibiting white color, which can be utilized, include basic lead carbonate $(2PbCO_3Pb(OH)_2$, so-called silver white), zinc oxide (ZnO, so-called zinc white), titanium oxide ($TiO_2$, so-called titanium white), strontium titanate ($SrTiO_3$, so-called titanium strontium white), and the like.

For dispersing the pigment, a dispersing apparatus, for example, a ball mill, a sand mill, an attritor, a roll mill, a jet mill, a homogenizer, a paint shaker, a kneader, an agitator, a Henschel mixer, a colloid mill, an ultrasonic homogenizer, a pearl mill, a wet type jet mill, or the like, can be used.

It is possible to add a dispersing agent, when dispersing a pigment. Examples of the dispersing agent may include a hydroxyl group-containing carboxylate ester, a salt of an ester of a long-chain polyaminoamide and a high molecular weight acid, a salt of a high molecular weight polycarboxylic acid, a high molecular weight unsaturated acid ester, a high molecular weight copolymer, a modified polyacrylate, an aliphatic polyvalent carboxylic acid, a naphthalenesulfonic acid-formaline condensate, a polyoxyethylene alkyl phosphate ester, pigment derivatives, and the like. Further, the use of a commercially available polymer dispersing agent, such as SOLSPERSE series available from The Lubrizol Corporation, is also preferable.

Further, it is also possible to use, as a dispersion aid, a synergist according to the type of pigment. It is preferable that the dispersing agent and the dispersion aid are added in an amount of from 1 part by mass to 50 parts by mass with respect to 100 parts by mass of the pigment.

In the ink composition, as a dispersion medium for various components such as a pigment, a solvent may be added, and further the above-described polymerizable compound which serves as a low molecular weight component may be used as the dispersion medium, or the polymerizable compound which serves as a low molecular weight component may be used as the dispersion medium, without any solvent; however, since the ink composition of the present invention is suitable for an actinic energy ray-curable ink, and the ink is cured after the application onto a recording medium, it is preferable that the ink composition does not include a solvent. The definition of actinic energy ray is described below.

A volume average particle diameter of the pigment particles in the ink composition is preferably from 0.02 μm to 0.60 μm, and more preferably from 0.02 μm to 0.10 μm. Further, a maximum particle diameter is preferably 3 μm or less, and more preferably 1 μm or less; and a pigment, a dispersing agent, and a dispersion medium are selected and dispersing conditions and filtering conditions are set, such that the volume average particle diameter and maximum particle diameter of the pigment particles fall within the above ranges, respectively. Here, the volume average particle diameter is a value measured by using a laser diffraction scattering type particle size distribution analyzer (LA-920, manufactured by Horiba Ltd.), and using tripropylene glycol methyl ether as a solvent for the measurement.

—Dye—

Next, a dye which is preferably used as the coloring agent in the present invention is described.

A dye may be appropriately selected and used from conventionally known compounds (dyes). Specific examples of the dye may include compounds described in paragraphs [0023] to [0089] of JP-A No. 2002-114930 and paragraphs [0136] to [0140] of JP-A No. 2008-13646 and the like, and these may also be applied to the present invention.

To the ink composition, the coloring agent is preferably added in an amount of from 0.05% by mass to 20% by mass and more preferably from 0.2% by mass to 10% by mass, with respect to the total mass of the ink composition. When an oil-soluble dye is used as the coloring agent, it is particularly preferable that the oil-soluble dye is added in an amount of from 0.2% by mass to 6% by mass with respect to the total mass of the ink composition (including solvent).

<Water>

The ink composition according to the present invention is preferably a nonaqueous ink composition which does not substantially contain water. Specifically, the content of water is preferably 3% by mass or less, more preferably 2% by mass or less, and most preferably 1% by mass or less, with respect to the total mass of the ink composition.

<Additional Components>

Components other than the above components may be further added to the ink composition of the present invention. In the following, the additional components are described sequentially.

(Chain Transfer Agent)

The ink composition of the present invention may further contain a chain transfer agent.

The chain transfer agent may be used without any particular limitation as long as the chain transfer agent is a substance that transfers the active point of reaction by a chain transfer reaction in the polymerization reaction.

Specific examples of the chain transfer agent usable in the present invention include halogen compounds such as carbon tetrachloride and carbon tetrabromide; alcohols such as isopropyl alcohol and isobutyl alcohol; olefins such as 2-methyl-1-butene and 2,4-diphenyl-4-methyl-1-pentene; and sulfur-containing compounds, but are no limited thereto.

A molecular weight of the chain transfer agent is preferably 250 or more, in particular, preferably from 250 to 100,000, more preferably from 500 to 80,000, and particularly preferably from 3,000 to 80,000.

One kind of the chain transfer agents may be used alone, or two or more kinds of them may be used in combination.

In the second embodiment of the present invention, the amount of the chain transfer agent to be added to the ink composition according to the second embodiment of the present invention is preferably from 0.1% by mass to 15% by mass, more preferably from 0.5% by mass to 10% by mass, and particularly preferably from 1% by mass to 10% by mass, with respect to the total mass of solids in the ink composition.

(Sensitizing Dye)

A sensitizing dye may be added to the ink composition of the ink composition, in order to accelerate decomposition of the polymerization initiator by irradiation with an actinic energy ray.

As the sensitizing dye, a compound which corresponds to the wavelength of the actinic energy ray that allows the polymerization initiator used in the ink composition to generate an initiating species may be used; however, considering that the compound is used for a curing reaction of a generally used ink composition, preferable examples of the sensitizing dye may include compounds which belong to the following compound group and have an absorption wavelength in a region of from 350 nm to 450 nm.

Examples thereof include polynuclear aromatic compounds (for example, anthracene, pyrene, perylene, and triphenylene), thioxanthones (for example, isopropyl thioxanthone), xanthenes (for example, fluorescein, eosin, erythrosine, Rohdamine B, and rose bengal), cyanines (for example, thiacarbocyanine and oxacarbocyanine), merocyanines (for example, merocyanine or carbomerocyanine), thiazines (such as thionine, methylene blue, and toluidine blue), acridines (for example, acridine orange, chloroflavin, and acriflavine), anthraquinones (for example, anthraquinone), squaryliums (such as squarylium), coumarins (such as 7-diethylamino-4-methylcoumarin), and the like are described; and polynuclear aromatic compounds and thioxanthones are preferable.

In the second embodiment of the present invention, examples of the sensitizing dye further include DETX (2,4-diethyl thioxanthone, manufactured by SUN CHEMICAL COMPANY LTD.), ITX (2-isopropyl thioxanthone, manufactured by Tokyo Chemical Industry Co., Ltd.), and the like.

Furthermore, sensitizing dyes described in JP-A No. 2008-95086 are also preferable.

(Cosensitizer)

The ink composition of the present invention may also contain a cosensitizer.

Examples of the cosensitizer include amines, for example, compounds described in M. R. Sander et al, "Journal of Polymer Science", vol. 10, page 3173 (1972), JP-B No. 44-20189, JP-A No. 51-82102, JP-A No. 52-134692, JP-A No. 59-138205, JP-A No. 60-84305, JP-A No. 62-18537, JP-A No. 64-33104, and Research Disclosure No. 33825; and specific examples include triethanolamine, p-dimethylaminobenzoic acid ethyl ester, p-formyldimethylaniline, p-methylthiodimethylaniline, and the like.

Other examples of the cosensitizer include thiols and sulfides, for example, thiol compounds described in JP-A No. 53-702, JP-B No. 55-500806, and JP-A No. 5-142772, disulfide compounds of JP-A No. 56-75643, and the like; and specific examples include 2-mercaptobenzothiazole, 2-mercaptobenzoxazole, 2-mercaptobenzimidazole, 2-mercapto-4(3H)-quinazoline, β-mercaptonaphthalene, and the like.

Yet other examples of the cosensitizer include amino acid compounds (for example, N-phenylglycine and the like), organic metal compounds described in JP-B No. 48-42965 (for example, tributyltin acetate and the like), hydrogen donating compounds described in JP-B No. 55-34414, sulfur compounds described in JP-A No. 6-308727 (for example, trithiane and the like), phosphorus compounds described in JP-A No. 6-250387 (for example, diethylphosphite and the like), Si—H compounds and Ge—H compounds described in JP-A No. 8-65779, and the like.

(Ultraviolet Absorbent)

In the ink composition of the present invention, an ultraviolet absorbent may be used.

Examples of the ultraviolet absorbent include benzotriazole compounds described in, for example, JP-A Nos. 58-185677 and 61-190537, JP-A Nos. 2-782, 5-197075, and 9-34057; benzophenone compounds described in, for example, JP-A No. 46-2784, JP-A No. 5-194483, and U.S. Pat. No. 3,214,463; cinnamic acid compounds described in, for example, JP-B Nos. 48-30492 and 56-21141, and JP-A No. 10-88106; triazine compounds described in, for example, JP-A Nos. 4-298503, 8-53427, 8-239368, and 10-182621, and Japanese National Phase Publication No. 8-501291; compounds described in Research Disclosure No. 24239; compounds that absorb ultraviolet rays and emit fluorescence, i.e., fluorescent brighteners, represented by a stilbene compound and a benzoxazole compound, and the like.

(Antioxidant)

An antioxidant may be added to the ink composition of the present invention.

Examples of the antioxidant may include those described in, for example, European Patent Publication Nos. 223739, 309401, 309402, 310551, 310552, and 459416, German Patent Publication No. 3435443, JP-A Nos. 54-48535, 62-262047, 63-113536, and 63-163351, JP-A No. 2-262654, JP-A No. 2-71262, JP-A No. 3-121449, JP-A No. 5-61166, JP-A No. 5-119449, U.S. Pat. No. 4,814,262, and U.S. Pat. No. 4,980,275.

(Color Fading Inhibitor)

In the ink composition of the present invention, various kinds of organic and metal complex color fading inhibitors may be used.

Examples of the organic color fading inhibitors include hydroquinones, alkoxyphenols, dialkoxyphenols, phenols, anilines, amines, indanes, chromanes, alkoxyanilines, heterocycles, and the like.

Examples of the metal complex color fading inhibitors include nickel complexes, zinc complexes, and the like; and more specifically, compounds described in the patents cited in Research Disclosure No. 17643, chapter VII, items Ito J; Research Disclosure No. 15162; Research Disclosure No. 18716, page 650, the left-hand column; Research Disclosure No. 36544, page 527; Research Disclosure No. 307105, page 872; and Research Disclosure No. 15162, and compounds included in the formulae of the representative compounds and the exemplary compounds described on pages 127 to 137 of JP-A No. 62-215272 can be used.

(Electrically Conductive Salt)

To the ink composition of the present invention, an electrically conductive salt such as potassium thiocyanate, lithium nitrate, ammonium thiocyanate, and dimethylamine hydrochloride may be added. The electrically conductive salt may be added, for the purpose of controlling the discharge physical properties.

(Solvent)

It is preferable that the ink composition of the present invention does not include a solvent, but a trace amount of a non-curable organic solvent may be added to the ink composition.

Specifically, the addition amount of the solvent is preferably 2% by mass or less, and more preferably 1% by mass or less, with respect to the ink composition.

In the second embodiment of the present invention, the content of the solvent in the ink composition is preferably 1% by mass or less with respect to the total amount of the ink composition.

Examples of the solvent include ketone solvents such as acetone, methyl ethyl ketone, and diethyl ketone; alcohol solvents such as methanol, ethanol, 2-propanol, 1-propanol, 1-butanol, and tert-butanol; chlorine-containing solvents such as chloroform and methylene chloride; aromatic solvents such as benzene and toluene; ester solvents such as ethyl acetate, butyl acetate, and isopropyl acetate; ether solvents such as diethyl ether, tetrahydrofuran, and dioxane; and glycol ether solvents such as ethylene glycol monomethyl ether and ethylene glycol dimethyl ether.

(Polymer Compound)

To the ink composition of the present invention, various kinds of oil-soluble polymer compounds may be added. The oil-soluble polymer compound may be used for adjusting the physical properties of film.

As the oil-soluble polymer compound, an acrylic copolymer, a polyvinyl butyral resin, a polyurethane resin, a polyamide resin, a polyester resin, an epoxy resin, a phenol resin, a polycarbonate resin, a polyvinyl butyral resin, a polyvinyl formal resin, shellac, a vinyl resin, an acrylic resin, a rubber resin, waxes, other natural resins, or the like can be used. Further, two or more kinds of these polymer compounds may be used in combination.

Furthermore, when the ink composition of the present invention is made into a film, a polymer compound which tends to be easily segregated on the surface of the film is also preferably used for the purpose of improving stickiness and the like. As such a polymer compound, it is possible to utilize a polymer containing an Si atom or an F atom, a polymer having a long-chain alkyl group in a side chain thereof, and the like, which are described in, for example, paragraphs [0017] to [0037] of JP-A No. 2008-248119 and paragraphs [0015] to [0034] of JP-A No. 2005-250890.

(Surfactant)

A surfactant may be added to the ink composition of the present invention.

Examples of the surfactant include those described in JP-A Nos. 62-173463 and 62-183457. Examples thereof include anionic surfactants such as dialkyl sulfosuccinate salts, alkyl naphthalenesulfonate salts, and fatty acid salts; nonionic surfactants such as polyoxyethylene alkyl ethers, polyoxyethylene alkyl allyl ethers, acetylene glycols, and polyoxyethylene/polyoxypropylene block copolymers; and cationic surfactants such as alkylamine salts and quaternary ammonium salts.

An organic fluoro compound may be used instead of using a surfactant.

The organic fluoro compound is preferably hydrophobic. Examples of the organic fluoro compound include fluorocarbon surfactants, oily fluorine-containing compounds (for example, fluorine oil), and solid fluorine-containing resins (for example, an ethylene tetrafluoride resin); and specifically, those described in JP-B No. 57-9053 (columns 8 to 17) and JP-A No. 62-135826 are described.

In the second embodiment, in addition to the above, for example, a polymerization inhibitor, a leveling additive, a matting agent, waxes for adjusting the film property, and a tackifier (tackiness providing agent) which does not inhibit the polymerization to improve adhesive property onto a recording medium such as polyolefine, PET, or the like may be added, if necessary.

Examples of the polymerization inhibitor include hydroquinone, methoxybenzoquinone, methoxyphenol, phenothiazine, t-butylcatechol, mercaptobenzimidazole, alkyldithiocarbamic acid salts, alkylphenols, alkylbisphenols, salicylic acid salts, thiodipropionic acid esters, phosphites, and nitroxide aluminum complex. Specific examples thereof include GERORAD 16, 18, 20, 21, and 22 (manufactured by Rahn).

Specific examples of the tackifier include high molecular weight-adhesive polymers described in JP-A No. 2001-49200, pages 5 to 6 (for example, a copolymer comprising an ester of (meth)acrylic acid and alcohol having an alkyl group having 1 to 20 carbon atoms, an ester of (meth)acrylic acid and alicyclic alcohol having 3 to 14 carbon atoms, and an ester of (meth)acrylic acid and aromatic alcohol having 6 to 14 carbon atoms), and low molecular weight-tackiness-providing resins having a polymerizable unsaturated bond.

(Preferable Physical Properties of Ink Composition)

The ink composition of the present invention is preferably used for inkjet recording. Therefore, considering the discharge property, the viscosity is preferably from 7 mPa·s to 30 mPa·s, at a temperature (for example, from 40° C. to 80° C., preferably from 25° C. to 30° C.) at the time of ejection. The viscosity is more preferably from 7 mPa·s to 20 mPa·s.

It is preferable that the surface tension at 25° C. of the ink composition of the present invention is from 20 mN/m to 40 mN/m. The surface tension is measured, using AUTOMATIC SURFACE TENSIOMETER CBVP-Z (manufactured by Kyowa Interface Science Co. Ltd.), under the condition of a temperature of 25° C.

(Preferable Physical Properties of the Ink Composition in the Second Embodiment)

In the second embodiment of the present invention, it is preferable to use an ink composition having a viscosity at 25° C. of 40 mPa·s or less. The viscosity of the ink composition is more preferably from 5 mPa·s to 40 mPa·s, and even more preferably from 7 mPa·s to 30 mPa·s. Further, in the second embodiment, the viscosity at a temperature (preferably from 25° C. to 80° C., and more preferably from 25° C. to 50° C.) at the time of ejection is preferably from 3 mPa·s to 15 mPa·s, and more preferably from 3 mPa·s to 13 mPa·s. In the second embodiment of the present invention, it is preferable to appropriately adjust the composition ratio so that the viscosity falls within the above range. By setting a high viscosity at room temperature, even in a case in which a porous recording medium is used, it becomes possible to prevent permeation of the ink composition into the recording medium, to decrease the amount of uncured monomers. Furthermore, ink bleeding at the time of landing of droplets of the ink composition can be suppressed and, as a result, image quality is improved, which is thus preferable. The viscosity is measured, using VISCOMETER TV-22 (manufactured by TOKI SANGYO CO., LTD.), under the condition of a temperature of 25° C.

The surface tension at 25° C. of the ink composition according to the second embodiment of the present invention is preferably from 20 mN/m to 35 mN/m, and more preferably from 23 mN/m to 33 mN/m. In the case of recording on various recording media such as polyolefin, PET, coated payer, non-coated paper, or the like, it is preferable that the surface tension is 20 mN/m or more from the viewpoints of bleeding and permeation, and it is preferable that the surface tension is 35 mN/m or less from the viewpoint of wettability. The surface tension is measured, using AUTOMATIC SURFACE TENSIOMETER CBVP-Z (manufactured by Kyowa Interface Science Co. Ltd.), under the condition of a temperature of 25° C.

The ink composition of the present invention is preferably used for inkjet recording. In the case of using for inkjet recording, the ink composition of the present invention is ejected onto a recording medium by using an inkjet recording apparatus, and then the ejected ink composition is cured by irradiation with an energy ray, to perform recording.

It was found that the effects of the present invention are enhanced by the ink composition according to the first embodiment of the present invention, which includes (component A) a polymer that has a group containing a silsesquioxane structure and that has a weight average molecular weight of 3,000 or more, (component B) a monofunctional polymerizable compound, and (component C) a polymerization initiator. The mechanism for this is not sufficiently clear, but the present inventors have assumed as follows. Namely, it is assumed that the (component A) is distributed among the polymerizable compounds in the ink, and when the ink composition is cured, the (component A) forms a phase separation structure (sea-island structure), and therefore, the spread of cracks (cracks or vicinal cracks) caused by punching of the formed image can be suppressed, and thus the punching processing property is improved. Further, it was found that, by the inclusion of the (component B) monofunctional polymerizable compound, a moderate flexibility can be imparted to the film to be formed by the image formation, the stretchability and the like can also be further improved.

Note that, the mechanism described above is only a guess, and the first embodiment of the present invention is not limited to the above mechanism.

The present inventors have found that the effects of the present invention are enhanced in the second embodiment, by the inclusion of (component A') a compound that does not have an ethylenically unsaturated double bond but has a silsesquioxane structure, and that has a molecular weight of 300 or more but less than 3,000, (component B') a monofunctional polymerizable compound, (component C) a polymerization initiator, and (component D) a coloring agent, and by letting the content of the (component B') monofunctional polymerizable compound with respect to the total content of all polymerizable compounds be 80% by mass or more. The mechanism for this is not clear, but the present inventors have assumed as follows.

Namely, since the (component A') does not have an ethylenically unsaturated double bond, the (component A') and the polymerizable compound do not react with each other, and thus, it is assumed that the (component A') forms a phase separation structure (sea-island structure) in the ink composition-cured film. It is thought that the phase separation structure, which is formed by the compound having a silsesquioxane structure, disperses the spread of impact caused by punching of the formed image, and therefore, the spread of impact is weakened as compared with an ink composition-cured film that does not have a phase separation structure (sea-island structure). It is thought that, as a result of this, the punching property and the like are enhanced. Further, it is assumed that, by letting the content of the (component B') with respect to the total content of all polymerizable compounds in the ink composition be 80% by mass or more, a moderate flexibility is imparted to the film and the stretchability is improved.

Note that, the mechanism described above is only a guess, and the second embodiment of the present invention is not limited to the above mechanism.

2. Image Forming Method and Printed Matter (2-a. Image Forming Method and Printed Matter in the First Embodiment of the Present Invention)

The image forming method in the first embodiment of the present invention includes an ink application process of applying, onto a recording medium, the ink composition of the present invention, and a process of irradiating the applied ink composition with an actinic energy ray. Further, the image forming method may include a process of obtaining printed matter having a cured image, after irradiating with an actinic energy ray to cure the ink composition. The ink application process is used for various printing applications such as planographic printing application or screen printing application, but it is preferable that an image is formed by discharging ink by an inkjet method including a commercially available apparatus.

(2-b. Image Forming Method and Printed Matter in the Second Embodiment of the Present Invention)

The image forming method in the second embodiment of the present invention includes an ink application process of applying the ink composition of the present invention onto a recording medium, and an irradiation process of irradiating the ink composition with an actinic energy ray. In the ink application process, it is preferable that an image is formed by discharging ink by an inkjet method including a commercially available apparatus. The ink application process can be used for various printing applications such as lithography printing application or screen printing application. Further, the image forming method may include a process of obtaining printed matter having a cured image formed on the recording medium.

The recording medium (base material) which can be applied to the image forming method of the present invention is not particularly limited, and papers such as a normal uncoated paper or a coated paper, various kinds of non-absorptive resin materials used for so-called soft packaging, or a resin film thereof formed into a film shape can be used; and examples of various plastic films may include a PET film, an OPS film, an OPP film, an ONy film, a PVC film, a PE film, a TAC film, a vinyl chloride sheet, a soft vinyl chloride sheet, and the like. In addition, examples of a plastic which can be used as a recording medium material include polycarbonate, an acrylic resin, ABS, polyacetal, PVA, rubbers, and the like. Moreover, metals or glasses can also be used as a recording medium. Further, an example of a recording medium which can be applied to the present invention is a support for a planographic printing plate.

Examples of the actinic energy ray which may be applied to the image forming method of the present invention include β rays, γ rays, X-rays, ultraviolet rays, visible rays, infrared rays, electron beams, and the like. The peak wavelength of the actinic energy ray is preferably from 200 nm to 600 nm, more preferably from 300 nm to 450 nm, and even more preferably from 350 nm to 420 nm Further, the power of the actinic energy ray is preferably 2,000 mW/cm$^2$ or less, more preferably from 10 mW/cm$^2$ to 2,000 mW/cm$^2$, even more preferably from 20 mW/cm$^2$ to 1,000 mW/cm$^2$, and particularly preferably from 50 mW/cm$^2$ to 800 mW/cm$^2$.

In particular, in the image forming method of the present invention, it is preferable that, in the actinic energy ray irradiation, irradiation is performed from a light emitting diode which has an emission peak wavelength of from 350 nm to 420 nm and generates ultraviolet ray that gives a maximum illuminance of from 10 mW/cm$^2$ to 2,000 mW/cm$^2$ on the surface of the recording medium. The ink composition of the present invention cures with high sensitivity even by light having a low exposure value such as light emitted from a light emitting diode.

In the image forming method of the present invention, the irradiation with an actinic energy ray can be conducted by exposing inks at one time after discharging the inks of all colors, but it is preferred to perform exposure for every one color.

Further, as described above, the ink composition of the present invention is suitably used for forming an image of ordinary printed matter, and also, the ink composition of the present invention may be suitably used for embodiments in which processing is conducted after the image has been formed on a recording medium such as a support.

Molded printed matter may be produced by fabricating the printed matter formed in accordance with the image forming method of the present invention. The molded printed matter is produced by a method for producing molded printed matter, the method including a process of forming an image by ejecting the ink composition of the present invention onto a recording medium in accordance with an inkjet system, a process of irradiating the obtained image with an actinic energy ray to cure the ink composition, thereby obtaining printed matter having a cured image on the recording medium, and a process of fabricating the printed matter to obtain molded printed matter.

As the recording medium to be used for producing molded printed matter, a recording medium formed from a resin material capable of being molded is used, and examples thereof include PET, polycarbonate, polystyrene, and the like.

As a processing method for producing molded printed matter, vacuum molding, pressure molding, or vacuum/pressure molding is most preferred. The vacuum molding is a method in which a flat support is preheated to a temperature capable of being thermally deformed, followed by pressing it against to a metal mold and cooling while sucking it toward the metal mold by reduction of pressure and stretching; and pressure molding is a method including pressing it against a metal mold by applying pressure from the side opposite to the metal pattern and cooling. Further, the vacuum/pressure molding is a method including conducting the reduction of pressure and application of pressure at the same time.

EXAMPLES

Hereinafter, the present invention is further specifically described with reference to Examples; however, the invention is by no means limited to the following Examples unless they are beyond the spirit of the invention. Note that, unless otherwise stated, the "%" and "parts" are based on mass.

Hereinafter, Examples regarding the first embodiment of the present invention are specifically described.

<Preparation of Pigment Dispersions>

The pigment, dispersing agent, and monofunctional monomer described below were mixed, to prepare pigment dispersions (Y1, M1, C1, K1, and W1) of respective colors.

Yellow pigment dispersion (Y1)

| | |
|---|---|
| Pigment: C.I. Pigment Yellow 12 | 10 parts |
| Dispersing agent: polymer dispersing agent [SOLSPERSE 32000, manufactured by Japan Lubrizol Ltd.] | 5 parts |
| Monofunctional monomer: 2-phenoxyethyl acrylate [VISCOAT #192, manufactured by Osaka Organic Chemical Industry Ltd.; radically polymerizable monomer] | 85 parts |

Magenta pigment dispersion (M1)

| | |
|---|---|
| Pigment: C.I. Pigment Red 57:1 | 15 parts |
| Dispersing agent: polymer dispersing agent [SOLSPERSE 32000, manufactured by Japan Lubrizol Ltd.] | 5 parts |
| Monofunctional monomer: 2-phenoxyethyl acrylate | 80 parts |

Cyan pigment dispersion (C1)

| | |
|---|---|
| Pigment: C.I. Pigment Blue 15:3 | 20 parts |
| Dispersing agent: polymer dispersing agent [SOLSPERSE 32000, manufactured by Japan Lubrizol Ltd.] | 5 parts |
| Monofunctional monomer: 2-phenoxyethyl acrylate | 75 parts |

Black pigment dispersion (K1)

| | |
|---|---|
| Pigment: C.I. Pigment Black 7 | 20 parts |
| Dispersing agent: polymer dispersing agent [SOLSPERSE 32000, manufactured by Japan Lubrizol Ltd.] | 5 parts |
| Monofunctional monomer: 2-phenoxyethyl acrylate | 75 parts |

White pigment dispersion (W1)

| | |
|---|---|
| Pigment: MICROLITH WHITE R-A (manufactured by BASF Japan Ltd.) | 20 parts |
| Dispersing agent: polymer dispersing agent [SOLSPERSE 32000, manufactured by Japan Lubrizol Ltd.] | 5 parts |
| Monofunctional monomer: 2-phenoxyethyl acrylate | 75 parts |

<Synthesis of (Component a) Polymer that has a Group Containing a Silsesquioxane Structure and that has a Weight Average Molecular Weight of 3,000 or More>

The polymers shown below were synthesized as the (component A).

(Synthesis of (P-1))

To a 200 mL three-necked flask, 134.3 g of dimethylacetamide, 10.38 g of xylylene diisocyanate (1.1 equivalent/OH group), 18.87 g of polycarbonate diol (ETERNACOLL UM-90 (3/1)), 28.49 g of trade name: PSS-(2,3-PROPANE-DIOL)PROPDXY-HEPTAISOBUTYL SUBSTITUTED (manufactured by Sigma Aldrich Japan K.K.) were added, and the mixture was allowed to react at 80° C. for 20 hours, to obtain a urethane prepolymer having a terminal isocyanato group. Thereafter, 4 g of methanol were added thereto, and the resulting mixture was further allowed to react for 10 hours. The resulting reaction product was poured into a large amount of methanol to perform reprecipitation purification, followed by drying under pressure, to obtain 56 g of polymer (P-1) having a structure described in Table 14 below.

(Synthesis of (P-2) to (P-8) and (P-12) to (P-14))

Synthesis of polymers (P-2) to (P-8) and (P-12) to (P-14) each having a structure described in Tables 14 to 19 below was conducted in a manner similar to that in (P-1), except that the raw materials and the compounding ratio were changed as described in Tables 9 to 13 below.

(Synthesis of (P-9))

To a 200 mL three-necked flask, 134.3 g of dimethylacetamide, 10.38 g of xylylene diisocyanate (1.1 equivalent/OH group), and 47.18 g of polycarbonate diol (ETERNACOLL UM-90 (3/1)) were added, and the mixture was allowed to react at 80° C. for 20 hours, to obtain a urethane prepolymer having a terminal isocyanato group, and thereafter, 3.76 g of PSS-(3-MERCAPTO)PROPYL-HEPTAISOBUTYL SUBSTITUTED (manufactured by Sigma Aldrich Japan K.K.) (1.1 equivalent/isocyanato group) were added thereto, and the resulting mixture was further allowed to react for 10 hours. The resulting reaction product was poured into methanol to perform reprecipitation purification, followed by drying under pressure, to obtain 58.0 g of (P-9).

(Synthesis of (P-10) and (P-11), and (P-15) to (P-17))

Synthesis of polymers (P-10) and (P-11), and (P-15) to (P-17) each having a structure described in Tables 17 to 19 below was conducted in a manner similar to that in (P-9), except that the raw materials and the compounding ratio were changed as described in Tables 11 to 13 below.

TABLE 9

| (Comp. A) | Type | a (mol %) | b (mol %) | c (mol %) | | Terminal Introducing Monomer | Mw |
|---|---|---|---|---|---|---|---|
| P-1 | Polyurethane | IPDI (50) | UM-90 (3/1) (20) | PSS-(2,3-Propane-diol)propoxy-Heptaisobutyl substituted (30) (*1) | [silsesquioxane structure] | Methanol | 32000 |
| P-2 | Polyurethane | IPDI (50) | UH-50 (20) | PSS-(2,3-Propane-diol)propoxy-Heptaisobutyl substituted (30) (*1) | [silsesquioxane structure] | Methanol | 26000 |
| P-3 | Polyurethane | IPDI (50) | PPG1000 (10) | PSS-(2,3-Propane-diol)propoxy-Heptaisobutyl substituted (40) (*1) | [silsesquioxane structure] | Methanol | 15000 |

TABLE 9-continued
| (Comp. A) | Type | a (mol %) | b (mol %) | c (mol %) | | Terminal Introducing Monomer | Mw |
|---|---|---|---|---|---|---|---|
| P-4 | Polyurethane | IPDI (50) | PPG1000 (15) | PSS-(2-(trans-3,4-Cyclohexanediol)ethyl)-Heptaisobutyl substituted (35) (*1) | 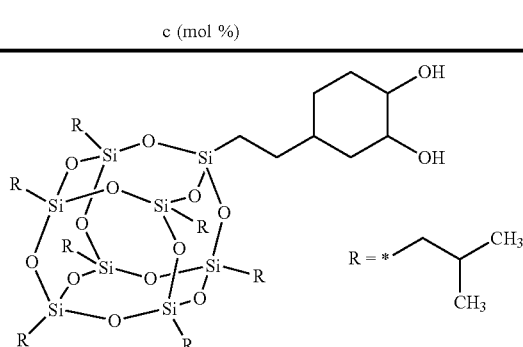 | Methanol | 48000 |
| P-5 | Polyurethane | MDI (40) | TM HDI (10) DEG (10) | PSS-(2-(trans-3,4-Cyclohexanediol)ethyl)-Heptaisobutyl substituted (40) (*1) | 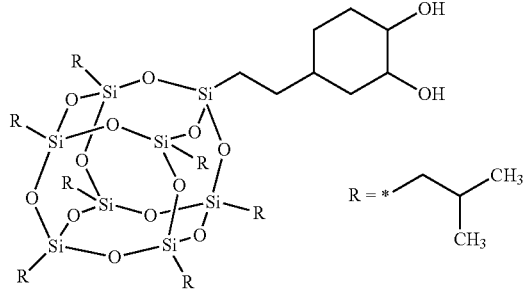 | Methanol | 81000 |
(Comp. A): (Component A)

TABLE 10

| (Com. A) | Type | a (mol %) | | b (mol %) | | c (mol %) |
|---|---|---|---|---|---|---|
| P-6 | Poly urethane | MDI (40) | TM HDI (10) | PPG300 (15) | | PSS-[3-(1,3-PROPANE DIOL-2-ETHYL-2-METHYLOXY)PROPYLDIMETHYL SILYLOXY], HEPTACYCLOPENTYL SUBSTITUTED(35) (*1) 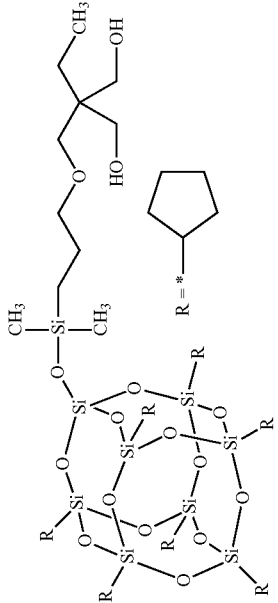 |
| P-7 | Poly urethane | XDI (50) | | PPG700 (25) | 1,2-Diamino propane (5) | PSS-[3-(1,3-PROPANE DIOL-2-ETHYL-2-METHYLOXY)PROPYLDIMETHYL SILYLOXY], HEPTACYCLOPENTYL SUBSTITUTED(45) (*1) 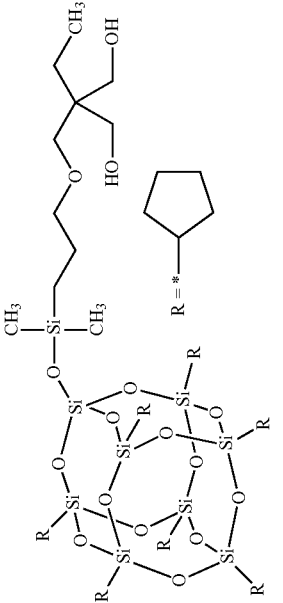 |
| P-8 | Poly urethane | XDI (50) | | PPG700 (25) | N-Methyl diethanol amine (5) | PSS-[3-(1,3-PROPANE DIOL-2-ETHYL-2-METHYLOXY)PROPYLDIMETHYL SILYLOXY], HEPTACYCLOPENTYL SUBSTITUTED(20) (*1) 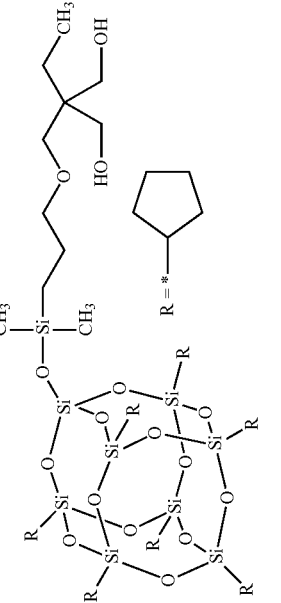 |
| P-9 | Poly urethane | IPDI (50) | | UM-90(3/1) (50) | | |

TABLE 10-continued
| (Com. A) | Terminal Introducing Monomer | Mw |
|---|---|---|
| P-6 | Methanol | 12000 |
| P-7 | Methanol | 42000 |
| P-8 | Methanol | 22000 |
| P-9 | PSS-(3-Mertcaptopropyl)-Heptaisobutyl substituted (*1) 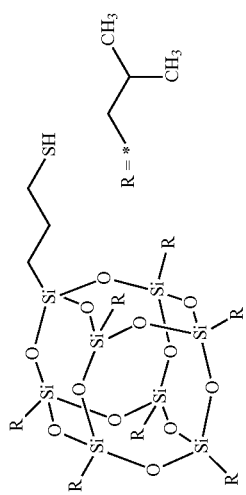 | 34000 |
(Com. A): (Compound A)

TABLE 11
| (Comp. A) | Type | a (mol %) | | b (mol %) | c (mol %) | Terminal Intruducing Monomer | | | Mw |
|---|---|---|---|---|---|---|---|---|---|
| P-10 | Polyurethane | MDI (30) | TM HDI (20) | PPG1000 (49) | | PSS-(3-MERCAPTO) PROPYL-HEPTA-ISO-BUTYL SUBSTITUTED (*1) | 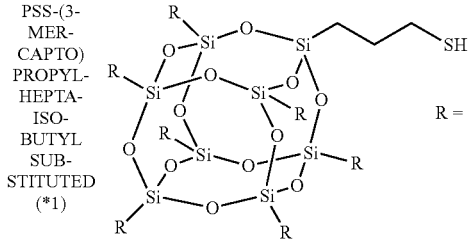 | R = *CH($CH_3$)$CH_3$ | 20000 |
| P-11 | Polyurethane | H12 MDI (50) | | PRAC CELL 205U (50) | | PSS-[3-(2-AMINO ETHYL) AMINO] PROPYL-HEPTA-ISO-BUTYL SUBSTITUTED (*1) | 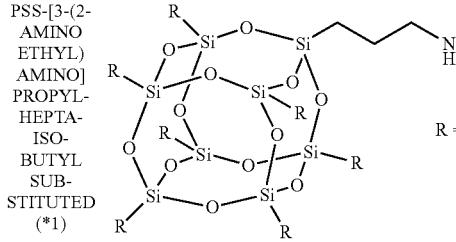 | R = *CH($CH_3$)$CH_3$ | 16000 |
(Comp. A): (Compound A)

TABLE 12

| (Comp. A) | Main Chain Structure | a (mol %) | b (mol %) | c (mol %) |
|---|---|---|---|---|
| P-12 | (Meth)acrylate repeating unit | MMA (60) | | PSS-(1-PROPYLMETHACRYLATO)-HEPTAISOBUTYL SUBSTITUTED (40) |
| P-13 | (Meth)acrylate repeating unit | NVP (60) | | METHACRYLATE ISOBUTYL POSS (40) |
| P-14 | (Meth)acrylate repeating unit | MMA (30) ACMO (30) | MAA (30) nBa | Styrene (40) |
| P-15 | (Meth)acrylate repeating unit | | | |

| (Comp. A) | Terminal Introducing Monomer | Mw |
|---|---|---|
| P-12 | None | 25000 |
| P-13 | None | 23000 |

TABLE 12-continued
| | | | |
|---|---|---|---|
| P-14 | PSS-Glycidyl-Heptacyclopentyl substituted | 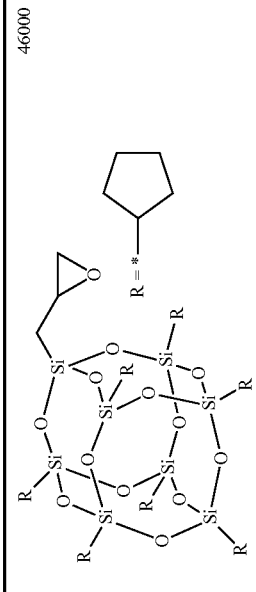 R = * —⟨cyclopentyl⟩ | 46000 |
| P-15 | PSS-(3-Mercapto)propyl-Heptaisobutyl substituted | 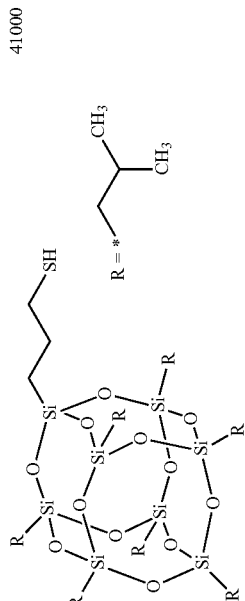 R = * —CH₂CH(CH₃)₂ (isobutyl) | 41000 |
(Comp. A): (Component A)

TABLE 13

| (Component A) | Type | a (mol %) | b (mol %) | c (mol %) | | Terminal Introducing Monomer | Mw |
|---|---|---|---|---|---|---|---|
| P-16 | Poly-acrylate | MMA (30) | iBA | PSS-Vinyl-Heptaisobutyl substituted (10) (*1) | 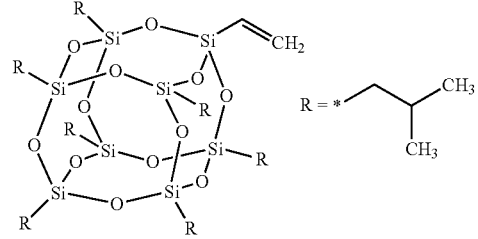 R = *–CH(CH₃)–CH₃ (isobutyl) | None | 10000 |
| P-17 | Poly-acrylate | nBA (90) | | PSS-Allyl-Heptacyclopentyl substituted (10) (*1) | 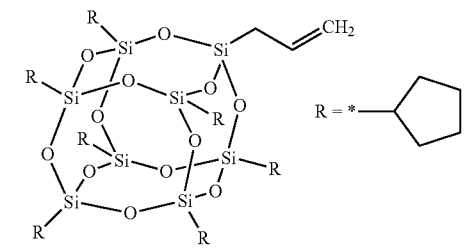 R = *–cyclopentyl | None | 6000 |

In Table 9 to Table 13 above, (*1) represents a trade name or a brand name.

2: In the table, the numeral value in the parenthesis represents the proportion (molar ratio) of the monomers that form the repeating unit.

The abbreviated expressions used in the above tables refer to the following raw materials.

IPDI: (Isophorone Diisocyanate, the following structure, manufactured by Sigma Aldrich Japan K.K.)

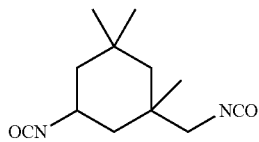

MDI: (4,4'-Diphenylmethane Diisocyanate, the following structure, manufactured by Sigma Aldrich Japan K.K.)

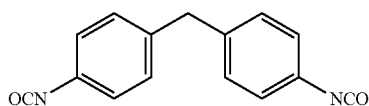

XDI: (Xylylene Diisocyanate, the following structure, manufactured by Mitsui Chemicals Inc., TAKENATE 500)

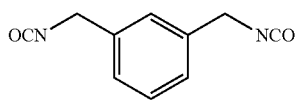

H12MDI: (Dicyclohexylmethane Diisocyanate, the following structure, manufactured by Sigma Aldrich Japan K.K.)

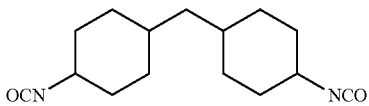

TMHDI: (Trimethylhexamethylene Diisocyanate (2,2,4- and 2,4,4-mixture), manufactured by Tokyo Chemical Industry Co., Ltd.)

DEG: diethylene glycol

UM-90 (3/1): (ETERNACOLL UM-90 (3/1): polycarbonate diol, cyclohexane dimethanol, 1,6-hexane diol (3:1) base, manufactured by Ube Industries, Ltd.)

UH-50: (ETERNACOLL UH-50: polycarbonate diol, 1,6-hexane diol base, manufactured by Ube Industries, Ltd.)

PPG 300: (Polypropylene glycol diol, number average molecular weight 300, manufactured by Wako Pure Chemical Industries, Ltd.)

PPG 700: (Polypropylene glycol diol, number average molecular weight 700, manufactured by Wako Pure Chemical Industries, Ltd.)

PPG 1000: (Polypropylene glycol diol, number average molecular weight 1000, manufactured by Wako Pure Chemical Industries, Ltd.)

PRACCELL 205U: (Polycaprolactone diol, number average molecular weight 530, manufactured by Daicel Corporation)

MMA: methyl methacrylate (manufactured by BASF Japan Ltd.)

MAA: methacrylic acid

ACMO: acryloylmorpholine (manufactured by KOHJIN Holdings Co., Ltd.)

NVP: N-vinylpyrrolidone (manufactured by TOAGOSEI CO., LTD., ARONIX M-150)

nBA: n-butyl acrylate (manufactured by BASF Japan Ltd.)

iBA: isobutyl acrylate (manufactured by BASF Japan Ltd.)

2-Diaminopropane: (manufactured by Tokyo Chemical Industry Co., Ltd.)

N-methyldiethanolamine: (manufactured by Sigma Aldrich Japan K.K.)
The structures of the synthesized (component A) polymers (P-1) to (P-17) are shown in the following tables.
TABLE 14
| (Comp. A) | a | a' | b | c | Terminal Group | Wt. Avg M. W. |
|---|---|---|---|---|---|---|
| (P-1) | 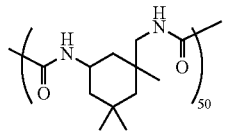 | | 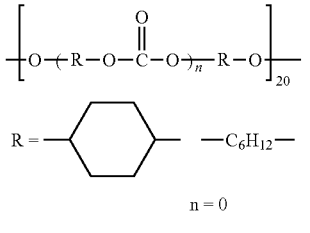 | 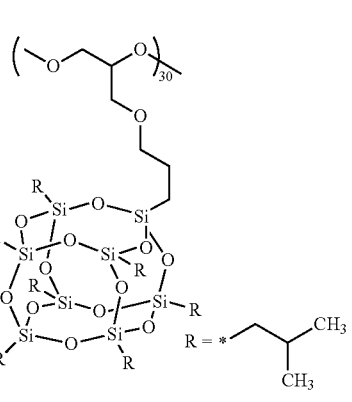 | | 32000 |
| (P-2) | 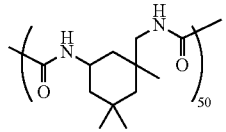 | | 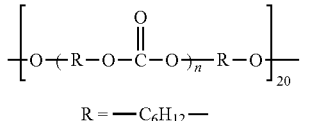 | 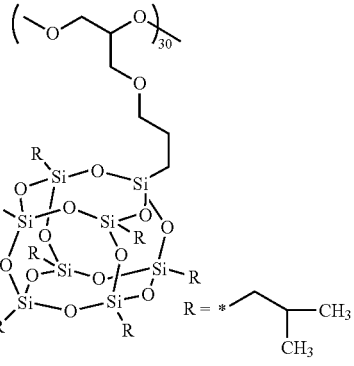 | | 26000 |
| (P-3) | 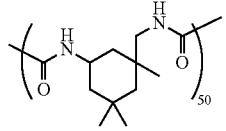 | | 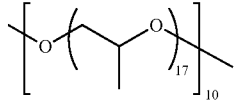 | 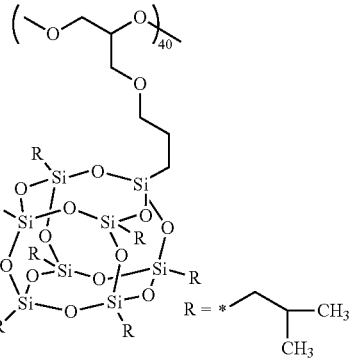 | | 15000 |
(Comp A): (Component A)
Wt. Avg. M. W.: Weight Average Molecular Weight TABLE 15
| (Comp. A) | a | a' | b |
|---|---|---|---|
| (P-4) | 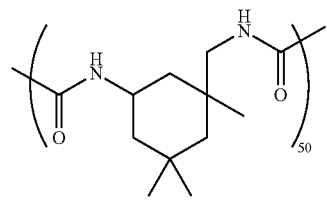 | | 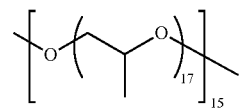 |
| (P-5) | 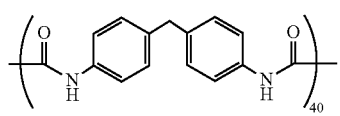 | 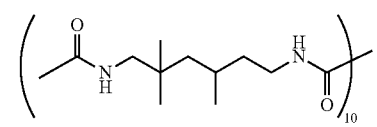 | 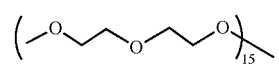 |
| (Comp. A) | c | Terminal Group | Wt. Avg. M. W. |
|---|---|---|---|
| (P-4) | 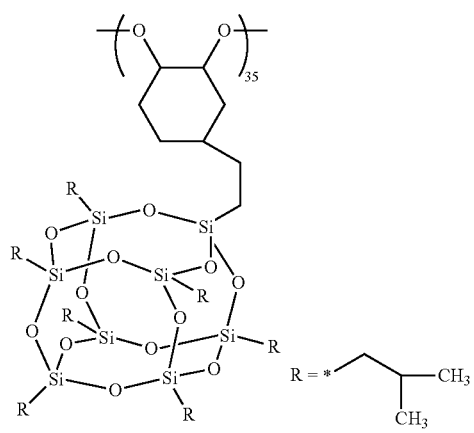 | | 48000 |
| (P-5) | 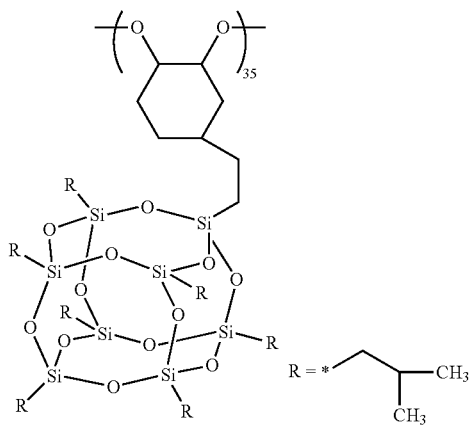 | | 81000 |
(Com A): (Component A)
(Wt. Avg. M. W.): (Weight Average Molecular Weight)

TABLE 16

| (Comp. A) | a | a' | b |
|---|---|---|---|
| (P-6) | -(-C(=O)-NH-C6H4-CH2-C6H4-NH-C(=O)-)-40 | -(-C(=O)-NH-CH2-C(CH3)2-CH2-CH(CH3)-NH-)-10 | -[-O-CH(CH3)-CH2-O-]5-]15 |
| (P-7) | -(-C(=O)-NH-CH2-(m-C6H4)-CH2-NH-C(=O)-)-50 | -(-NH-CH2-CH(CH3)-)-5 | -[-O-CH(CH3)-CH2-O-]11-]25 |

| (Comp. A) | c | Terminal Group | Wt. Avg. M. W. |
|---|---|---|---|
| (P-6) | POSS-cyclopentyl silsesquioxane structure with -(-O-CH2-C(Et)(CH2-O-)35-)- linker to propyl-Si(CH3)2-O-POSS cage, R = cyclopentyl | | 12000 |
| (P-7) | POSS-cyclopentyl silsesquioxane structure with -(-O-)20- linker to propyl-Si(CH3)2-O-POSS cage, R = cyclopentyl | | 42000 |

(Comp. A): (Component A)
Wt. Avg. M. W.: Weight Average Molecular Weight

TABLE 17

| (Comp. A) | a | a' | b | c |
|---|---|---|---|---|
| (P-10) | -[C(=O)-NH-C6H4-CH2-C6H4-NH-C(=O)-]-30 | -[C(=O)-NH-CH(CH3)-CH2-CH2-CH(CH3)-CH2-NH-C(=O)-]-20 | -[O-CH(CH3)-CH2-O-]-11, ×50 | |
| (P-11) | -[C(=O)-NH-C6H10-CH2-C6H10-NH-C(=O)-]- | -[(O-CH2CH2CH2CH2-C(=O))n-O-CH2CH2-O-(C(=O)-CH2CH2CH2CH2-O)m]-100, m=50, n=50 | | |
| (P-12) | -[CH2-C(CH3)(C(=O)OMe)]-60 | | | |
| (P-13) | -[CH2-CH(N-caprolactam)]-60 | | | |

| (Comp. A) | c | Terminal Group | Wt. Avg. M. W. |
|---|---|---|---|
| (P-10) | | POSS cage with R groups (R = isobutyl, -CH2-CH(CH3)-CH3), connected via -S-CH2CH2CH2-Si- to cage | 20000 |
| (P-11) | | POSS cage with R groups (R = isobutyl, -CH2-CH(CH3)-CH3), connected via -S-CH2CH2CH2-Si- to cage | 16000 |

TABLE 17-continued

| | | Wt. Avg. M. W. |
|---|---|---|
| (P-12) | [POSS-based structure with isobutyl R groups, polymer backbone with n=40, ester linker; R = *-CH₂-CH(CH₃)-CH₃] | 25000 |
| (P-13) | [POSS-based structure with isobutyl R groups, polymer backbone with n=40, ester linker; R = *-CH₂-CH(CH₃)-CH₃] | 23000 |

(Comp. A): (Component A)
Wt. Avg. M. W.: Weight Average Molecular Weight

TABLE 18

| (Comp. A) | a | a' | b | c | Terminal Group | Wt. Avg. M. W. |
|---|---|---|---|---|---|---|
| (P-14) | [methacrylate -OMe, n=30] | | [styrene unit, n=40] | [methacrylate with glyceryl-OH linker to POSS cage; R = cyclopentyl, n=30] | | 46000 |

TABLE 18-continued
| (Comp. A) | a | a' | b | c | Terminal Group | Wt. Avg. M. W. |
|---|---|---|---|---|---|---|
| (P-15) | 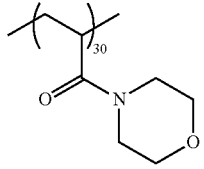 | 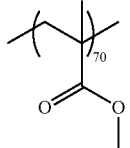 | | | 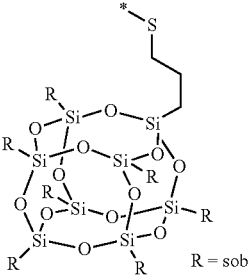<br>R = sobutyl | 41000 |
(Comp. A): (Component A)
Wt. Avg. M. W: Weight Average Molecular Weight
TABLE 19
| (Comp. A) | a | a' b | c | Terminal Group | Wt. Avg. M. W. |
|---|---|---|---|---|---|
| (P-16) | 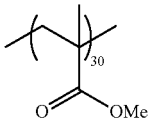 | 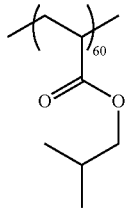 | | 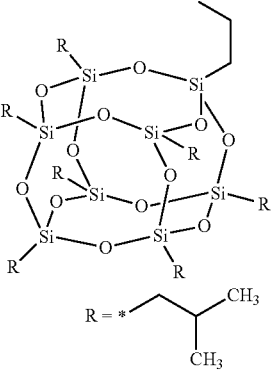 | 10000 |
| (P-17) | 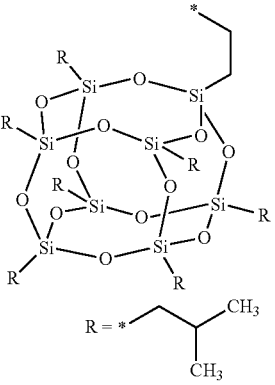 | | | | 6000 |
(Comp. A): (Compound A)
Wt. Avg. M. W.: Weight Average Molecular Weight As (P-18), trade name: POLY[(PROPYLMETHACRYL-HEPTAISOBUTYL-PSS)—CO—(N-BUTYL METH-ACRYLATE)] (manufactured by Sigma Aldrich Japan K.K., weight average molecular weight 45000, the following structure) was used.

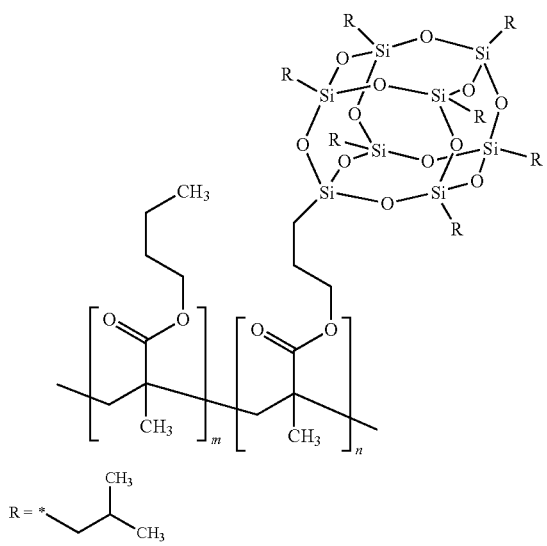

As (P-19), trade name: POLY[(PROPYLMETHACRYL-HEPTAISOBUTYL-PSS)—CO-STYRENE] (manufactured by Sigma Aldrich Japan K.K., weight average molecular weight 48000, the following structure) was used.

As (P-20), trade name: POLY[(PROPYLMETHACRYL-HEPTAISOBUTYL-PSS)—CO-HYDROXYETHYL METHACRYLATE] (manufactured by Sigma Aldrich Japan K.K., the following structure) was used.

<Comparative Compound: AC-SQ>

An acryloyl-modified silsesquioxane (trade name: AC-SQ, TOAGOSEI CO., LTD.) described in Example 17 in JP-A No. 2010-13514 was used as a comparative compound.

<Preparation of Ink Composition>

Example 1

The components shown below were mixed, to prepare an ink composition according to Example 1.

| | |
|---|---|
| IBOA (isobornyl acrylate, (component B) monofunctional polymerizable compound) | 20.0 parts |
| NVC (N-vinylcaprolactam, V-CAP, manufactured by BASF Japan Ltd., radically polymerizable compound: (component B) monofunctional polymerizable compound) | 40.0 parts |
| NVF (N-vinylformamide, (component B) monofunctional polymerizable compound) | 10.0 parts |
| FA-513 (dicyclopentanyl acrylate: (component B) monofunctional polymerizable compound) | 16.0 parts |
| ACMO (acryloylmorpholine: (component B) monofunctional polymerizable compound) | 10.0 parts |
| Pigment dispersion (K1 described above) | 13.6 parts |
| IRGACURE 819 (available from: manufactured by BASF Japan Ltd.: (component C) polymerization initiator) | 6.0 parts |
| (P-1) (component A) | 5 parts |
| BYK 307 [manufactured by BYK Chemie GmbH, surfactant] | 0.05 parts |

Examples 2 to 31 and Comparative Examples 1 and 2

Preparation of Examples 2 to 31 and Comparative Examples 1 and 2 was conducted in a manner similar to that in Example 1, except that the pigment dispersion, the polymerizable compounds (the monofunctional polymerizable compounds and the polyfunctional polymerizable compound) and the (component A) were changed as described in the table below.

Here, the abbreviated expressions used in the table refer to the following compounds.

((Component B) Monofunctional Polymerizable Compound)
IBOA: isobornyl acrylate
NVC: N-vinylcaprolactam
NVF: N-vinylformamide FA-513: dicyclopentanyl acrylate
ACMO: acryloylmorpholine
(Polyfunctional Polymerizable Compound)
HDDA: hexamethylene diacrylate [manufactured by Nippon Shokubai Co., Ltd.]
TPGDA: tripropylene glycol diacrylate [NK ESTER APG-200, manufactured by Shin-Nakamura Chemical Co., Ltd.]
TMP(PO)TA: trimethylolpropane PO modified triacrylate [ARONIX M-310, manufactured by TOAGOSEI CO., LTD.]

[Evaluation]

<Inkjet Image Recording>

First, the ink composition thus prepared was filtered by using a filter with absolute filtration accuracy of 2 μm.

Next, using a commercially available inkjet recording apparatus (trade name: LUXEL JET UV350GTW, manufactured by Fujifilm Corporation) having a piezo type inkjet nozzle, recording on a recording medium (a sheet of soft vinyl chloride, thickness 50 μm, manufactured by AVERY DENNISON CORP.) was performed under the condition of a fine mode, a mode of Lamp 5. The ink supply system includes a main tank, a supply piping, an ink supply tank immediately before an inkjet head, a filter, and a piezo type inkjet head; and heat insulation and heating were performed in the section from the ink supply tank to the inkjet head part, and the temperature was adjusted so that the temperature of the nozzle part was always at 45° C.±2° C. The piezo type inkjet head was driven so that multisize dots of from 8 pL to 30 pL could be discharged with a resolution of 600 dpi×450 dpi (dot per inch), to form a solid image. Here, the "dpi (dot per inch)" in the present invention represents the number of dots per 2.54 cm.

In accordance with the above conditions, an image to be used for evaluation of punching process suitability and molding properties (elongation percentage and cracking) according to the ink composition was formed. Results are shown in the table below. The methods for the measurement and evaluation of each evaluation item in the table shown below are as follows.

(Evaluation of Storage Stability)

The prepared ink composition was stored at 75% RH and 60° C. for three days, and thereafter, the resulting ink composition was cooled to the ejection temperature (45° C.±2° C.). Subsequently, the ink viscosity at the temperature of 45° C.±2° C. was measured, and the increase in ink viscosity was determined by calculating the ratio of viscosity after storage/viscosity before storage. Regarding the ink compositions of Examples, the changes in viscosity were all 1.3 or less and, as a result, it was revealed that the storage stability was good.

(Evaluation of Discharge Stability)

In order to evaluate the discharge stability of ink at the head nozzles, the number of nozzle loss after carrying out continuous discharge for 60 minutes using a commercially available inkjet recording apparatus having piezo type inkjet head nozzles under the following conditions was evaluated.

In the experiment, the ink compositions according to Examples 1 to 31 and Comparative Examples 1 and 2 were each discharged onto a PET substrate under the following conditions, and the number of nozzle loss (number of clogged nozzles) in the case of carrying out exposure (exposure amount: 1000 mW/cm$^2$) was counted. Regarding the ink compositions of Examples, the numbers of nozzle loss were all 0 or more but less than 5 and, as a result, it was revealed that the discharge stability was good.

—Conditions—
Number of channels: 318/head
Driving frequency: 4.8 kHz/dot
Ink droplet: 7 droplets, 42 pL
Temperature: 45° C.

(Evaluation of Blocking Sensitivity)

Concerning the blocking sensitivity, a solid image of 12 μm was formed by a bar coating method with the ink composition used in the above inkjet image recording, then the image was cured by irradiation (exposure) with ultraviolet rays using a proximity type exposure apparatus (manufactured by Hitachi High-Tech Electronics Engineering Co., Ltd.) having a high-pressure mercury lamp, to obtain printed matter. Using images which were formed by increasing the exposure energy at intervals of 1000 mJ/cm$^2$, the degree of exposure energy at which blocking had occurred was confirmed. Specifically, on the image formed after the ultraviolet radiation, five hundred sheets of recording medium on which an image was not formed (soft vinyl chloride sheets) were superposed, and allowed to stand for one day. Thereafter, transfer to the superposed sheets of recording medium was visually evaluated. The case in which the transfer is not easily observed is deemed as over the acceptance line, and the case in which the transfer is easily observed is deemed as below the acceptance line, and the amount of exposure energy [mJ/cm$^2$] that is necessary for the result to reach the acceptance line is defined as the blocking sensitivity.

The acceptable range of the blocking sensitivity is 12,000 mJ/cm$^2$ or less, and it is preferable that the blocking sensitivity is 6,000 mJ/cm$^2$ or less.

(Evaluation of Stretchability)

Printed matter for evaluation of stretchability was obtained in a similar manner as in the above inkjet image recording, except that the recording medium (soft vinyl chloride sheet) was changed to FASSON PE (polyethylene film manufactured by FASSON; film thickness 100 nm), and the ultraviolet radiation with a high-pressure mercury lamp after inkjet image recording was carried out at an integrated exposure amount of 12,000 mJ/cm$^2$ and at an illuminance of 2,140 mW/cm$^2$.

The obtained printed matter for evaluation of stretchability was cut into a size of 5 cm in axis length×2.5 cm in width, and was stretched at a velocity of 30 cm/min using a tension tester (manufactured by Shimadzu Corporation), and the elongation percentage at which the cured film fractured was measured. The state in which the sample is stretched to a length twice the initial length is defined as the elongation percentage of 100%. The acceptable range of the elongation percentage is 200% or more, and it is preferable that the elongation percentage is 300% or more.

(Vacuum Molding Evaluation)

The printed matter for evaluation of elongation percentage was fabricated according to the following method, and then the molded printed matter thus obtained was observed, and the processing suitability was evaluated.

Vacuum molding was carried out by using a vacuum forming apparatus, FORMING 300×[manufactured by Seikosangyo Co., Ltd.] and using a polycarbonate sheet (manufactured by Teijin Chemicals Ltd.) instead of using the recording medium for evaluation of elongation percentage. A wooden mold shown in FIG. 1 was placed at the center of a vacuum table of the vacuum forming apparatus, and the temperature of the heater was set such that the temperature of the recording medium, namely, the support, was 170° C. After the recording medium was heated to a temperature of 170° C., vacuum molding was performed while slowly elevating the vacuum table on which the wooden mold was placed by operating a table elevating lever. The printed matter thus molded was visually observed to see whether cracks or white spots had occurred or not, and the results were evaluated according to the following evaluation criteria.

—Evaluation Criteria—

A: The occurrence of cracks or white spots was not observed.

B: The occurrence of a small number of cracks or white spots was observed.

C: A lot of cracks or white spots occurred, and vacuum molding could not be carried out.

(Evaluation of Punching Property)

Using the same sample as the sample for evaluation of vacuum molding, the sample was punched out by hitting a hole-making punch ($\varphi=10$ mm) with a hammer, and the results were evaluated according to the following evaluation criteria.

—Evaluation Criteria—

A: The occurrence of cracks was hardly observed at the periphery of the hole, even with an observation using an optical microscope.

B: Slight cracks which were visually unnoticeable occurred at the periphery of the hole.

C: Visually noticeable cracks occurred at the periphery of the hole.

TABLE 20

| | Pigment Dispersion | Pigment Dispersion Content [parts by mass] | Pigment Dispersion-Derived Monofunctional Polymerizable Compound (PEA) [parts by mass] | Polymerizable Compound (Component B) Monofunctional Polymerizable Compound [parts by mass] | | | | |
|---|---|---|---|---|---|---|---|---|
| | | | | IBOA | NVC | NVF | FA-513 | ACMO |
| Example 1 | K1 | 9 | 6.8 | 20 | 20 | 10 | 16 | 10 |
| Example 2 | M1 | 16 | 12.8 | 20 | 20 | 10 | 16 | 10 |
| Example 3 | C1 | 9 | 6.75 | 20 | 20 | 10 | 16 | 10 |
| Example 4 | Y1 | 8 | 6.8 | 20 | 20 | 10 | 16 | 10 |
| Example 5 | W1 | 30 | 22.5 | 20 | 20 | 10 | 16 | 10 |
| Example 6 | K1 | 9 | 6.8 | 20 | 20 | 10 | 16 | 10 |
| Example 7 | K1 | 9 | 6.8 | 20 | 20 | 10 | 16 | 10 |
| Example 8 | K1 | 9 | 6.8 | 20 | 20 | 10 | 16 | 10 |
| Example 9 | K1 | 9 | 6.8 | 20 | 20 | 10 | 16 | 10 |
| Example 10 | K1 | 9 | 6.8 | 20 | 20 | 10 | 16 | 10 |
| Example 11 | K1 | 9 | 6.8 | 20 | 20 | 10 | 16 | 10 |
| Example 12 | K1 | 9 | 6.8 | 20 | 20 | 10 | 16 | 10 |
| Example 13 | K1 | 9 | 6.8 | 20 | 20 | 10 | 16 | 10 |
| Example 14 | K1 | 9 | 6.8 | 20 | 20 | 10 | 16 | 10 |
| Example 15 | K1 | 9 | 6.8 | 20 | 20 | 10 | 16 | 10 |
| Example 16 | K1 | 9 | 6.8 | 20 | 20 | 10 | 16 | 10 |
| Example 17 | K1 | 9 | 6.8 | 20 | 20 | 10 | 16 | 10 |
| Example 18 | K1 | 9 | 6.8 | 20 | 20 | 10 | 16 | 10 |
| Example 19 | K1 | 9 | 6.8 | 20 | 20 | 10 | 16 | 10 |
| Example 20 | K1 | 9 | 6.8 | 20 | 20 | 10 | 16 | 10 |
| Example 21 | K1 | 9 | 6.8 | 20 | 20 | 10 | 16 | 10 |
| Example 22 | K1 | 9 | 6.8 | 20 | 20 | 10 | 16 | 10 |
| Example 23 | K1 | 9 | 6.8 | 20 | 20 | 10 | 16 | 10 |
| Example 24 | K1 | 9 | 6.8 | 20 | 20 | 10 | 16 | 10 |
| Example 25 | K1 | 9 | 6.8 | 20 | 20 | 10 | 16 | 10 |
| Example 26 | K1 | 9 | 6.8 | 20 | 20 | 10 | 16 | 10 |
| Example 27 | K1 | 9 | 6.8 | 20 | 20 | 10 | 16 | 10 |
| Example 28 | K1 | 9 | 6.8 | 20 | 20 | 7 | 12 | 10 |
| Example 29 | K1 | 9 | 6.8 | 15 | 20 | 6 | 12 | 6 |
| Example 30 | K1 | 9 | 6.8 | 20 | 20 | 10 | 16 | 10 |
| Example 31 | K1 | 9 | 6.8 | 20 | 20 | 10 | 16 | 10 |

TABLE 20-continued

| | | | | | | | | |
|---|---|---|---|---|---|---|---|---|
| Comparative Example 1 | K1 | 9 | 6.8 | 20 | 20 | 10 | 16 | 10 |
| Comparative Example 2 | K1 | 9 | 6.8 | 20 | 20 | 10 | 16 | 10 |

| | Polymerizable Compound | | | | | (Component A) | |
|---|---|---|---|---|---|---|---|
| | Polyfunctional Polymerizable Compound [parts by mass] | | | Total | Proportion of Monofunctional Polymerizable Compound with respect to the Total Content of | | |
| | HDDA | TPGDA | TMP (PO) TA | [parts by mass] | Polymerizable Compounds [% by mass] | Abbreviation | Addition Amount [parts by mass] |
| Example 1 | 1 | 0 | 0 | 83.8 | 98.8 | P-1 | 5 |
| Example 2 | 1 | 0 | 0 | 89.8 | 98.9 | P-1 | 5 |
| Example 3 | 1 | 0 | 0 | 83.75 | 98.8 | P-1 | 5 |
| Example 4 | 1 | 0 | 0 | 83.8 | 98.8 | P-1 | 5 |
| Example 5 | 1 | 0 | 0 | 99.5 | 99.0 | P-1 | 5 |
| Example 6 | 0 | 0 | 1 | 83.8 | 98.8 | P-1 | 5 |
| Example 7 | 0 | 0 | 1 | 83.8 | 98.8 | P-2 | 5 |
| Example 8 | 0 | 0 | 1 | 83.8 | 98.8 | P-3 | 5 |
| Example 9 | 0 | 0 | 1 | 83.8 | 98.8 | P-4 | 5 |
| Example 10 | 0 | 0 | 1 | 83.8 | 98.8 | P-5 | 5 |
| Example 11 | 0 | 1 | 0 | 83.8 | 98.8 | P-6 | 5 |
| Example 12 | 0 | 1 | 0 | 83.8 | 98.8 | P-7 | 5 |
| Example 13 | 0 | 1 | 0 | 83.8 | 98.8 | P-8 | 5 |
| Example 14 | 0 | 1 | 0 | 83.8 | 98.8 | P-9 | 5 |
| Example 15 | 0 | 1 | 0 | 83.8 | 98.8 | P-10 | 5 |
| Example 16 | 0 | 1 | 0 | 83.8 | 98.8 | P-11 | 5 |
| Example 17 | 0 | 1 | 0 | 83.8 | 98.8 | P-12 | 5 |
| Example 18 | 0 | 1 | 0 | 83.8 | 98.8 | P-13 | 5 |
| Example 19 | 0 | 1 | 0 | 83.8 | 98.8 | P-14 | 5 |
| Example 20 | 1 | 0 | 0 | 83.8 | 98.8 | P-15 | 5 |
| Example 21 | 1 | 0 | 0 | 83.8 | 98.8 | P-16 | 5 |
| Example 22 | 1 | 0 | 0 | 83.8 | 98.8 | P-17 | 5 |
| Example 23 | 1 | 0 | 0 | 83.8 | 98.8 | P-18 | 5 |
| Example 24 | 1 | 0 | 0 | 83.8 | 98.8 | P-19 | 5 |
| Example 25 | 1 | 0 | 0 | 83.8 | 98.8 | P-20 | 5 |
| Example 26 | 1 | 0 | 0 | 83.8 | 98.8 | P-1 | 5 |
| Example 27 | 1 | 0 | 0 | 83.8 | 98.8 | P-1 | 0.2 |
| Example 28 | 8 | 0 | 0 | 83.8 | 90.5 | P-1 | 5 |
| Example 29 | 5 | 4 | 8 | 83.8 | 79.7 | P-1 | 5 |
| Example 30 | 0 | 0 | 0 | 82.8 | 100.0 | P-1 | 5 |
| Example 31 | 1 | 0 | 0 | 83.8 | 98.8 | P-1 | 10 |
| Comparative Example 1 | 1 | 0 | 0 | 83.8 | 98.8 | AC-SQ | 5 |
| Comparative Example 2 | 1 | 0 | 0 | 83.8 | 98.8 | none | 0 |

| | | Molding Properties | | |
|---|---|---|---|---|
| | Blocking Sensitivity [mJ/cm$^2$] | Elongation Percentage (%) | Vacuum Molding Evaluation | Punching Property |
| Example 1 | 8,000 | 320 | A | A |
| Example 2 | 8,000 | 320 | A | A |
| Example 3 | 8,000 | 320 | A | A |
| Example 4 | 8,000 | 320 | A | A |
| Example 5 | 7,000 | 320 | A | A |
| Example 6 | 7,000 | 320 | A | A |
| Example 7 | 8,000 | 320 | A | A |
| Example 8 | 7,000 | 320 | A | A |
| Example 9 | 7,000 | 320 | A | A |
| Example 10 | 7,000 | 320 | A | A |
| Example 11 | 8,000 | 320 | A | A |
| Example 12 | 8,000 | 320 | A | A |
| Example 13 | 6,000 | 320 | A | A |
| Example 14 | 8,000 | 270 | A | B |
| Example 15 | 8,000 | 340 | A | B |
| Example 16 | 8,000 | 300 | A | B |
| Example 17 | 8,000 | 290 | A | A |

TABLE 20-continued

| | | | | |
|---|---|---|---|---|
| Example 18 | 8,000 | 290 | A | A |
| Example 19 | 7,000 | 220 | A | A |
| Example 20 | 9,000 | 320 | A | B |
| Example 21 | 8,000 | 270 | A | B |
| Example 22 | 7,000 | 270 | A | B |
| Example 23 | 7,000 | 300 | A | B |
| Example 24 | 6,000 | 300 | A | B |
| Example 25 | 6,000 | 300 | A | B |
| Example 26 | 7,000 | 300 | A | B |
| Example 27 | 8,000 | 300 | B | B |
| Example 28 | 5,000 | 200 | B | B |
| Example 29 | 6,000 | 160 | B | B |
| Example 30 | 6,000 | 360 | A | A |
| Example 31 | 7,000 | 300 | A | A |
| Comparative Example 1 | 6,000 | 140 | C | C |
| Comparative Example 2 | 8,000 | 320 | C | C |

As is understood from Table 20 above, by using the ink compositions of Examples according to the first embodiment of the present invention, printed matter which has good molding properties and good punching property can be obtained, as compared with the ink compositions of Comparative Examples.

Further, the ink compositions according to the first embodiment of the present invention exhibit good ink storage stability, good ejection stability, and good blocking sensitivity.

Hereinafter, Examples relating to the second embodiment of the present invention are specifically described.

<Preparation of Pigment Dispersion>

The pigment, monofunctional polymerizable compound, and dispersing agent shown in the following table were mixed and stirred, to prepare pigment dispersions (Y2, M2, C2, K2, and W2) of respective colors. The preparation of the pigment dispersions was performed through carrying out dispersion using a dispersing machine MOTOR MILL M50 (manufactured by Eiger Machinery, Inc.), and using zirconia beads having a diameter of 0.65 mm, at a peripheral velocity of 9 m/s, for a period of time described in the following table.

TABLE 21

| Pigment Dispersion Composition (parts by mass) | Cyan Pigment Dispersion C2 | Magenta Pigment Dispersion M2 | Yellow Pigment Dispersion Y2 | Black Pigment Dispersion K1 | White Pigment Dispersion W1 |
|---|---|---|---|---|---|
| IRGALITTE BLUE GLVO (Cyan pigment, manufactured by BASF Japan Ltd.) | 300 | — | — | — | — |
| CINQUASIA MAGENTA RT-355D (Magenta pigment, manufactured by BASF Japan Ltd.) | — | 300 | — | — | — |
| NOVOPERM YELLOW H2G (Yellow pigment, manufactured by Clariant) | — | — | 300 | — | — |
| SPECIAL BLACK 250 (Black pigment, manufactured by BASF Japan Ltd.) | — | — | — | 400 | — |
| TAIPAQUE CR60-2 (White pigment, manufactured by Ishihara Sangyo Kaisha, Ltd.) | — | — | — | — | 500 |
| 2-Phenoxyethyl Acrylate | 620 | 600 | 600 | 520 | 440 |
| SOLSPERSE 32000 (Dispersing agent, manufactured by Noveon, Inc.) | 80 | 100 | 100 | 80 | 60 |
| Peripheral Velocity (m/s) | 9 | 9 | 9 | 9 | 9 |
| Time (hours) | 4 | 10 | 10 | 7 | 4 |

Example 32

The components shown below were stirred using a rotor/stator high shear mixer manufactured by Silverson Machines, Inc. to prepare an ink composition of Example 32.

| | |
|---|---|
| Magenta pigment dispersion (M2) | 13 parts |
| (A-1-1) (trade name: ISOOCTYL POSS CAGE | 0.1 parts |

-continued

| | |
|---|---|
| MIXTURE, MS 0805, (component A'), manufactured by Hybrid Plastics Inc.), the following structure) | |
| NVC ((component B') monofunctional polymerizable compound, N-vinylcaprolactam) | 33 parts |
| FA513AS ((component B') monofunctional polymerizable compound, dicyclopentanyl acrylate) | 23.9 parts |
| NIPAM ((component B') monofunctional polymerizable compound, N-isopropylacrylamide, Tokyo Chemical Industry Co., Ltd.) | 20 parts |
| HDDA (polyfunctional polymerizable compound, 1,6-hexanediol diacrylate) | 1 part |
| IRG 819 (manufactured by BASF Japan Ltd., (component C) polymerization initiator) | 3 parts |
| IRG 907 (manufactured by BASF Japan Ltd., (component C) polymerization initiator) | 2 parts |
| DETX (2,4-diethyl thioxanthone, SUN CHEMICAL COMPANY LTD., (component C) polymerization initiator) | 3 parts |
| FIRSTCURE ST-1 (tris(N-nitroso-N-phenylhydroxyamine) aluminum salt, ChemFirst Inc., polymerization inhibitor) | 1 part |

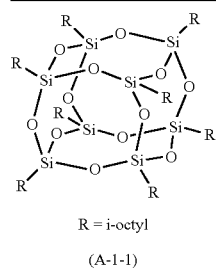

R = i-octyl (A-1-1)

Example 33 to Example 65, Comparative Example 3 and Comparative Example 4

Preparation of Example 33 to Example 65, and Comparative Example 3 and Comparative Example 4 was conducted in a manner similar to that in Example 32, except that the pigment dispersion, the polymerizable compounds (the monofunctional polymerizable compounds and the polyfunctional polymerizable compound) and the (component A') were changed as described in Table 22 and Table 23.

Here, the abbreviated expressions used in the tables refer to the following compounds.

((Component A') Silsesquioxane Compound)

(A-1-2) trade name: PHENYL ISOBUTYL POSS, MS0813, (manufactured by Hybrid Plastics Inc., the following structure)

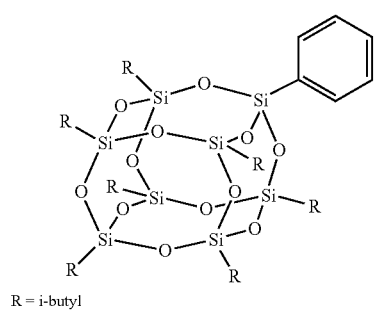

R = i-butyl (A-1-3) trade name: PHENYL ISOOCTYL POSS, MS0814 (manufactured by Hybrid Plastics Inc., the following structure)

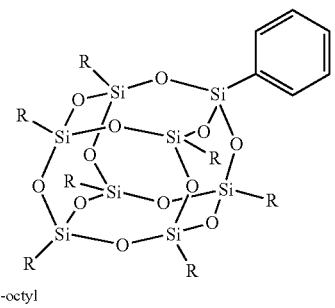

R = i-octyl (A-1-4) trade name: ISOOCTYLPHENYL POSS, MS0815, (manufactured by Hybrid Plastics Inc., the following structure)

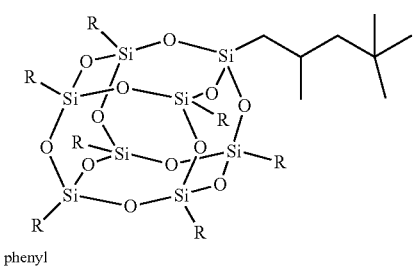

R = phenyl (A-1-5) trade name: OCTAISOBYTYL POSS, MS0825, (manufactured by Hybrid Plastics Inc., the following structure)

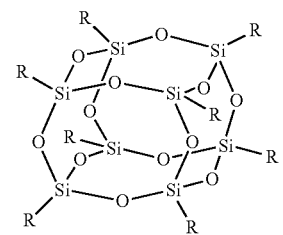

R = i-butyl (A-1-6) trade name: OCTAPHENYL POSS, MS0840 (manufactured by Hybrid Plastics Inc., the following structure)

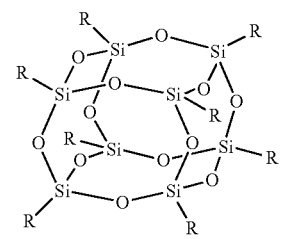

R = phenyl (A-1-7) trade name: PSS-OCTAHEXYL SUBSTITUTED, 534412 (manufactured by Sigma-Aldrich Corporation, the following structure)

(A-1-8) trade name: TRANS-CYCLOHEXANE-DIOLISOBUTYL POSS, AL0125 (manufactured by Hybrid Plastics Inc., the following structure)

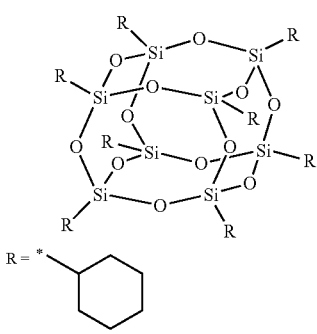

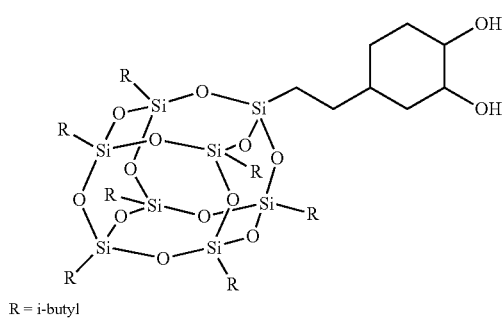

(A-1-9) trade name: AMINOPROPYLISOBUTYL POSS, AM0265 (manufactured by Hybrid Plastics Inc., the following structure)

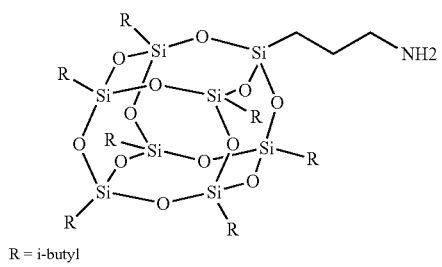

(A-1-10) trade name: EPOXYCYCLOHEXYLISOBYTYL POSS, EP0402 (manufactured by Hybrid Plastics Inc., the following structure)

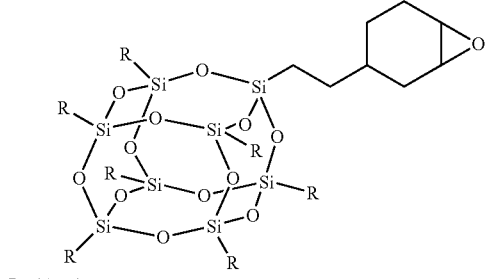

(A-1-11) trade name: GLYCIDYLISOBYTYL POSS, EP0418 (manufactured by Hybrid Plastics Inc., the following structure)

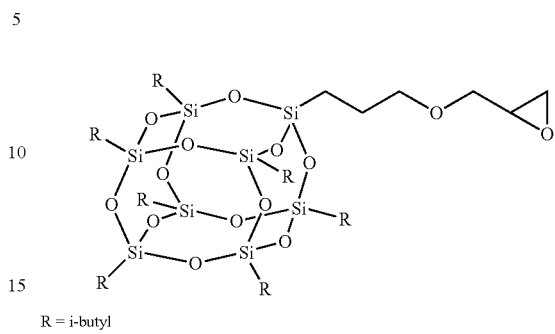

(A-1-12) trade name: CHLOROBENZYLISOBUTYL POSS, HA0605 (manufactured by Hybrid Plastics Inc., the following structure)

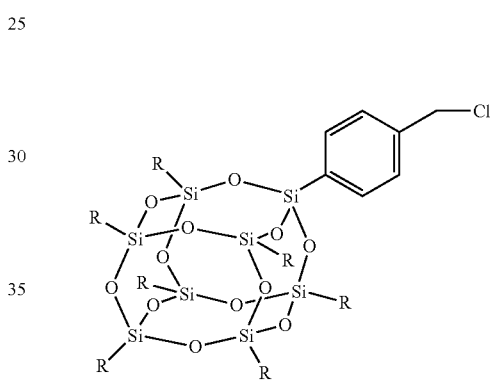

(A-1-13) trade name: MERCAPTOPROPYLISOBUTYL POSS, TH1550 (manufactured by Hybrid Plastics Inc., the following structure)

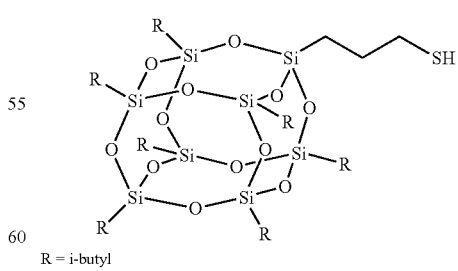

(A-1-14) trade name: PSS-2-(DIPHENYLPHOSPHINO) SUBSTITUTED, 477656 (manufactured by Sigma-Aldrich Corporation, the following structure)

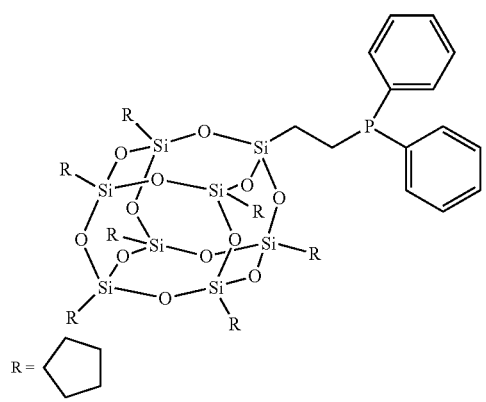

(A-1-15) trade name: OCTATRIMETHYLSILOXY POSS, MS0865 (manufactured by Hybrid Plastics Inc., the following structure)

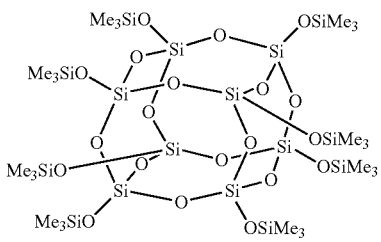

(A-1-16) DODECA PHENYL POSS, MS0802 (manufactured by Hybrid Plastics Inc., the following structure)

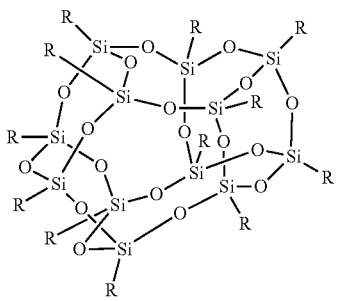

R = phenyl (A-1-17) OCTAMETHYLPOSS, MS0830 (manufactured by Hybrid Plastics Inc., the following structure)

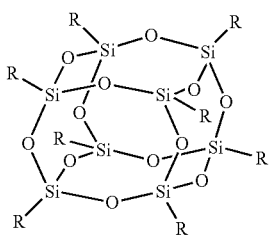

R = methyl (Comparative Compound 1)
Trade name: ACRYLO POSS CAGE MIXTURE, MA0736 (manufactured by Hybrid Plastics Inc., the following structure, comparative compound)

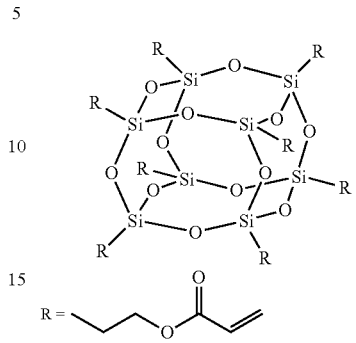

((Component B') Monofunctional Polymerizable Compound)
PEA: 2-phenoxyethyl acrylate
NVC: N-vinylcaprolactam
IBOA: isobornyl acrylate
FA-513AS: dicyclopentanyl acrylate
NIPAM: N-isopropylacrylamide (Tokyo Chemical Industry Co., Ltd.)
ACMO: acryloylmorpholine (manufactured by KOHJIN Holdings Co., Ltd.)
(Polyfunctional Polymerizable Compound)
HDDA (1,6-hexanediol diacrylate, Shin-Nakamura Chemical Co., Ltd.)
[Evaluation]
<Image Forming Method>
First, the ink composition thus prepared was filtered by using a filter with absolute filtration accuracy of 2 µm.
Next, using an experimental inkjet recording apparatus (trade name: LUXEL JET UV350GTW, manufactured by Fujifilm Corporation) having a piezo type inkjet nozzle, an image was formed on a recording medium. The ink supply system includes a main tank, a supply piping, an ink supply tank immediately before an inkjet head, a filter, and a piezo type inkjet head; and heat insulation and heating were performed in the section from the ink supply tank to the inkjet head part. Temperature sensors were provided at the ink supply tank and in the vicinity of the nozzle of the inkjet head, respectively, and the temperature was adjusted so that the temperature of the nozzle part was always at 45° C.±2° C. The piezo type inkjet head was driven so that multisize dots of from 8 pL to 30 pL could be discharged with a resolution of 720 dpi×720 dpi, to form a solid image. After the ink had been spotted, UV light was concentrated to give an exposure surface illuminance of 2,100 mW/cm$^2$, and the exposure system, the main scanning speed, and the discharge frequency were adjusted such that irradiation was initiated 0.1 seconds after the ink had landed on the recording medium. Further, the integrated quantity of light applied to the image was adjusted so as to be 3,000 mJ/cm$^2$. As the ultraviolet lamp, HAN 250NL HIGH-CURE MERCURY LAMP (manufactured by GS Uasa Corporation) was used. Here, the "dpi" used in the present invention represents the number of dots per 2.54 cm. As the recording medium, PANLITE PC-1151 (film thickness 500 µm, a polycarbonate sheet, manufactured by Teijin Chemicals Ltd.) was used. Regarding the respective samples, the image drawing was performed such that the average film thickness of the cured film of the ink composition was 12 µm.

In accordance with the above conditions, an image to be used for evaluation of punching process suitability and elongation percentage was formed. Results are shown in Table 22 and Table 23. The methods for the measurement and evaluation of each evaluation item in Table 22 and Table 23 are as follows.

(Evaluation of Storage Stability)

The ink that had been filtered was placed in a light resistant bottle and was left at 45° C. for one month, and then, by the above image recording method, a solid image (5 cm×5 cm) was recorded on a recording medium. Thereafter, the obtained solid image was observed. The image thus observed was visually evaluated according to the following evaluation criteria.

5: The occurrence of dot defects due to the occurrence of white spots or the like was not observed, and a good image was obtained.

4: The occurrence of dot defects due to the occurrence of white spots or the like was slightly observed, that was not problematic for practical use.

3: The occurrence of dot defects due to the occurrence of white spots or the like was observed, but the image was not unacceptable for practical use.

2: A lot of dot defects due to the occurrence of white spots or the like occurred, and the image was unacceptable for practical use.

1: The ink was not ejected at all.

(Evaluation of Punching Property)

Printed matter was prepared by the same method as the image forming method described above.

Under the condition of a temperature of 25° C., the printed matter thus prepared was subjected to hole making processing by using a manual OA large-size hole-making punch No. 200N (manufactured by LION OFFICE PRODUCTS CORPORATION). The resulting molded printed matter was observed using an optical microscope of 100 magnifications whether or not cracking had occurred in the vicinity of the portion of the image, where a hole had been made, and further, the resulting printed matter was visually observed for the existence of light transmission.

4: There were no cracks in the vicinity of the punched hole, and light transmission was not observed.

3: There were cracks in the vicinity of the punched hole, but light transmission was not observed.

2: There were cracks in the vicinity of the punched hole and light transmission was observed, but that was not problematic.

1: Cracks occurred in the vicinity of the punched hole and light transmission was observed, and the molded printed matter was inadequate as a commercial product.

(Evaluation of Indentation Hardness)

Using the sample formed by the image forming method described above, evaluation was carried out according to the indentation method. Measurement was carried out by using, as the device, FISCHER SCOPE HM-500, manufactured by Fischer Instruments K.K., and a Berkovich indentator (a trigonal pyramid having a tip aperture angle of 144°34'), with a load of 0.05 mN, and at an indentation depth of 0.3 μm. The film hardness is determined from the value of the load when pressed, and the contact area of the sample and the indentator. The preferable hardness is 80 N/mm$^2$ or more.

(Evaluation of Stretchability)

In the preparation of printed matter of Example 32 to Example 65, and Comparative Example 3 and Comparative Example 4, a solid image having an average film thickness of 12 μm was formed according to the image forming method described above. The solid image was cut into a size of 2.5 cm in width and 5.0 cm in length, and a stretching test was carried out using an accurate universal testing machine manufactured by Shimadzu Corporation (AUTOGRAPH AGS-J) and a thermostatic chamber TCR 2W-200P, at a velocity of 50 mm/min, under an environment of 180° C., whereby the elongation percentage with respect to the length was measured. The state in which the sample is stretched to a length twice the initial length is defined as the elongation percentage of 100%. The acceptable range of the elongation percentage is 150% or more, and it is preferable that the elongation percentage is 300% or more.

TABLE 22

| | (Component A') | (Component A') Content | Pigment Dispersion | Pigment Dispersion Content | (Component B') Monofunctional Polymerizable Compound | | | | | | Polyfunctional Polymerizable Compound HDDA | Content of (Component B') with respect to the Total Content of Polymerizable Compounds |
|---|---|---|---|---|---|---|---|---|---|---|---|---|
| | | | | | Pigment Dispersion-Derived PEA | NVC | IBOA | FA513AS | NIPAM | ACMO | | |
| Example 32 | (A-1-1) | 0.1 | M2 | 13 | 7.8 | 33 | | 23.9 | 20 | | 1 | 98.8 |
| Example 33 | (A-1-1) | 1 | M2 | 13 | 7.8 | 33 | | 23 | 20 | | 1 | 98.8 |
| Example 34 | (A-1-1) | 10 | M2 | 13 | 7.8 | 33 | | 14 | 20 | | 1 | 98.7 |
| Example 35 | (A-1-1) | 1 | Y2 | 7 | 4.2 | 39 | | 23 | 20 | | 1 | 98.9 |
| Example 36 | (A-1-1) | 1 | K2 | 8 | 4.16 | 38 | | 23 | 20 | | 1 | 98.8 |
| Example 37 | (A-1-1) | 1 | C2 | 8 | 4.96 | 38 | | 23 | 20 | | 1 | 98.9 |
| Example 38 | (A-1-1) | 1 | W2 | 30 | 13.2 | 16 | | 23 | 20 | | 1 | 98.6 |
| Example 39 | (A-1-2) | 1 | M2 | 13 | 7.8 | 33 | | 23 | 20 | | 1 | 98.8 |
| Example 40 | (A-1-3) | 1 | M2 | 13 | 7.8 | 33 | | 23 | 20 | | 1 | 98.8 |
| Example 41 | (A-1-3) | 5 | M2 | 13 | 7.8 | 33 | | 19 | 20 | | 1 | 98.8 |
| Example 42 | (A-1-3) | 5 | M2 | 13 | 7.8 | 33 | | 19 | | 20 | 1 | 98.8 |
| Example 43 | (A-1-3) | 5 | M2 | 13 | 7.8 | 33 | | | 39 | | 1 | 98.8 |
| Example 44 | (A-1-3) | 5 | M2 | 13 | 7.8 | 33 | | | 19 | 20 | 1 | 98.8 |
| Example 45 | (A-1-3) | 5 | M2 | 13 | 7.8 | 33 | | 39 | | | 1 | 98.8 |
| Example 46 | (A-1-3) | 5 | M2 | 13 | 7.8 | | | | 35 | 37 | 1 | 98.8 |
| Example 47 | (A-1-3) | 5 | M2 | 13 | 7.8 | | | 37 | 35 | | 1 | 98.8 |
| Example 48 | (A-1-3) | 5 | M2 | 13 | 7.8 | | 35 | 37 | | | 1 | 98.8 |
| Example 49 | (A-1-4) | 1 | M2 | 13 | 7.8 | 33 | | 23 | 20 | | 1 | 98.8 |
| Example 50 | (A-1-4) | 5 | M2 | 13 | 7.8 | 33 | | 19 | 20 | | 1 | 98.8 |

TABLE 22-continued

|  | Storage Stability | Punching Property | Indentation Hardness [N/mm$^2$] | Elongation Percentage (%) |
|---|---|---|---|---|
| Example 32 | 5 | 3 | 100 | 300 |
| Example 33 | 5 | 4 | 100 | 300 |
| Example 34 | 4 | 4 | 100 | 200 |
| Example 35 | 5 | 4 | 100 | 300 |
| Example 36 | 5 | 4 | 100 | 300 |
| Example 37 | 5 | 4 | 100 | 300 |
| Example 38 | 5 | 4 | 100 | 300 |
| Example 39 | 5 | 4 | 100 | 300 |
| Example 40 | 5 | 4 | 100 | 300 |
| Example 41 | 5 | 4 | 100 | 300 |
| Example 42 | 5 | 4 | 100 | 300 |
| Example 43 | 5 | 4 | 120 | 300 |
| Example 44 | 5 | 4 | 120 | 300 |
| Example 45 | 5 | 4 | 80 | 300 |
| Example 46 | 5 | 4 | 120 | 300 |
| Example 47 | 5 | 4 | 100 | 300 |
| Example 48 | 5 | 4 | 80 | 300 |
| Example 49 | 5 | 4 | 100 | 300 |
| Example 50 | 5 | 4 | 100 | 300 |

\* The numeral value particularly without a unit, in the table above, represents the content (parts by mass).
\*\* The blank in the table above represents that the compound is not included.

TABLE 23

|  | (Component A') | (Component A') Content | Pigment Dispersion | Pigment Dispersion Content | Pigment Dispersion-Derived PEA | (Component B') Monofunctional Polymerizable Compound NVC | IBOA | FA513AS | NIPAM | ACMO | Polyfunctional Polymerizable Compound HDDA | Content of (Component B') with respect to the Total Content of Polymerizable Compounds |
|---|---|---|---|---|---|---|---|---|---|---|---|---|
| Example 51 | (A-1-5) | 1 | M2 | 13 | 7.8 | 33 |  | 23 | 20 |  | 1 | 98.8 |
| Example 52 | (A-1-6) | 1 | M2 | 13 | 7.8 | 33 |  | 23 | 20 |  | 1 | 98.8 |
| Example 53 | (A-1-17) | 5 | M2 | 13 | 7.8 | 33 |  |  | 19 | 20 | 1 | 98.8 |
| Example 54 | (A-1-7) | 5 | M2 | 13 | 7.8 | 33 |  |  | 19 | 20 | 1 | 98.8 |
| Example 55 | (A-1-8) | 5 | M2 | 13 | 7.8 | 33 |  |  | 19 | 20 | 1 | 98.8 |
| Example 56 | (A-1-9) | 5 | M2 | 13 | 7.8 | 33 |  |  | 19 | 20 | 1 | 98.8 |
| Example 57 | (A-1-10) | 5 | M2 | 13 | 7.8 | 33 |  |  | 19 | 20 | 1 | 98.8 |
| Example 58 | (A-1-11) | 5 | M2 | 13 | 7.8 | 33 |  |  | 19 | 20 | 1 | 98.8 |
| Example 59 | (A-1-12) | 5 | M2 | 13 | 7.8 | 33 |  |  | 19 | 20 | 1 | 98.8 |
| Example 60 | (A-1-13) | 5 | M2 | 13 | 7.8 | 33 |  |  | 19 | 20 | 1 | 98.8 |
| Example 61 | (A-1-14) | 5 | M2 | 13 | 7.8 | 33 |  |  | 19 | 20 | 1 | 98.8 |
| Example 62 | (A-1-15) | 5 | M2 | 13 | 7.8 | 33 |  |  | 19 | 20 | 1 | 98.8 |
| Example 63 | (A-1-16) | 5 | M2 | 13 | 7.8 | 33 |  |  | 19 | 20 | 1 | 98.8 |
| Example 64 | (A-1-3) | 5 | M2 | 26 | 15.6 | 20 |  |  | 21 |  | 10 | 85 |
| Example 65 | (A-1-3) | 5 | M2 | 13 | 7.8 | 33 | 19 |  | 21 |  | 0 | 100 |
| Comparative Example 3 | (A-1-3) | 5 | M2 | 13 | 7.8 | 26 |  |  | 13 | 14 | 20 | 75.2 |
| Comparative Example 4 | Comparative compound 1 | 5 | M2 | 13 | 7.8 | 33 |  |  | 19 | 20 | 1 | 98.7 |

|  | Storage Stability | Punching Property | Indentation Hardness [N/mm$^2$] | Elongation Percentage (%) |
|---|---|---|---|---|
| Example 51 | 5 | 4 | 100 | 300 |
| Example 52 | 5 | 4 | 100 | 300 |
| Example 53 | 5 | 3 | 120 | 300 |
| Example 54 | 5 | 3 | 120 | 300 |
| Example 55 | 4 | 4 | 120 | 300 |
| Example 56 | 4 | 4 | 120 | 300 |
| Example 57 | 3 | 4 | 120 | 300 |
| Example 58 | 3 | 4 | 120 | 300 |
| Example 59 | 4 | 4 | 120 | 300 |
| Example 60 | 4 | 4 | 120 | 300 |
| Example 61 | 5 | 3 | 120 | 300 |
| Example 62 | 4 | 4 | 120 | 300 |
| Example 63 | 5 | 3 | 120 | 200 |
| Example 64 | 4 | 2 | 120 | 150 |

TABLE 23-continued

| | | | | |
|---|---|---|---|---|
| Example 65 | 5 | 4 | 80 | 500 |
| Comparative Example 3 | 3 | 1 | 150 | 30 |
| Comparative Example 4 | 1 | 1 | 150 | 20 |

\* The numeral value particularly without a unit, in the table above, represents the content (parts by mass).
\*\* The blank in the table above represents that the compound is not included.

The invention claimed is:

1. An ink composition, comprising:

a component A polymer having a weight average molecular weight of 3,000 or more, and having:

a group containing a silsesquioxane structure; and a repeating unit selected from the group consisting of a (meth)acrylamide repeating unit, an urethane repeating unit, a urea repeating unit, and a non-substituted styrene repeating unit;

wherein the silsesquioxane structure comprises a structure represented by the following Formula (A-1):

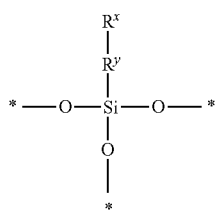

Formula (A-1)

wherein, in Formula (A-1), $R^x$ represents a cyano group, an —SH group, —$PR^a{}_2$, an amino group, an aryl group, or an alkyl group, wherein $R^a$ represents an aryl group; $R^y$ represents a single bond or at least one group selected from the group consisting of —COO—, an alkylene group, an arylene group, an alkyleneoxy group, —$SO_2$—, —$SiR^b{}_2$—, and —NH—, wherein $R^b$ represents an alkylene group or a halogen atom; and * represents a bonding site;

a component B monofunctional polymerizable compound; and a component C polymerization initiator.

2. The ink composition according to claim 1, wherein the weight average molecular weight of the component A polymer is from 10,000 to 200,000.

3. The ink composition according to claim 1, wherein the component A polymer is a polymer having a group containing a silsesquioxane structure in a side chain thereof.

4. The ink composition according to claim 1, wherein the group containing a silsesquioxane structure in the component A polymer is a group represented by the following Formula (A-2):

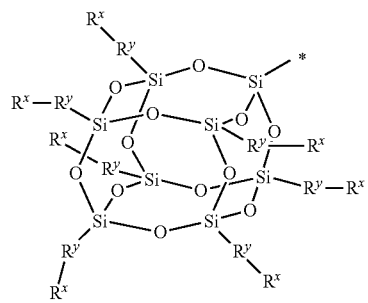

Formula (A-2)

wherein, in Formula (A-2), $R^x$ represents an aryl group or an alkyl group; $R^y$ represents a single bond; respective $R^x$'s and respective $R^y$'s may be the same as or different from each other; and * represents a bonding site.

5. The ink composition according to claim 1, further comprising a component D coloring agent.

6. The ink composition according to claim 1, wherein the repeating unit consists of a urethane repeating unit (—NHCOO—) that is present in a main chain of the component A polymer.

7. The ink composition according to claim 1, wherein a content of the component A polymer with respect to a total amount of the ink composition is from 0.1% by mass to 20% by mass.

8. The ink composition according to claim 1, wherein a content of the component B monofunctional polymerizable compound with respect to a total content of all polymerizable compounds in the ink composition is from 90% by mass to 100% by mass.

9. The ink composition according to claim 1, wherein the component B monofunctional polymerizable compound comprises an N-vinyl compound or a (meth)acrylate compound.

10. An ink composition, comprising:

a component A' compound that does not have an ethylenically unsaturated double bond but has a silsesquioxane structure, and that has a molecular weight of 300 or more but less than 3,000, wherein the silsesquioxane structure is a structure represented by Structural Formula (A):

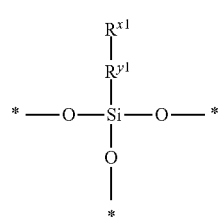

Structural Formula (A)

wherein, in Structural Formula (A), $R^{x1}$ represents a cyano group, a thiol group, $-PR^{a1}_2$, $-SiR^c_3$, an amino group, an aryl group, or an alkyl group not having an epoxy group, wherein $R^{a1}$ represents an aryl group and $R^c$ represents an alkyl group; $R^{y1}$ represents a single bond, —COO—, an alkylene group, an arylene group, an alkyleneoxy group, $-SO_2-$, —O—, $-SiR^{b1}_2-$, or an —NH—group, wherein $R^{b1}$ represents an alkyl group; and * represents a bonding site;

a component B' monofunctional polymerizable compound comprising an N-vinyl compound, a (meth)acrylamide compound, and a (meth)acrylate compound, wherein the N-vinyl compound is represented by the following Formula (V):

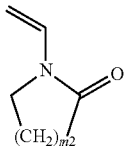

Formula (V)

wherein, in Formula (V), m2 is 4, and wherein the (meth)acrylamide compound is represented by the following Formula (M'-1):

(M'-1)

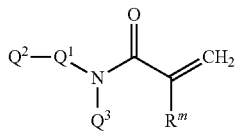

Formula (M'-1)

wherein, in Formula (M'-1), $Q^1$ represents a single bond; $Q^2$ represents an aryl group, an amino group, a hydroxyl group, a sulfo group, an acyl group, or a non-substituted alkyl group having 3 to 7 carbon atoms; $Q^3$ represents a hydrogen atom or an alkyl group; $Q^2$ and $Q^3$ may bond to each other to form a ring; and $R^m$ represents a hydrogen atom or a methyl group;

a component C polymerization initiator; and a component D coloring agent, wherein a content of the component B' monofunctional polymerizable compound with respect to a total content of all polymerizable compounds in the ink composition is from 80% by mass to 99% by mass.

11. The ink composition according to claim 10, wherein, in Structural Formula (A), $R^{x1}$ represents a thiol group, $-PR^{a1}_2$, $-SiR^c_3$, an aryl group, or an alkyl group not having an epoxy group, wherein $R^{a1}$ represents an aryl group and $R^c$ represents an alkyl group; and $R^{y1}$ represents an alkylene group, an alkyleneoxy group, or a single bond.

12. The ink composition according to claim 10, wherein, in Structural Formula (A), $R^{x1}$ represents an aryl group, or an alkyl group not having an epoxy group, and $R^{y1}$ represents a single bond.

13. The ink composition according to claim 10, wherein the component A' compound is represented by the following Formula (A'-2):

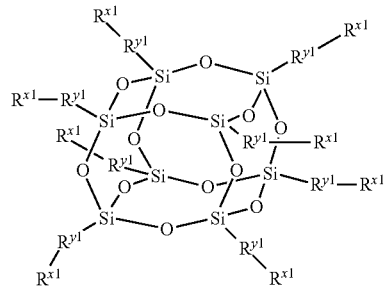

Formula (A'-2)

wherein, in Formula (A'-2), $R^{x1}$ represents an aryl group, or an alkyl group not having an epoxy group; $R^{y1}$ represents a single bond; and respective $R^{x1}$'s and respective $R^{y1}$'s may be the same as or different from each other.

14. The ink composition according to claim 10, wherein the component A' compound is contained in an amount of from 0.1% by mass to 20% by mass with respect to a total amount of the ink composition.

15. The ink composition according to claim 1, wherein the component A polymer comprises a urethane repeating unit (—NHCOO—) as a main chain structure.

16. The ink composition according to claim 1, wherein the component A polymer further comprises a (meth)acrylate repeating unit.

17. The ink composition according to claim 1, wherein the component B monofunctional polymerizable compound comprises an N-vinyl lactam.

18. The ink composition according to claim 1, wherein the component B monofunctional polymerizable compound comprises a (meth)acrylate compound, N-vinyl lactam, and a (meth)acrylamide compound.

19. An ink composition according to claim 10, wherein a content of the (meth)acrylamide compound is from 0.1% by mass to 75% by mass with respect to a total amount of the ink composition, and a content of the N-vinyl compound is from 0.1% by mass to 50% by mass with respect to the total amount of the ink composition.

* * * * *